US009997010B2

(12) United States Patent
Lee et al.

(10) Patent No.: US 9,997,010 B2
(45) Date of Patent: Jun. 12, 2018

(54) ELECTRONIC GAMING DEVICE WITH EXTERNAL LIGHTING FUNCTIONALITY

(71) Applicant: Cadillac Jack, Inc., Duluth, GA (US)

(72) Inventors: Sigmund Lee, Atlanta, GA (US); Karl Frederick Zedell, Jr., Alpharetta, GA (US); Rachel Marie Calhoun, Atlanta, GA (US); Ian Robert Scott, Duluth, GA (US)

(73) Assignee: AGS LLC, Las Vegas, NV (US)

( * ) Notice: Subject to any disclaimer, the term of this patent is extended or adjusted under 35 U.S.C. 154(b) by 17 days.

(21) Appl. No.: 14/973,876

(22) Filed: Dec. 18, 2015

(65) Prior Publication Data

US 2017/0178444 A1 Jun. 22, 2017

(51) Int. Cl.
*A63F 13/00* (2014.01)
*G07F 17/32* (2006.01)

(52) U.S. Cl.
CPC ...... *G07F 17/3211* (2013.01); *G07F 17/3216* (2013.01); *G07F 17/3262* (2013.01); *G07F 17/3202* (2013.01)

(58) Field of Classification Search
None
See application file for complete search history.

(56) References Cited

U.S. PATENT DOCUMENTS 4,440,457 A 4/1984 Fogelman et al.
D275,117 S 8/1984 Heywood
4,844,567 A 7/1989 Chalabian
4,918,579 A 4/1990 Bennett
D307,771 S 5/1990 Cesaroni et al.
5,057,827 A 10/1991 Nobile et al.
5,108,099 A 4/1992 Smyth
5,113,990 A 5/1992 Gabrius et al.
D333,164 S 2/1993 Kraft et al.
5,302,965 A 4/1994 Belcher et al.
5,381,502 A 1/1995 Veligdan
5,521,587 A 5/1996 Sawabe et al.
D373,809 S 9/1996 Hirato
5,561,346 A 10/1996 Byrne
D380,014 S 6/1997 Yang
D381,697 S 7/1997 Brettschneider
D381,700 S 7/1997 Brettschneider
5,670,971 A 9/1997 Tokimoto et al.
D386,796 S 11/1997 Komori
(Continued)

OTHER PUBLICATIONS

Spec International, Inc., GEN-311 gaming machine cabinet, publicly disclosed at least as early as Dec. 13, 2008.
(Continued)

*Primary Examiner* — Jason Yen
(74) *Attorney, Agent, or Firm* — Weide & Miller, Ltd.

(57) ABSTRACT

Examples disclosed herein relate to a gaming device including a memory, a processor, a display, a plurality of display areas located on the display, and a plurality of external lights located at an outer area of a front surface of the electronic gaming device. The plurality of external lights forming a u-shape with a left side, a right side, and a bottom where each of the left side, the right side, and the bottom includes a first light column, a second light column, and a third light column. The gaming device including a processor that initiates a base game via the plurality of display areas located on the display.

16 Claims, 62 Drawing Sheets

(56) References Cited

U.S. PATENT DOCUMENTS

| | | | |
|---|---|---|---|
| 5,695,402 | A | 12/1997 | Stupak |
| 5,813,914 | A | 9/1998 | McKay et al. |
| 5,818,401 | A | 10/1998 | Wang |
| 5,826,882 | A | 10/1998 | Ward |
| 5,836,819 | A | 11/1998 | Ugawa |
| D407,758 | S | 4/1999 | Isetani et al. |
| D413,635 | S | 9/1999 | Taylor |
| D421,631 | S | 3/2000 | Tsuda |
| D424,122 | S | 5/2000 | Dickenson et al. |
| 6,068,101 | A | 5/2000 | Dickenson et al. |
| D428,062 | S | 7/2000 | Hayashi |
| 6,095,526 | A | 8/2000 | Cook, II |
| 6,135,884 | A | 10/2000 | Hedrick et al. |
| 6,164,645 | A | 12/2000 | Weiss |
| D436,380 | S | 1/2001 | Brettschneider |
| 6,176,584 | B1 | 1/2001 | Best et al. |
| 6,183,109 | B1 | 2/2001 | Nelson et al. |
| 6,186,645 | B1 | 2/2001 | Camarota |
| 6,201,703 | B1 | 3/2001 | Yamada et al. |
| D439,931 | S | 4/2001 | Yamaguchi |
| D442,640 | S | 5/2001 | Hayashi |
| 6,265,984 | B1 | 7/2001 | Molinaroli |
| D446,252 | S | 8/2001 | Yamaguchi |
| 6,278,419 | B1 | 8/2001 | Malkin |
| 6,283,608 | B1 | 9/2001 | Straat |
| 6,319,125 | B1 | 11/2001 | Acres |
| 6,332,690 | B1 | 12/2001 | Murofushi |
| 6,334,612 | B1 | 1/2002 | Wurz et al. |
| D459,402 | S | 6/2002 | Wurz et al. |
| D460,915 | S | 7/2002 | Lynch |
| 6,443,837 | B1 | 9/2002 | Jaffe et al. |
| D464,377 | S | 10/2002 | Wurz et al. |
| D466,160 | S | 11/2002 | Hirato et al. |
| 6,475,087 | B1 | 11/2002 | Cole |
| D471,594 | S | 3/2003 | Nojo |
| 6,577,286 | B1 | 6/2003 | Jang |
| 6,578,847 | B1 | 6/2003 | Hendrick et al. |
| 6,579,174 | B1 | 6/2003 | Lane et al. |
| 6,592,238 | B2 | 7/2003 | Cleaver et al. |
| 6,641,484 | B2 | 11/2003 | Oles et al. |
| 6,682,418 | B1 | 1/2004 | Mendes et al. |
| 6,702,409 | B2 | 3/2004 | Hedrick et al. |
| D489,417 | S | 5/2004 | Munoz et al. |
| 6,776,504 | B2 | 8/2004 | Sloan et al. |
| D495,754 | S | 9/2004 | Wurz et al. |
| D495,755 | S | 9/2004 | Wurz et al. |
| D496,407 | S | 9/2004 | Gadda et al. |
| D498,267 | S | 11/2004 | Crouch |
| 6,834,979 | B1 | 12/2004 | Cleaver et al. |
| 6,860,814 | B2 | 3/2005 | Cole |
| 6,897,624 | B2 | 5/2005 | Lys et al. |
| 6,899,626 | B1 | 5/2005 | Luciano et al. |
| 6,906,860 | B2 | 6/2005 | Starkweather |
| D508,268 | S | 8/2005 | Hanchar et al. |
| D508,961 | S | 8/2005 | Gatto et al. |
| 6,948,829 | B2 | 9/2005 | Verdes et al. |
| D513,044 | S | 12/2005 | Morrison |
| 6,997,810 | B2 | 2/2006 | Cole |
| 7,014,563 | B2 | 3/2006 | Stephan et al. |
| D525,664 | S | 7/2006 | Cole |
| 7,123,811 | B1 | 10/2006 | Chen et al. |
| D535,338 | S | 1/2007 | Linard et al. |
| 7,178,941 | B2 | 2/2007 | Roberge et al. |
| 7,213,941 | B2 | 5/2007 | Sloan et al. |
| 7,237,925 | B2 | 7/2007 | Mayer et al. |
| 7,284,876 | B2 | 10/2007 | Ericson |
| D557,348 | S | 12/2007 | Gutknecht et al. |
| D559,917 | S | 1/2008 | Cole |
| 7,331,694 | B2 | 2/2008 | Lee et al. |
| D563,481 | S | 3/2008 | Looks et al. |
| D564,601 | S | 3/2008 | Strahinic et al. |
| 7,339,782 | B1 | 3/2008 | Landes et al. |
| D566,197 | S | 4/2008 | Greenberg et al. |
| 7,355,573 | B2 | 4/2008 | Ogawa |
| 7,364,505 | B2 | 4/2008 | Mattice et al. |
| 7,367,145 | B2 | 5/2008 | Mou |
| 7,367,685 | B2 | 5/2008 | Moll |
| 7,390,257 | B2 | 6/2008 | Paulsen et al. |
| D573,200 | S | 7/2008 | Hashimoto et al. |
| 7,397,387 | B2 | 7/2008 | Suzuki et al. |
| 7,423,864 | B2 | 9/2008 | Kim et al. |
| 7,442,125 | B2 | 10/2008 | Paulsen et al. |
| 7,476,154 | B2 | 1/2009 | Kogo et al. |
| D586,866 | S | 2/2009 | Hsu |
| 7,506,463 | B2 | 3/2009 | Holst |
| 7,506,997 | B1 | 3/2009 | Eriksson |
| 7,513,830 | B2 | 4/2009 | Hajder et al. |
| D592,709 | S | 5/2009 | McComb et al. |
| D603,909 | S | 11/2009 | De Viveiros Ortiz |
| D604,368 | S | 11/2009 | Lesley et al. |
| D605,231 | S | 12/2009 | Hashimoto et al. |
| 7,641,554 | B2 | 1/2010 | Paulsen et al. |
| 7,654,899 | B2 | 2/2010 | Durham et al. |
| 7,667,891 | B2 | 2/2010 | Cok et al. |
| 7,708,640 | B2 | 5/2010 | Burak et al. |
| D619,177 | S | 7/2010 | Lee |
| D619,660 | S | 7/2010 | Cole et al. |
| 7,803,053 | B2 | 9/2010 | Atkinson |
| D626,182 | S | 10/2010 | Cole et al. |
| D626,183 | S | 10/2010 | Cole et al. |
| 7,826,006 | B2 | 11/2010 | Koganezawa |
| 7,828,461 | B2 | 11/2010 | Mayer et al. |
| 7,833,102 | B2 | 11/2010 | Beadell et al. |
| D633,950 | S | 3/2011 | Terpstra et al. |
| 7,927,218 | B2 | 4/2011 | Kopera et al. |
| 7,966,485 | B2 | 6/2011 | Chen et al. |
| D646,336 | S | 10/2011 | Kelly et al. |
| D649,605 | S | 11/2011 | Terpstra et al. |
| 8,054,243 | B2 | 11/2011 | Sokolov et al. |
| 8,075,385 | B2 | 12/2011 | Jackson |
| 8,241,124 | B2 | 8/2012 | Kelly et al. |
| 8,272,957 | B2 | 9/2012 | Crowder, Jr. et al. |
| D673,619 | S | 1/2013 | Seelig |
| D673,620 | S | 1/2013 | Johnson et al. |
| D673,621 | S | 1/2013 | Johnson et al. |
| 8,430,756 | B2 | 4/2013 | McComb et al. |
| D685,435 | S | 7/2013 | Hohman et al. |
| 8,550,913 | B2 | 10/2013 | Kelly et al. |
| 8,651,963 | B1 | 2/2014 | Thompson |
| 8,814,707 | B2 | 8/2014 | Slattery |
| 8,827,819 | B2 | 9/2014 | Thompson |
| D714,875 | S | 10/2014 | Wudtke et al. |
| D715,364 | S | 10/2014 | Wudtke et al. |
| 8,851,989 | B2 | 10/2014 | Rosander et al. |
| D723,626 | S | 3/2015 | Vasquez et al. |
| 8,974,297 | B2 | 3/2015 | Massing et al. |
| D733,088 | S | 6/2015 | Garneau et al. |
| 9,064,372 | B2 | 6/2015 | Rasmussen et al. |
| D745,093 | S | 12/2015 | Weiss et al. |
| D762,613 | S | 8/2016 | Garneau et al. |
| D763,361 | S | 8/2016 | Rosander et al. |
| RE46,169 | E | 10/2016 | Kelly et al. |
| 9,478,097 | B2 | 10/2016 | Hennessy et al. |
| 9,504,919 | B2 | 11/2016 | Taylor et al. |
| 9,573,050 | B2 | 2/2017 | Thompson et al. |
| 9,711,001 | B2 | 7/2017 | Zedell, Jr. et al. |
| D798,389 | S | 9/2017 | Weiss et al. |
| D801,437 | S | 10/2017 | Hohman |
| 2003/0064814 | A1 | 4/2003 | Stephan et al. |
| 2004/0001335 | A1 | 1/2004 | Wu |
| 2004/0053663 | A1 | 3/2004 | Paulsen et al. |
| 2004/0053699 | A1 | 3/2004 | Rasmussen et al. |
| 2004/0224776 | A1 | 11/2004 | Nagano |
| 2004/0229698 | A1 | 11/2004 | Lind et al. |
| 2005/0059486 | A1 | 3/2005 | Kaminkow |
| 2005/0130746 | A1 | 6/2005 | Stephenson, III et al. |
| 2005/0215325 | A1 | 9/2005 | Nguyen et al. |
| 2005/0261057 | A1 | 11/2005 | Bleich et al. |
| 2006/0030412 | A1 | 2/2006 | Cole |
| 2006/0073900 | A1 | 4/2006 | Cole |
| 2006/0094511 | A1* | 5/2006 | Roireau .............. G07F 17/3202 463/46 |
| 2006/0100013 | A1 | 5/2006 | Enzminger |
| 2006/0131810 | A1 | 6/2006 | Nicely |

(56) References Cited

U.S. PATENT DOCUMENTS

| | | | | |
|---|---|---|---|---|
| 2006/0183552 | A1 | 8/2006 | DiMichele | |
| 2006/0205498 | A1 | 9/2006 | Kogo et al. | |
| 2007/0010318 | A1 | 1/2007 | Rigsby et al. | |
| 2007/0035965 | A1 | 2/2007 | Holst | |
| 2007/0060387 | A1 | 3/2007 | Enzminger et al. | |
| 2007/0149291 | A1 | 6/2007 | Mitchell | |
| 2007/0159820 | A1 | 7/2007 | Crandell et al. | |
| 2007/0171640 | A1 | 7/2007 | Sloan et al. | |
| 2007/0197301 | A1 | 8/2007 | Cole | |
| 2007/0225079 | A1 | 9/2007 | Cole | |
| 2007/0287527 | A1 | 12/2007 | Tanabe et al. | |
| 2007/0287528 | A1* | 12/2007 | Hirato | G07F 17/32 463/20 |
| 2007/0287544 | A1 | 12/2007 | Hirato et al. | |
| 2008/0020838 | A1 | 1/2008 | Slattery | |
| 2008/0076553 | A1 | 3/2008 | Paulsen et al. | |
| 2008/0113794 | A1 | 5/2008 | Cole | |
| 2008/0119288 | A1 | 5/2008 | Rasmussen | |
| 2008/0186415 | A1 | 8/2008 | Boud et al. | |
| 2008/0194313 | A1 | 8/2008 | Walker | |
| 2008/0227522 | A1 | 9/2008 | Toyoda | |
| 2008/0248852 | A1 | 10/2008 | Rasmussen | |
| 2008/0268949 | A1 | 10/2008 | Dell | |
| 2009/0011839 | A1 | 1/2009 | Cole | |
| 2009/0036208 | A1 | 2/2009 | Pennington et al. | |
| 2009/0045723 | A1 | 2/2009 | Ishikawa | |
| 2009/0179597 | A1* | 7/2009 | Salmon | G02B 6/0008 315/313 |
| 2009/0247261 | A1 | 10/2009 | Koami | |
| 2009/0275389 | A1 | 11/2009 | Englman et al. | |
| 2010/0016084 | A1 | 1/2010 | Bleich et al. | |
| 2010/0020546 | A1 | 1/2010 | Kukita | |
| 2010/0120518 | A1 | 5/2010 | Borissov et al. | |
| 2010/0137060 | A1 | 6/2010 | Cole | |
| 2011/0118034 | A1* | 5/2011 | Jaffe | G07F 17/3211 463/42 |
| 2011/0195775 | A1 | 8/2011 | Wells | |
| 2011/0319152 | A1 | 12/2011 | Ross et al. | |
| 2012/0178523 | A1* | 7/2012 | Greenberg | G07F 17/3227 463/25 |
| 2013/0084948 | A1 | 4/2013 | Watkins et al. | |
| 2014/0132891 | A1* | 5/2014 | Tohyama | G02F 1/133603 349/69 |
| 2014/0206432 | A1* | 7/2014 | Radek | G07F 17/3223 463/25 |
| 2014/0256409 | A1 | 9/2014 | Wood et al. | |
| 2014/0268876 | A1 | 9/2014 | Lee et al. | |
| 2014/0323212 | A1 | 10/2014 | Thompson et al. | |
| 2015/0141113 | A1* | 5/2015 | Melnick | G07F 17/34 463/20 |
| 2015/0269810 | A1 | 9/2015 | Wolf et al. | |
| 2015/0336005 | A1 | 11/2015 | Melnick et al. | |
| 2017/0178443 | A1 | 6/2017 | Calhoun et al. | |

OTHER PUBLICATIONS

Icon by AGS, http://www.playags.com/portfolio/icon/, 3 pages, Feb. 23, 2016.

Non-published Design U.S. Appl. No. 29/540,241, filed Sep. 22, 2015, titled Gaming Device Wall of Light.

Non-Published Design U.S. Appl. No. 29/540,396, filed Sep. 24, 2015, titled Game Tower.

Orion by AGS, http://www.playags.com/portfolio/orion/, 3 pages, Sep. 15, 2016.

Non-Published U.S. Appl. No. 12/947,695, filed Nov. 16, 2010, titled Edge Lighted Gaming Panels for Electronic Gaming Device.

International Search Report and Written Opinion for PCT/US16/66904 dated Apr. 25, 2017, 13 pages.

* cited by examiner

ELECTRONIC GAMING DEVICE WITH EXTERNAL LIGHTING FUNCTIONALITY

FIELD

The subject matter disclosed herein relates to an electronic gaming device. More specifically, the disclosure relates to providing one or more external lighting functionalities on a gaming device.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine, online games of chances, online slot machines, etc.) are games of chance where a person may gamble on an outcome.

Paylines of an electronic gaming device (e.g., a slot machine, online games of chances, online slot machines, etc.) are one way utilized to determine when predetermined winning symbol combinations are aligned in a predetermined pattern to form a winning combination. A winning event occurs when the player successfully matches the predetermined winning symbols in one of the predetermined patterns. A bonus game and/or an external lighting function may be triggered when a based game, bonus game, and/or secondary game triggering event occurs.

A player's entertainment while playing one or more games may be enhanced by utilizing one or more external lighting functionalities on the gaming device. By increasing the player's entertainment level, the player's enjoyment of the game may be enhanced, which may increase a player's game playing period. In addition, one or more external lighting functionalities may be utilized in an attraction mode, a notification mode, game play mode, and/or external lighting game play mode.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
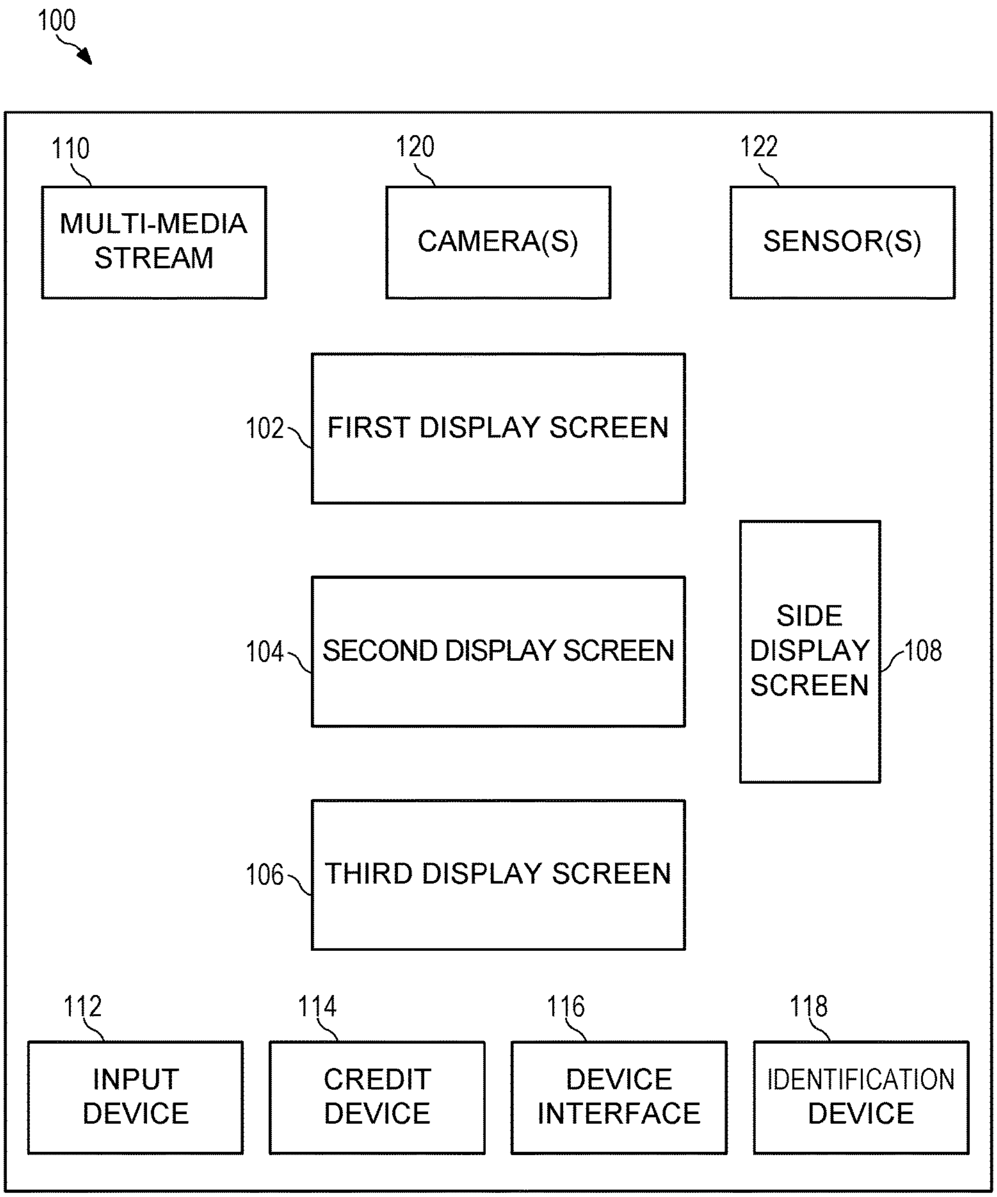
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to select one or more external lighting gaming options, to make a wager, to make an external lighting wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface with electronic gaming device 100 for a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, an external lighting gaming option may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include external lighting gaming options only. Therefore, only games which include external lighting gaming options would be presented to the player. For example, the player may be presented with a first external lighting gaming option where the action from the game is also displayed on the external lighting devices and/or a second external lighting gaming option where when a winning payline is determined on the base display a secondary game is implemented on the external lighting devices to determine whether an enhanced payout should be delivered. In another example, the player may only want to play games that include historical information relating to game play. Therefore, only games which include historical gaming data would be presented to the player. These examples may be combined.

Identification device 118 may utilize biometrics (e.g., thumb print, retina scan, or other biometric). Identification device 118 may include a card entry slot utilized with input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games (e.g., base game, secondary base game) and/or bonus games (e.g., free spins of base game), to display one or more warnings relating to one or more audio devices, one or more display devices, one or more electrical wires, one or more springs, one or more motors, one or more adjustable devices, and/or one or more sensors, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

One or more cameras 120 and/or one or more sensors 122 may be utilized as one or more depth image sensing devices, which may be located in various locations, including but not limited to, above the base display, above second display, in one or more locations on gaming cabinet front, on a side of the gaming cabinet other than gaming cabinet front, and/or any other location.

In one embodiment, electronic gaming device 100 may not include separate one or more input devices, but instead may only utilize one or more depth image sensing devices. In another embodiment, a player may utilize one or more input devices and/or may utilize gestures that electronic gaming device 100, via one or more depth image sensing devices, recognizes in order to make inputs for a play of a game. A player may interact with electronic gaming device 100 via one or more depth image sensing devices for a plurality of various player inputs.

In one embodiment, one or more depth image sensing devices may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices may include at least two different devices. For example, and discussed in more detail below, one of the at least two different devices may be an active device and/or one of the at least two different devices may be a passive device. In one example, an active device may generate a wave of measurable energy (e.g., light, radio, etc.). In another example, a passive device may be able to detect reflected waves generated by an active device. In another example, an active device and a passive device may each communicate data related to their respective activity to a processor, and the processor may translate data in order to determine the depth and/or image of a scene occurring near electronic gaming device 100.

Electronic gaming device 100 may include at least one display device. Electronic gaming device 100 may include a base display and/or a second display. In one embodiment, base display may be the primary display for a first game and/or one or more second chance games. In another embodiment, second display may be the primary display for a second bonus game and/or one or more second chance base games. For example, base display may display: a reel-type video slot game; and upon a secondary base game triggering condition; second display may display a secondary base game; and/or upon a second chance game feature triggering event; first and/or second display (and/or Nth displays) may display a second chance game feature. In various examples, a reserving of an electronic gaming device function may be initiated and/or displayed on a first screen, a second screen, an Nth screen, and/or any combination thereof. In one example, the reserved game play function for a first player may be initiated, displayed, and played on a first screen of the electronic gaming device while a normal game play function for a second player may be initiated, displayed, and played on a second screen of the electronic gaming device. The reserving function may be an automated game play where the player can play the electronic gaming device automatically and/or remotely. Further, the reserving function may be where a player holds an electronic gaming device for a specific period of time until they are able to start playing the electronic gaming device. For example, a player wants to play game X but has to go to the bathroom first. Therefore, the player reserves game X for 5 minutes (and/or any other amount of time).

In one embodiment, base display and second display may display separate portions of a common image. For example, second display may display a top portion of a wheel spinning while base display may display the bottom portion of the same wheel spinning.

Electronic gaming device 100 may also include one or more speakers. In one embodiment, one or more speakers may work in a synchronized manner to provide a surround sound effect. For example, as an object is displayed moving across the base display from left to right, one or more speakers may produce sound in such a manner as to create an audible sense of similar left to right movement. In another embodiment, one or more speakers may work asynchronously. In a further embodiment, a first speaker may produce sounds associated with a first symbol appearing in a play of a game, and a second speaker may produce sounds associated with a second symbol appearing in a play of the game.

Figure 2:
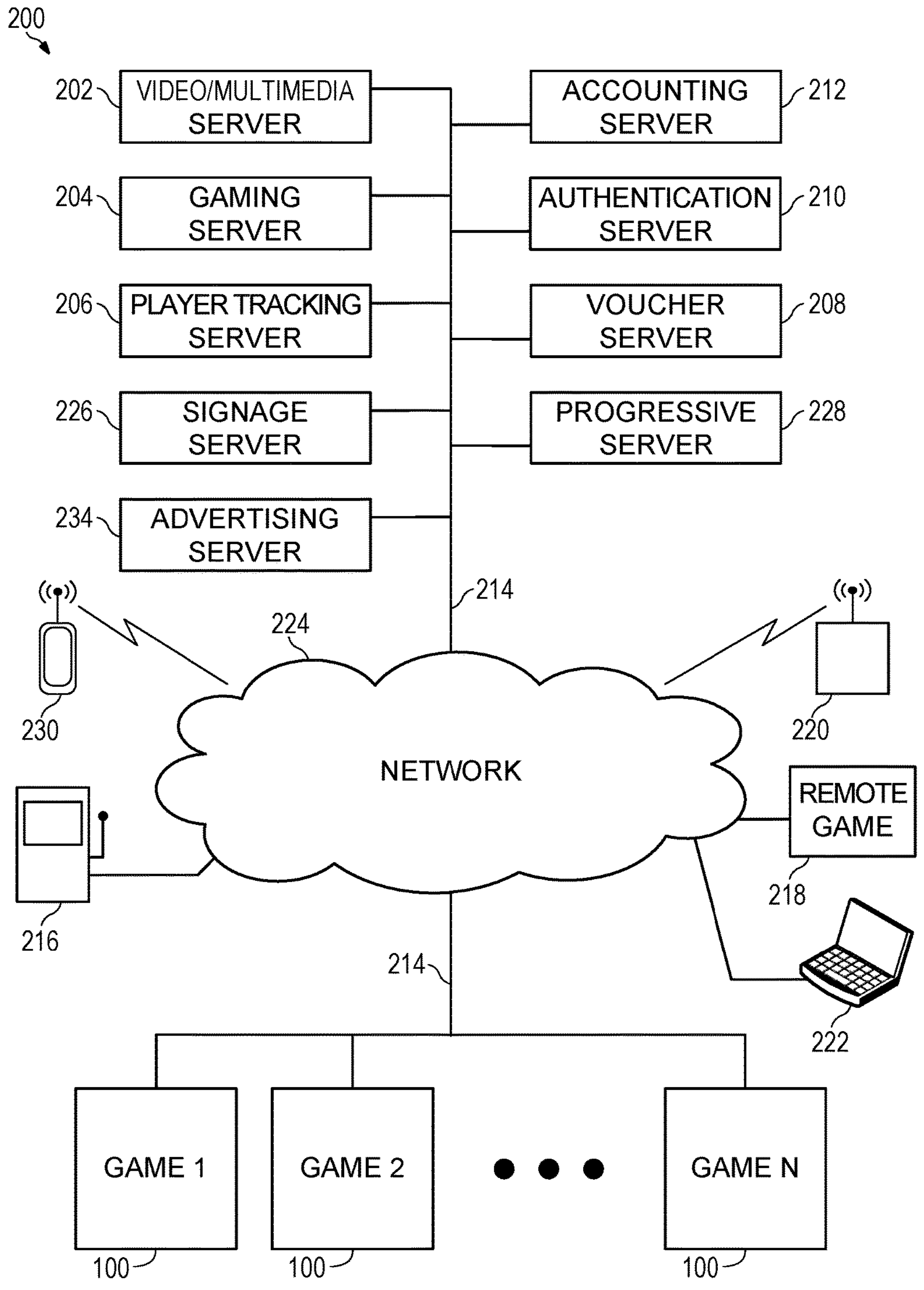
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, a signage server 226 a progressive server 228, and an advertising server 234.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities (including second chance wagers) to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of: a game feature functionality; a game feature evaluation functionality; a payout functionality; a base and/or bonus game play functionality; a base game evaluation functionality, a secondary base game evaluation functionality, and/or bonus game play evaluation functionality, an external lighting functionality, an external lighting game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include second chance wagering data and/or payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, second chance wagering data, and/or other transaction data. Transaction data may include the number of wagers, the size of these wagers, the date and time for these wagers, the identity of the players making these wagers, the frequency of the wagers, and/or verification data, and/or confirmation data. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server 226 may be used to maintain data relating to historical game play and/or second chance wagering data for one or more electronic gaming devices 100 and/or other events. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Searching server may implement a search on one or more gaming devices to obtain gaming data. Searching server may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server may implement a wagering function, which may be an automatic wagering mechanism. These functions of searching server may be integrated into one or more servers.

Searching server may include one or more searching structures, one or more searching algorithms, and/or any other searching mechanisms. In general, the search structures may cover which EGMs paid out the most money during a time period, which EGMs kept the most money from players during a time period, which EGMs are the most popular (e.g., top games), which EGMs are the least popular, which EGMs have the most amount of money bet during a period, which EGMs have the highest bet volume, which EGMs are more volatile (e.g., volatility, or deviation from the statistical norms of bet volume, bet amount, pay out, etc.) during a time period, and the like. These searches may also be associated with location queries, time queries, and/or people queries (e.g., where are the electronic gaming machines that allow persistent game play options and/or allow secondary base game play mode, where are the table games that most of my friends bet on, where are my favorite EGMs, what are players betting on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., a first EGM type, a second EGM type, etc.). Searching structure may search one or more of these games. In one example, a player may utilize a searching function to find one or more games that allow external lighting game play function options and/or persistent game play options and/or to find one or more specific game types (e.g., game theme 1). The player may utilize the search feature to reload their persistent game configuration data and/or to restart a specific game type game play.

In another example, the searching structure may be based on a player's preferences, past transactional history, player input, a particular EGM, a particular casino, a particular location within a casino, game outcomes over a time period, payout over a time period, and/or any other criteria.

Figure 3:
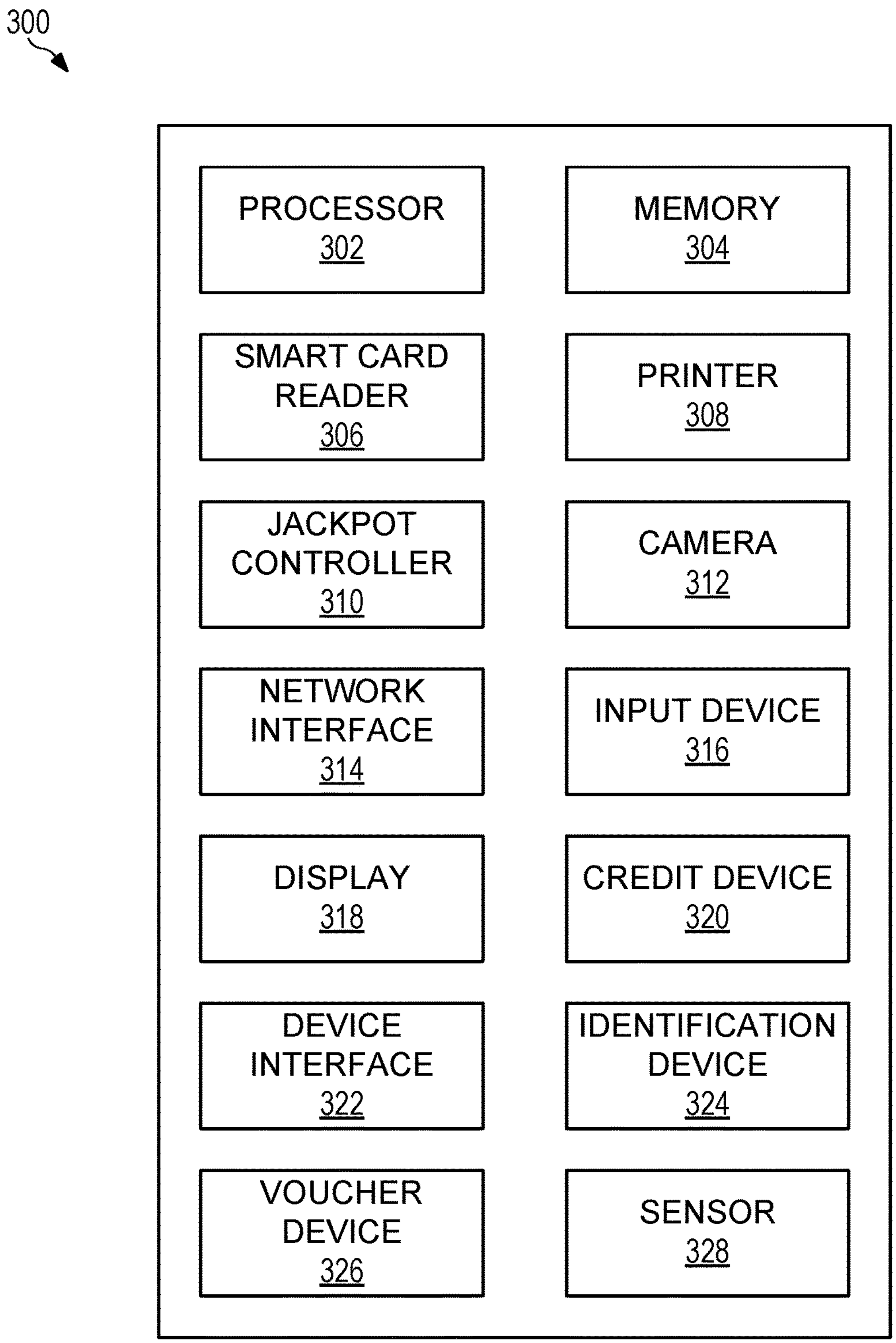
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, a voucher device 326, and/or a sensor 328.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher and/or a persistent game play receipt (and/or any other form). Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, persistent game play data receipts, second chance wager payouts, second chance wagering vouchers, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine his or her picture may be taken to include his or her image into the game play. A picture of a player may be an actual image as taken by camera 312. A picture of a player may be a computerized caricature (i.e., avatar) of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes and/or a validating procedure (e.g., persistent gaming receipt validation, etc.). For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212, and/or any other second chance wagering related server (e.g., server to confirm another event (e.g., a horse race, football game, etc.)).

Input device 316 may be mechanical buttons, electronic buttons, a touch screen, and/or any combination thereof. Input device 316 may be utilized to make a wager, to make an external lighting gaming wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one of one or more audio devices, one or more display devices, one or more electrical wires, one or more springs, one or more motors, one or more adjustable devices, and/or one or more sensors, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Sensor 328 may be one or more sensors which may be utilized to obtain data from around the gaming device, one or more player inputs, and/or utilized for security and/or maintenance purposes.

Figure 4:
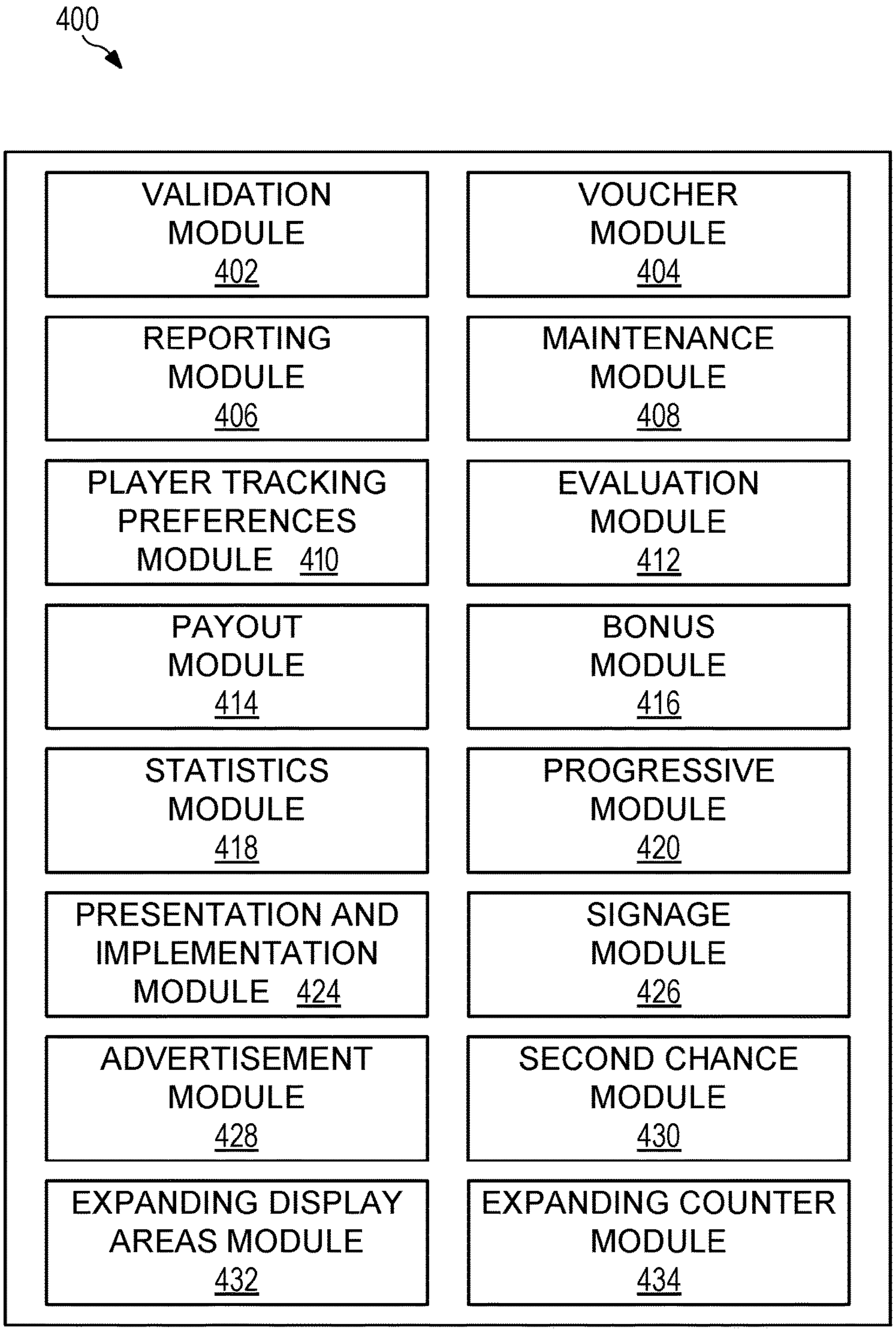
FIG. 4 is another block diagram of the electronic gaming device, according to one embodiment.

FIG. 4 shows a block diagram of memory 400, which includes various modules. Memory 400 may include a validation module 402, a voucher module 404, a reporting module 406, a maintenance module 408, a player tracking preferences module 410, an animation module, a game evaluation module 412 (e.g., base game, secondary base game, and/or bonus game), a payout module 414, a sensor module, a scene module, a sensor and scene evaluation module, a sensor and scene output module, a reference models module, an audio module, an audio device adjustment module, a display device adjustment module, a bonus module 416, a statistics module 418, a progressive module 420, a persistence game module, a presentation and implementation module 424, a tracking module, a signage module 426, an advertisement module 428, a subscription-based progressive module, a 3D gesturing module, a pseudo module, a skill-based module, a scatter module, a wild module, a mobile device module, a game configuration module, an external lighting module 430 (e.g., secondary base game), an expanding display areas module 432, a call tower module 434, an attraction module 436, and/or a synchronization module 438.

Validation module 402 may utilize data received from voucher device 326 to confirm the validity of the voucher and/or a persistent gaming data (e.g., a persistent gaming receipt validation procedure).

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Animation module may generate, compile, transmit, and/or store one or more animations and/or presentations based on one or more scene data, one or more scenes, one or more reference models, one or more game play data, one or more player profiles, and/or any combination thereof.

Game evaluation module 412 may evaluate one or more outcomes for one or more events relating to game play.

Payout module 414 may determine one or more payouts which may relate to one or more inputs received from the player, electronic gaming device 100, and/or electronic gaming system 200.

Sensor module may generate, compile, transmit, and/or store any data relating to one or more scene data, one or more scene, and/or any other sensor data. This data may include one or more gestures (e.g., body movement made by one or more players).

Scene module may generate, compile, transmit, and/or store on one or more scene data, one or more scenes, one or more reference models, one or more game play data, one or more player profiles, and/or any combination thereof.

Sensor and scene evaluation module may evaluate any data stored on, transmitted to, and/or transmitted from sensor module and scene module. Sensor and scene evaluation module may obtain data including one or more gestures (e.g., body movement made by one or more players) from sensor module and compare this data to one or more body reference models, body part reference models, device reference models, gaming device reference models, floor plan reference models, and/or any other reference models from reference models module to determine one or more actions.

Sensor and scene output module may evaluate the combined output of sensor module and scene module.

Reference models module may generate, compile, transmit, and/or store one or more body reference models, body part reference models, device reference models, gaming device reference models, floor plan reference models, and/or any other reference models which can be utilized by any of the other modules.

Audio module may generate, compile, transmit, and/or store one or more audio structures, sound wave configurations, and/or any other audio data.

Audio device adjustment module may adjust one or more audio devices. These devices may be adjusted physically (e.g., moved) and/or by changing one or more device characteristics.

Display device adjustment module may adjust one or more display devices. These devices may be adjusted physically (e.g., moved) and/or by changing one or more device characteristics.

Bonus module 416 may generate a bonus game, evaluate the results of the bonus game, trigger bonus game presentations, generate bonus game payouts, and/or display any data relating to the bonus game. A player may play a non-second chance game which includes both a base game and a bonus game but does not include a secondary base game. The base game is the first game play action which normally includes a first spinning of one or more reels and is based on a first wager. Whereas, a bonus game may be triggered (e.g., by obtaining the requirements of the bonus game—# of symbols, etc.) during the base game. There is no additional wager required for the initiation of the bonus game and when the bonus game includes free spins the one or more reels are respun for each free spin. Further, free spins may respin the one or more reels in their entirety. In another embodiment, a secondary base game (e.g., a second chance mode) may reveal one or more additional non-active reel areas after the completion of the first spin in base game play mode to allow these non-active reel areas to become active and generate one or more payouts and/or one or more bonus game initiating events. Therefore, in one example, a base game play is the first game play which requires a wager by the player to initiate base game play. In this example, a secondary base game play may be initiated when the base game play does not initiate one or more bonus games. In this example, the secondary base game play allows the base game to continue and provides an additional opportunity for the base game to activate one or more payouts and/or one or more bonus games. Further, in this example, a bonus game play may initiate a new base game without the required wager and/or provide a chance to obtain a prize without any required wager.

Statistics module 418 may be used to maintain data relating to historical game play (including second chance wagering data—(dollar amount, credit amount, spins, credits per line bet, time period, maximum win amount, one or more triggering events to stop game play, etc.)) for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play. In one example, the system, device, and/or method may track the percentage of secondary base game winning events and/or secondary base game triggering events.

Progressive module 420 may generate, transmit, compile, and/or store one or more data points relating to one or more progressives and/or subscription progressives (e.g., a progressive a player selects and pays to enter). For example, a normal progressive is where the player enters the progressive and has no choice. If the player plays game X, then they are part of the progressive. However, a subscription progressive allows the player to select whether to be part of the progressive game play or not. In other words, a player can choice to be part of progressive A for a first spin of a game play, then progressive B for a second spin of a game play, and then no progressive for a third spin of a game play on the electronic gaming device.

Persistence game module may generate, transmit, compile, and/or store one or more data points and/or presentations relating to one or more persistence gaming options and/or persistence gaming wagers.

Presentation and implementation module 424 may generate, transmit, compile, implement, and/or store one or more presentations.

Tracking module may generate, transmit, compile, and/or store one or more data points related to tracking one or more second chance wagers and/or second chance wager players.

Signage module 426 may generate, transmit, compile, initiate, and/or store one or more presentations for one or more signs.

Advertisement module 428 may generate, transmit, compile, present, implement, initiate, and/or store one or more advertisements. Advertisement module 428 may generate, compile, transmit, and/or store advertisement information relating to one or more second chance, subscription based progressive, and/or any other gaming feature. These advertisements may be presented on one or more display screens, an internet website, and/or any other advertisement avenue.

Searching module may implement a search on one or more gaming devices to obtain gaming data. Searching module may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching module may implement a wagering function, which may be an automatic wagering mechanism. These functions of searching module may be integrated into one or more servers.

Searching module may include one or more searching structures, one or more searching algorithms, and/or any other searching mechanisms. In general, the search structures may cover which EGMs paid out the most money during a time period, which EGMs kept the most money from players during a time period, which EGMs are the most popular (e.g., top games), which EGMs are the least popular, which EGMs have the most amount of money bet during a period, which EGMs have the highest bet volume, which EGMs are more volatile (e.g., volatility, or deviation from the statistical norms of bet volume, bet amount, pay out, etc.) during a time period, and the like. These searches may also be associated with location queries, time queries, and/or people queries (e.g., where are the second chance base game play functionality games, where are theme 1 gaming machines, where are the table games that most of my friends bet on, where are my favorite EGMs, what are players betting on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined. For example, a player may want to search for games that have not won a prize over $100 during the last 100 spins. The search may look at the first 10 devices and only find two gaming options. Therefore, the search would continue until five gaming options where discovered which meant that 56 devices needed to be examined.

In another example, the searching structures may be based on one or more specific games (e.g., a first EGM type, a second EGM type, etc.). Searching structure may search one or more of these games.

In another example, the searching structure may be based on a player's preferences, past transactional history, player input, a particular EGM, a particular casino, a particular location within a casino, game outcomes over a time period, payout over a time period, and/or any other criteria.

Wild module may generate a wild game, evaluate the results of the wild game, trigger wild game presentations, generate wild game payouts, and/or display any data relating to the wild game. Further, wild module may determine one or more outcomes of one or more interactions (e.g., collisions of one or more symbols).

Scatter module may generate a scatter game, evaluate the results of the scatter game, trigger scatter game presentations, generate scatter game payouts, and/or display any data relating to the scatter game.

Subscription-based progressive module may generate, compile, transmit, and/or store one or more subscription based progressive structures and/or any other data relating to one or more subscription based progressive structures and/or subscription based second chance base game play.

3D gesturing module may generate, compile, transmit, and/or store one or more data points, presentations, reference modules, and/or structure relating to any aspect of 3D gesturing.

Pseudo module may generate, transmit, compile, and/or store one or more data points and/or presentations relating to one or more pseudo gaming options and/or pseudo gaming wagers.

Skill-based module may generate, compile, store, and/or transmit one or more skill-based structures and/or one or more skill-based tournament structures. Skill-based evaluation module may evaluation one or more outcomes of one or more skill-based games and/or skill-based tournament games.

Mobile device module may generate, compile, store, and/or transmit one or more data relating to the mobile device. Further, mobile device module may interact and communicate with mobile device to transfer and/or receive data from and/or to mobile device.

Game configuration module may generate, compile, store, and/or transmit one or more game configuration data. Further, mobile device may also include a game configuration module.

Installation verification module may verify the installation parameters on one or more of audio devices, one or more display devices, one or more electrical wires, one or more springs, one or more motors, one or more adjustable devices, and/or one or more sensors to one or more reference data points. Installation verification module may generate a warning when the data points are outside of a specific parameter range. One or more warnings may be transmitted to an external device, a server, a mobile device, and/or a warning display on electronic gaming device 100 based on the verification data.

Locking module may control the locking mechanism for one or more audio devices, one or more display devices, one or more electrical wires, one or more springs, one or more motors, one or more adjustable devices, and/or one or more sensors. Locking module may control any locking mechanism for electronic gaming device 100. Locking module may generate a warning when a locking data point is outside of a specific parameter. These warnings may be transmitted to an external device, a server, a mobile device, and/or a warning display on electronic gaming device 100.

It should be noted that one or more modules may be combined into one module. Further, there may be one evaluation module where the determined payout does not depend on whether there were any wild symbols, scatter symbols, base game play, secondary base game play, bonus game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

In one embodiment, a system, device, and/or method may offer bets that are dependent on a function of a primary slot machine and/or any other device. For example, a second window may open on a primary game screen (and/or any other display and/or any other output device) that offers a wager on the outcome of the next game (e.g., spin, etc.). In one example, the wagering option may be whether the next game (e.g., spin, etc.) will be a winner or a loser. The player may make the wager and play the game. If the results of the game play is consistent with the player's bet, the player wins and is awarded a prize. In one example, the gaming system does not determine the outcome of the future game play before the wager and/or odds are accepted and/or created. In this example, this gaming option may not need to be approved as a gaming device and may not be subject to the rigorous standards of a regulated gaming device. In this example, an accounting system that accepts bets and pays winning bets may be utilized. In these examples, the player is betting on some characteristic of slot machine play and/or another verifiable event outcome.

In one example, the types of wagers that can be accepted are not relegated to the outcomes of the player's slot machine. In various examples, the possibilities for betting options are related to the events and/or occurrences that can be observed, recorded, and/or verified by the system. For example, one wagering option may be whether the progressive jackpot will be triggered and/or hit in the next 3 minutes (specific time period) and/or next 10 spins (specific spin number). In another example, one wagering option may be whether another person (e.g., a friend, a wife, a husband, a stranger, etc.) will win on the next spin. In this example, a loyalty card (and/or some other identification method) may be utilized to identify the player and/or a specific gaming device identification number may be utilized. In another example, one wagering option may be whether the mystery progressive will be hit (e.g., won) before it reaches a certain number (e.g., $300, $1,000, etc.).

In another example, the credits for the wager and the winnings may be moved to and from the primary gaming device through automatic fund transfer ("AFT") transactions from the system. Further, the system may act as the book maker for the bets. The system may meter and account for all transfers in tota and by each game in which pseudo wagers have been made.

In another example, the system may determine the one or more event outcomes via SAS communications, communications with a class II server, and/or other communication protocol and/or other forms of communication methods. The system may record one or more outcomes for the wager and relays the results to the player and/or one or more EGMs. In addition, the system may allow for a ticket to be printed as a pseudo wager receipt but this may not be necessary as the pseudo wager information is already stored on the system. In addition, in cases where the pseudo wager cannot be completed, the pseudo wager may be returned to the player or to the player's account. In various examples, one or more rules may be implemented for pseudo wagers that depend on an event occurring over a time period and/or as other events happen to prevent the player from trying to cancel wagers as a limit is approached. For example, a player may want to cancel a bet that the next four spins will be winner once the second spin was not a winner. However, the system may not allow this.

An external lighting module 430 may generate, transmit, compile, and/or store one or more data points and/or presentations relating to one or more external lighting features and/or external lighting functions. External lighting module 430 may evaluate one or more outcomes for one or more events relating to external lighting game play. Further, external lighting module 430 may determine one or more outcomes of one or more interactions. External lighting module 430 may generate one or more presentations for one or more externa lighting functions.

Dynamic second chance module may generate, transmit, compile, and/or store one or more data points and/or presentations relating to one or more dynamic second chance features and/or dynamic second chance functions where the dynamic second chance is related to one or more stacking functions.

In one example, a dynamic stack may include two identical symbols being located adjacent to each other. Further, the dynamic stack may increase in size from spin-to-spin; decrease in size from spin-to-spin; change symbols from spin-to-spin (e.g., transition from a first symbol for a first spin to a second symbol for a second spin); change from a first symbol to a non-first symbol from spin-to-spin; disappear and reappear from spin-to-spin; change shape from spin-to-spin (e.g., go from an L shape to an X shape from a first spin to a second spin); turn on and off from a first spin to a second spin; and/or any combination thereof. In this example, the expanding sections (e.g., secondary base game play mode) only relate to the areas where one or more stacking symbols were located.

Expanding display areas module 432 may generate, transmit, compile, and/or store one or more data points and/or presentations relating to one or more expanding display areas utilized with the second chance base game (e.g., secondary base game) features and/or functions. In addition, expanding display areas module 432 may generate, transmit, compile, and/or store one or more data points and/or presentations relating to one or more expanding display areas utilized with bonus game.

Call tower module 434 may generate, transmit, compile, and/or store one or more data points and/or presentations relating to the call tower functionality.

Figure 28:
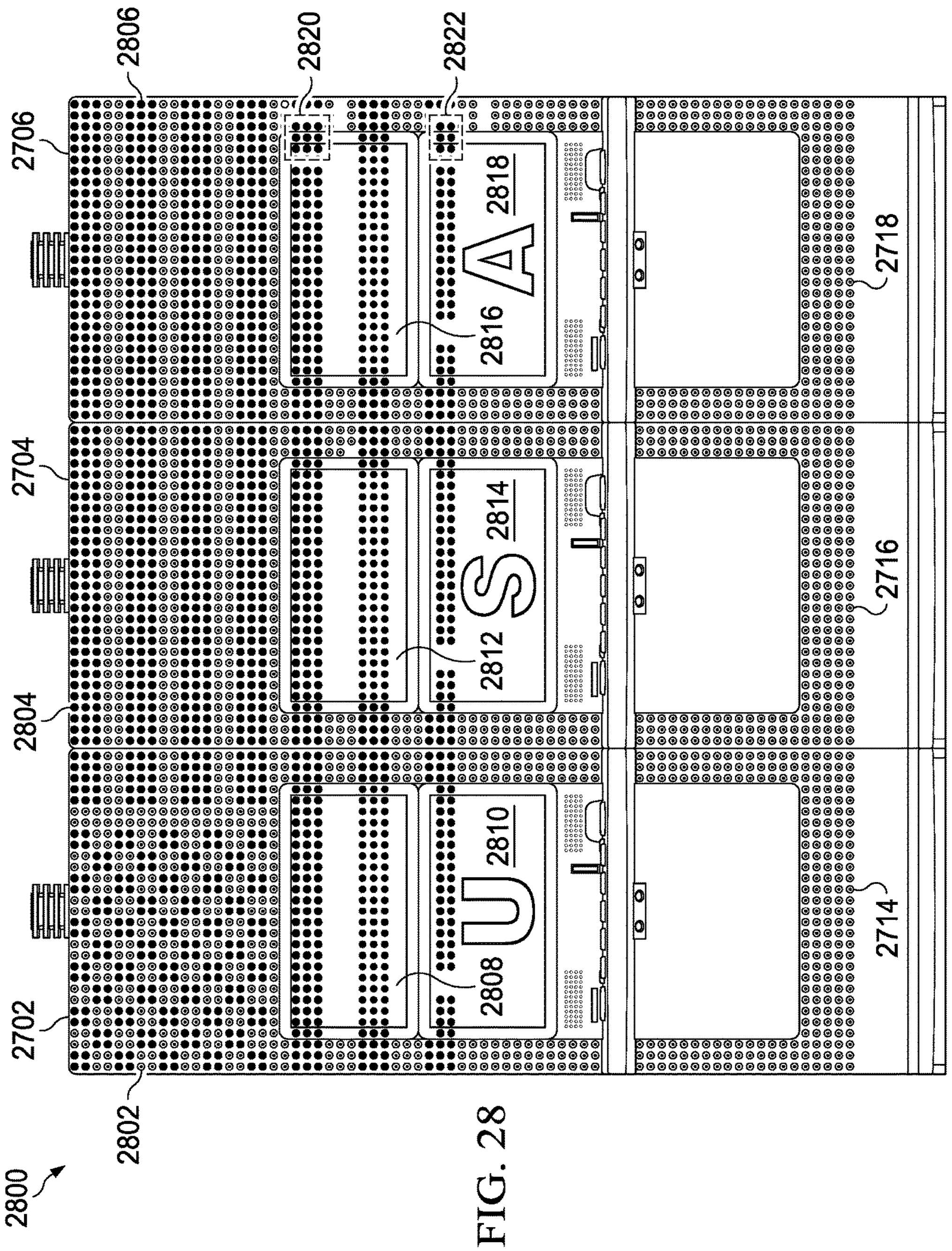
FIG. 28 is another illustration of an external lighting functionality on a gaming device, according to one embodiment.

Attraction module 436 may generate, transmit, compile, and/or store one or more data points and/or presentations relating to one or more attraction modes. For example, the attraction module 436 on one or more gaming devices may be utilized together and/or separately to initiate one or more attraction presentations on one or more starwall areas (which may be located on more than one gaming device). In one example shown in FIG. 36, one or more starwall areas may be utilized to initiate one or more presentations to bring a player over to one or more gaming devices. Further as shown in FIG. 28, one or more starwall areas along with one or more border areas and/or one or more display screens may be utilized to initiate one or more presentations to bring a player over to one or more gaming devices.

Synchronization module 438 may generate, transmit, compile, and/or store one or more data points and/or presentations relating to one or more synchronization functionalities. For example, the synchronization module of one or more gaming devices may be utilized to synchronize one or more presentations (e.g., images and sounds) on one or more starwall areas along with one or more border areas and/or one or more display screens on one or more gaming devices.

Figure 5:
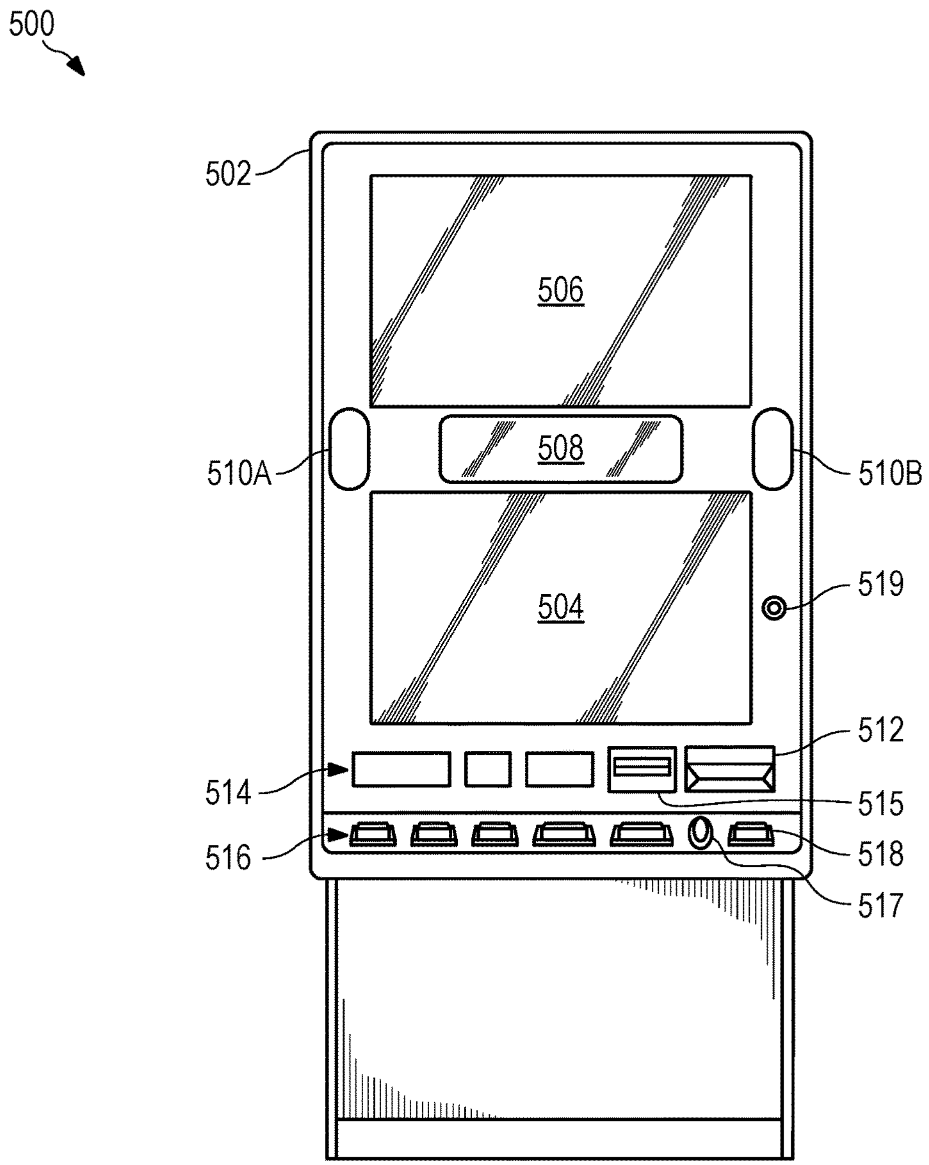
FIG. 5 is an illustration of game play on a gaming device, according to one embodiment.

In FIG. 5, an illustration of a gaming device cabinet 500 is shown, according to one embodiment. A gaming device 502 may include a main game display 504, an overhead display 506, a side display 508, a left speaker 510A, a right speaker 510B, one or more output devices (e.g., a ticket in/ticket out device 512), and/or one or more input devices 516 (e.g., buttons, bill validators, etc.). In one example, overhead display 506 includes a leadership board sponsor and/or a ranking of tournament players. In this example, the XYZ company has sponsored the leadership board and the leadership board states "XYZ LEADER BOARD." In another example, leadership display may include data relating to one or more tournaments, such as, the time remaining (e.g., 1 HOUR 31 MINUTES REMAINING). In this example, side display 508 may display a current mode of operation. For example, a current mode may be a tournament mode, a normal mode, a practice mode, a team mode, an individual mode, a base game mode, a base game with a secondary base game mode, a base game mode with a bonus game, a base game with a secondary base game and a bonus game mode, any combination thereof, etc.

Figure 6A:
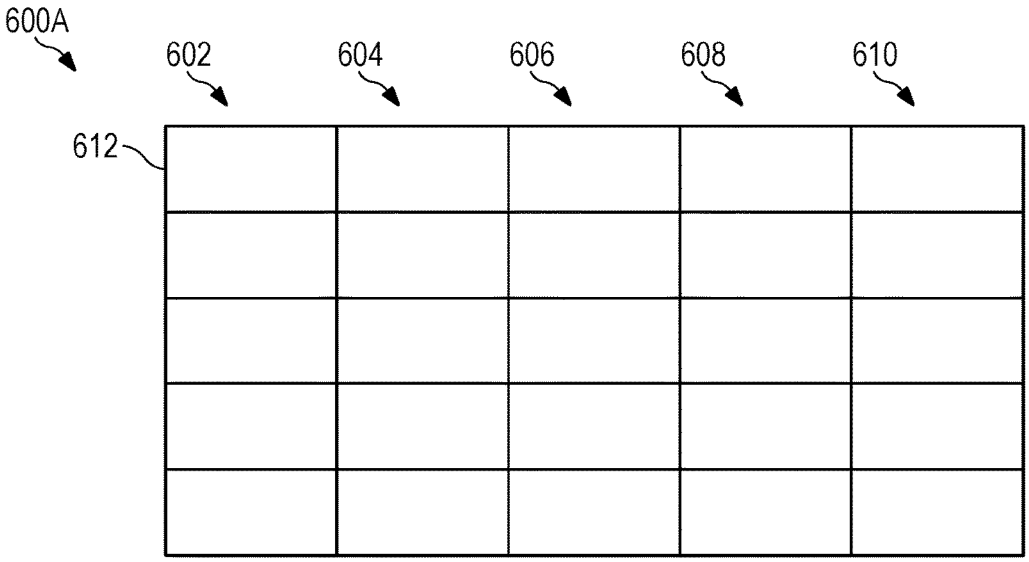
FIG. 6A is an illustration of a base game, a second chance base game, and/or a bonus game structure on a gaming device, according to one embodiment.

In FIG. 6A, another illustration of second chance base game play on a gaming device is shown, according to one embodiment. In this example, the display matrix is a 5 by 5 grid. However, any size grid N×M may be utilized where N=1 to any number and M=1 to any number. For example, the grid may be 3×4; 4×5; 5×4; 5×2; 7×9; 100×50, etc.

Figure 6B:
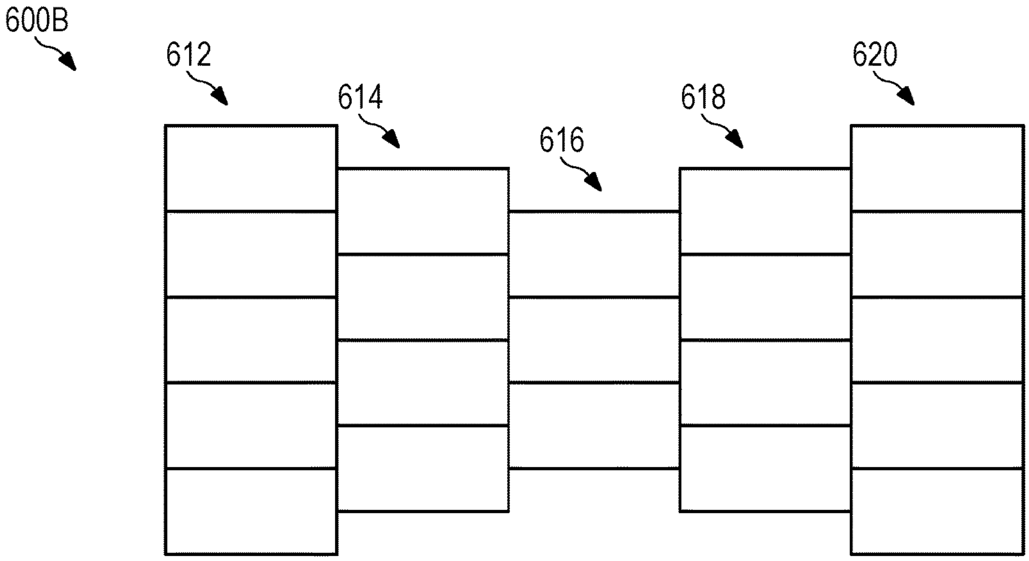
FIG. 6B is another illustration of a base game, a second chance base game, and/or a bonus game structure on a gaming device, according to one embodiment.

In FIG. 6B, another illustration of second chance base game play on a gaming device is shown, according to one embodiment. In this example, the display matrix includes a first column 612 which has 5 rows, a second column 614 which has 4 rows, a third column 616 which has 3 rows, a fourth column 618 which has 4 rows, and a fifth column 620 which has 5 rows. In should be noted that display matrix may have any number (e.g., 1 to N) of columns with any number of rows (e.g., 1 to N).

Figure 6C:
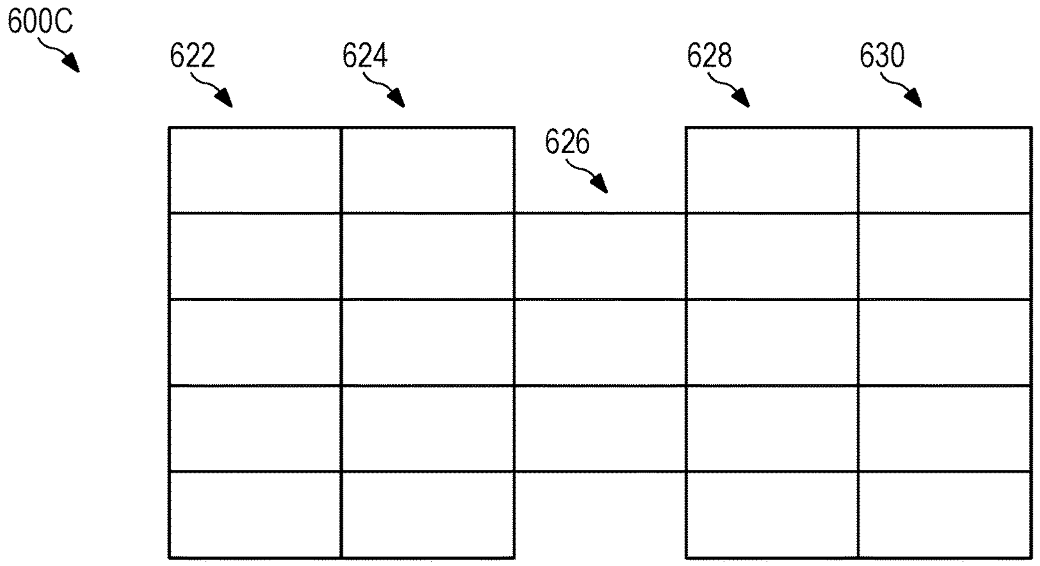
FIG. 6C is another illustration of a base game, a second chance base game, and/or a bonus game structure on a gaming device, according to one embodiment.

In FIG. 6C, another illustration of second chance base game play on a gaming device is shown, according to one embodiment. In this example, the display matrix includes a first column 622 which has 5 rows, a second column 624 which has 5 rows, a third column 626 which has 3 rows, a fourth column 628 which has 5 rows, and a fifth column 630 which has 5 rows.

Figure 6D:
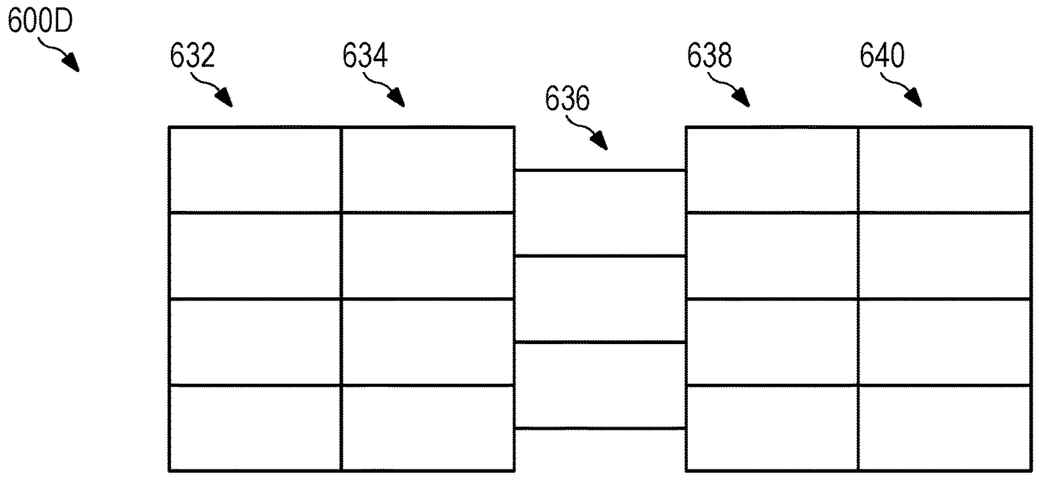
FIG. 6D is another illustration of a base game, a second chance base game, and/or a bonus game structure on a gaming device, according to one embodiment.

In FIG. 6D, another illustration of second chance base game play on a gaming device is shown, according to one embodiment. In this example, the display matrix includes a first column 632 which has 4 rows, a second column 634 which has 4 rows, a third column 636 which has 3 rows, a fourth column 638 which has 4 rows, and a fifth column 640 which has 4 rows.

Figure 6E:
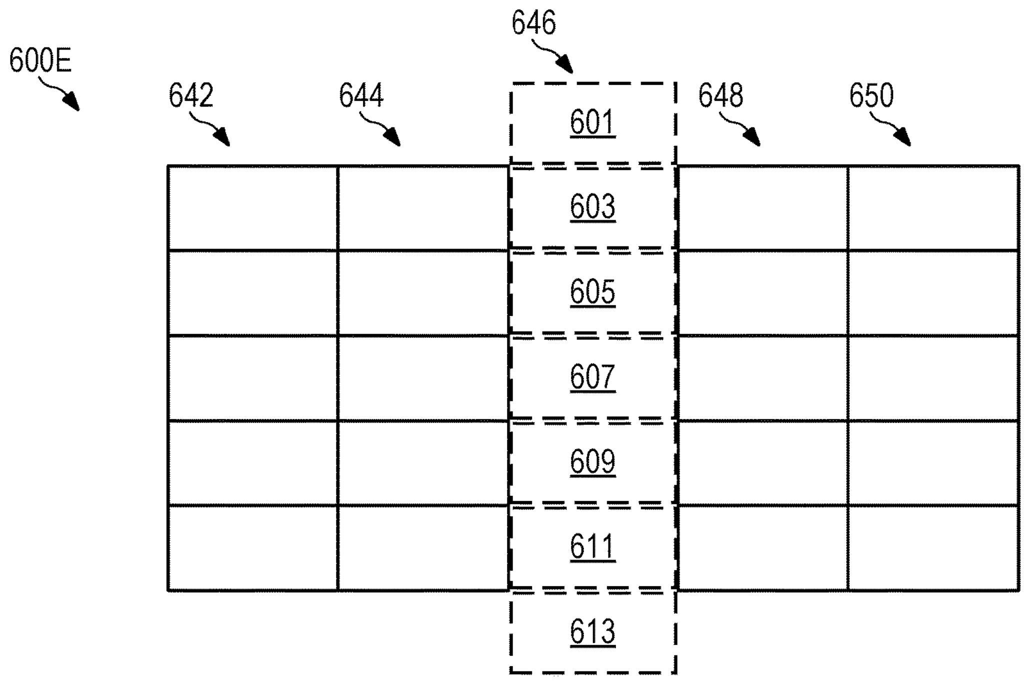
FIG. 6E is another illustration of a base game, a second chance base game, and/or a bonus game structure on a gaming device, according to one embodiment.

In FIG. 6E, another illustration of second chance base game play on a gaming device is shown, according to one embodiment. In this example, the display matrix includes a first column 642 which has 5 rows, a second column 644 which has 5 rows, a third column 646 which has 3 rows, a fourth column 648 which has 5 rows, and a fifth column 650 which has 5 rows. In this example, third column 646 can expand by any number of display units (e.g., 1-N) which may be based on a triggering event, the number of credits wagered, a bonus game, and/or any other criteria. In this example, third column 646 has expanded by four display units. For example, one or more columns and/or display areas may expand based on a maximum wager, a number of lines wagered on, a length of time playing a wagered amount (e.g., maximum wager, number of lines, etc.), a bonus game trigger, the time of day of game play, a loyalty program, a second chance triggering event, etc.

Figure 6F:
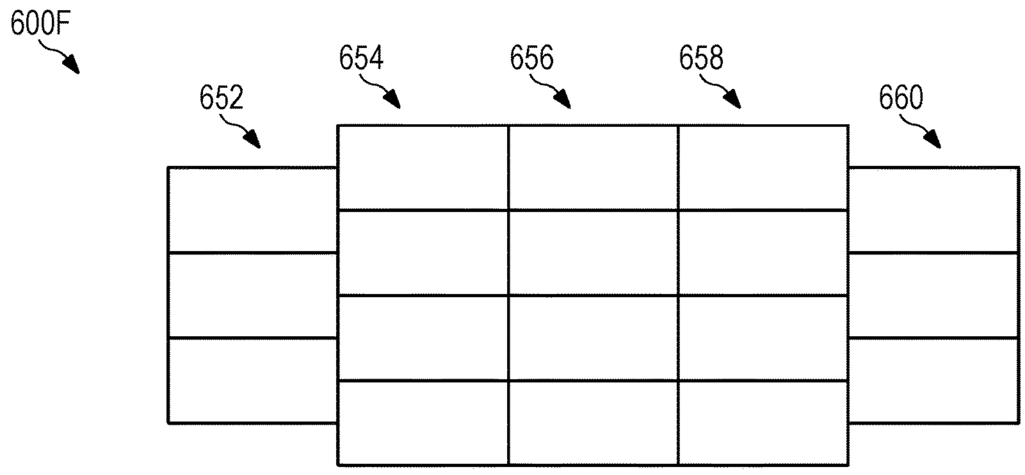
FIG. 6F is another illustration of a base game, a second chance base game, and/or a bonus game structure on a gaming device, according to one embodiment.

In FIG. 6F, another illustration of second chance base game play on a gaming device is shown, according to one embodiment. In this example, the display matrix includes a first column 652 which has 3 rows, a second column 654 which has 4 rows, a third column 656 which has 4 rows, a fourth column 658 which has 4 rows, and a fifth column 660 which has 3 rows. In should be noted that by increasing and/or decreasing the size of a column the probabilities of winning events can be altered (e.g., increased, decreased, enhanced, blocked, etc.).

Figure 6G:
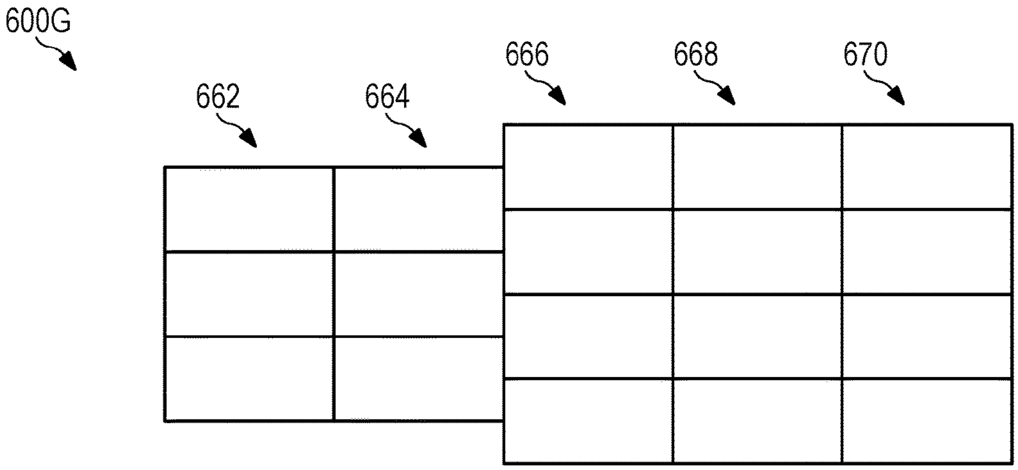
FIG. 6G is another illustration of a base game, a second chance base game, and/or a bonus game structure on a gaming device, according to one embodiment.

In FIG. 6G, another illustration of second chance base game play on a gaming device is shown, according to one embodiment. In this example, the display matrix includes a first column 662 which has 3 rows, a second column 664 which has 3 rows, a third column 666 which has 4 rows, a fourth column 668 which has 4 rows, and a fifth column 670 which has 4 rows.

Figure 6H:
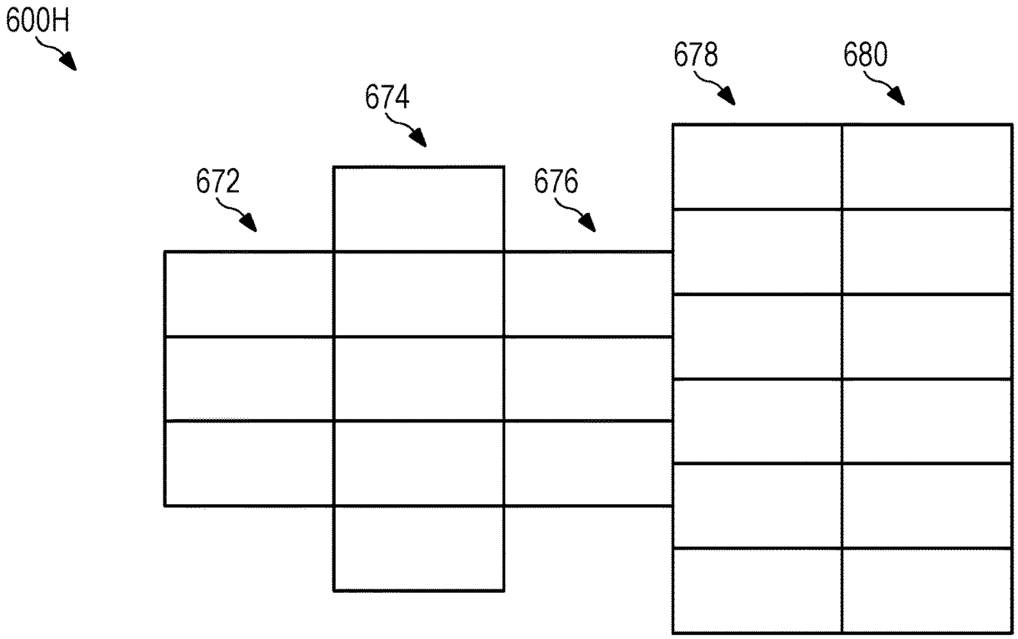
FIG. 6H is another illustration of a base game, a second chance base game, and/or a bonus game structure on a gaming device, according to one embodiment.

In FIG. 6H, another illustration of second chance base game play on a gaming device is shown, according to one embodiment. In this example, the display matrix includes a first column 672 which has 3 rows, a second column 674 which has 5 rows, a third column 676 which has 3 rows, a fourth column 678 which has 6 rows, and a fifth column 680 which has 6 rows.

Figure 6J:
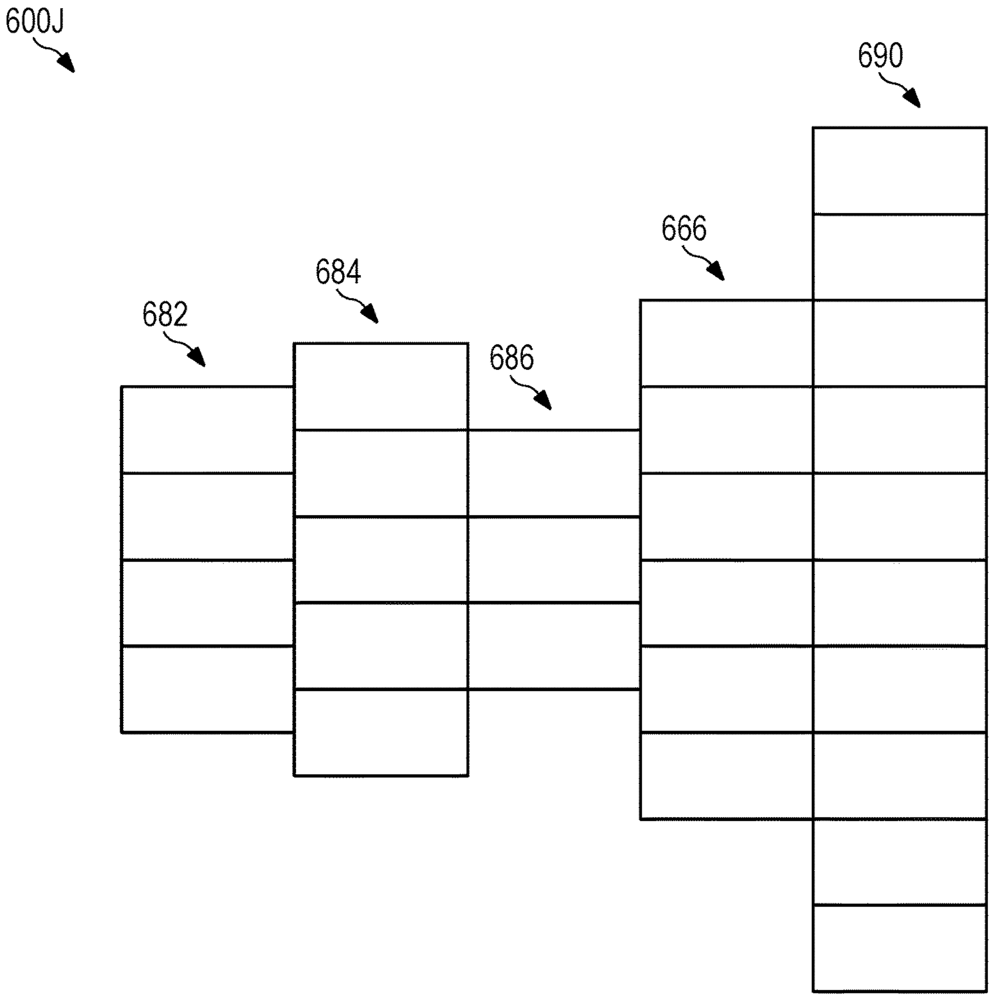
FIG. 6J is another illustration of a base game, a second chance base game, and/or a bonus game structure on a gaming device, according to one embodiment.

In FIG. 6J, another illustration of second chance base game play on a gaming device is shown, according to one embodiment. In this example, the display matrix includes a first column 682 which has 4 rows, a second column 684 which has 5 rows, a third column 686 which has 3 rows, a fourth column 688 which has 6 rows, and a fifth column 690 which has 10 rows. It should be noted that all of the symbols areas in FIGS. 6A to 6J have remain constant in size and shape but in other embodiments may vary in size and shape. Further, FIGS. 6A-6J may be utilized with any payline structure and/or any other disclosure in this document.

Figure 7:
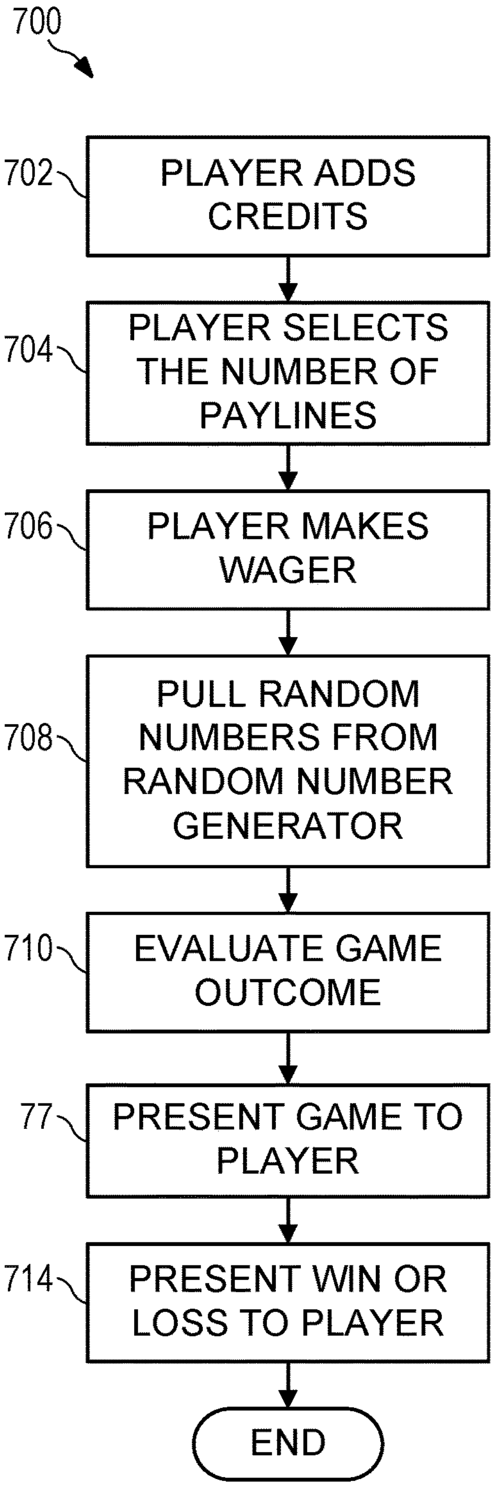
FIG. 7 is a game play flow diagram, according to one embodiment.

In FIG. 7, a process flowchart of one example of a primary game play 700 on an electronic gaming system is shown, according to one embodiment. The method may include the step of a player adding credit to the electronic gaming system (step 702). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 704, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 706, the player makes a wager on the game. In one embodiment, the wager may be a multiple of the number of paylines selected at step 704. In another embodiment, the wager may not be a multiple of the number of paylines selected at step 704. In a further embodiment, the wager may include a side-wager (e.g., ante bet), which may, in one example of such an embodiment, be used to make the player eligible to be awarded the extra functionality discussed above. It should be appreciated that in some embodiments, the order of steps 704 and 706 may not be critical, and so for example, a player can select the wager they wish to place, and then select the number of paylines they want it applied to, and that these embodiments are expressly contemplated as being within the scope of the present disclosure.

Continuing to step 708, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 710 and 712, the gaming system utilizes the random numbers pulled at step 708 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 714, the win or loss outcome may be identified for the player. In one embodiment, this step can include additional messaging, which provides information related to the win or lose, such as why the player won or lost. In another embodiment, this step can include identification of the amount of any award earned by the player.

Figure 8:
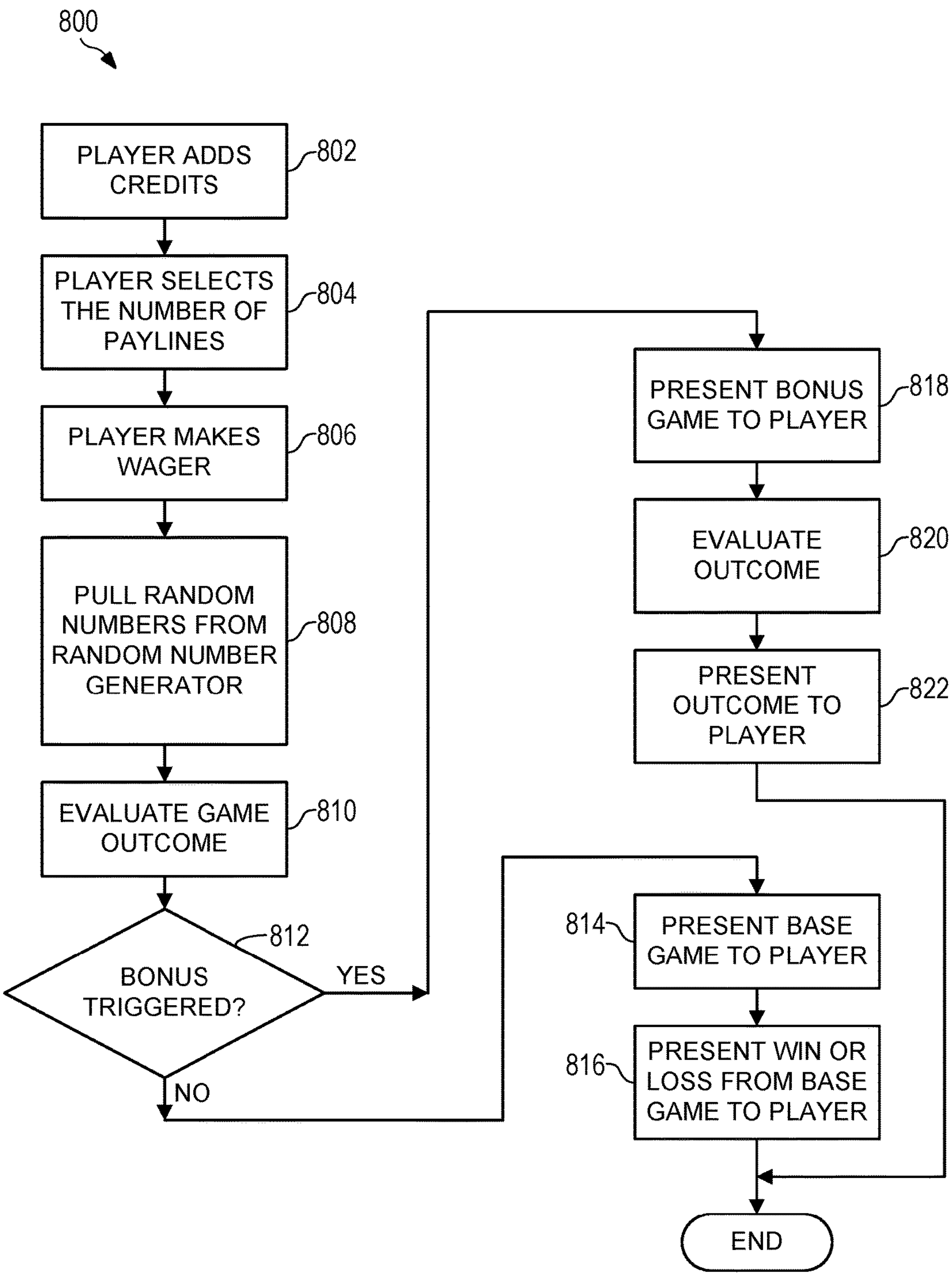
FIG. 8 is a game play flow diagram, according to one embodiment.

FIG. 8 is a process flowchart of one example of a combined primary and secondary game play 800 on an electronic gaming system, according to one embodiment. The method may include the step of a player adding credit to the electronic gaming system (step 802). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 804, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 806, the player makes a wager on the game. In one embodiment, the wager may be a multiple of the number of paylines selected at step 804. In another embodiment, the wager may not be a multiple of the number of paylines selected at step 804. In a further embodiment, the wager may include a side-wager, which may, in one example of such an embodiment, be used to make the player eligible to be awarded the extra functionality discussed above. It should be appreciated that in some embodiments, the order of steps 804 and 806 may not be critical, and so for example, a player can select the wager they wish to place, and then select the number of paylines they want it applied to, and that these embodiments may be expressly contemplated as being within the scope of the present disclosure.

Continuing to step 808, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 810, the gaming system utilizes the random numbers pulled at step 808 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 812, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the 2nd, 3rd and 4th reel. In another example, the bonus game may be triggered if matching symbols are displayed on the 1st, 2nd and 3rd reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 814, where the base game may be fully presented to the player. As discussed above, the orders of step 810, 812, and 814 can be changed without affecting the novel concepts disclosed herein.

At step 816, the win or loss outcome of the primary game may be identified for the player. In one embodiment, this step can include additional messaging, which provides information related to the win or lose, such as why the player won or lost. In another embodiment, this step can include identification of the amount of any award earned by the player If it is determined at step 812 that a bonus or secondary game was triggered, then process 800 continues to step 818, where the secondary game may be presented to the player. As discussed above, there are numerous ways to present the secondary or bonus game to the player.

At steps 820 and 822, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player. In one embodiment, instead of the process 800 ending after step 822, the process continues to step 814 so as to finalize the primary game outcome presentation to the player.

In one example, a patron of a game may want to take a break and come back on any machine on the floor and continue with the same game play and/or game configuration. Once a patron decides to take a break he/she activates the persistent game play feature using some action similar to a button activation which may record the persisting information including the game title, the denomination, pay lines, credit per lines, his current credits, any other bonus information, and/or any progressive information. In one example, after recording this information the device, system, and/or method may generate a unique number and/or any other information which identifies the state recorded which may be printed on a receipt and/or stored on a magnetic card based on the current setup. This may be further secured by providing an additional PIN number displayed which is required to be used to bring back the game state. Further, once he/she goes back to play, the machine may have an option to restore his/her session. Once the receipt and/or card is fed in the device, the system may validate the unique number or grid and optionally the PIN and/or biometric information and bring back and/or restore and/or load the previous game with the persisted title, denomination, payline, credit per line data, and/or the current available credits. This will enable the patron to continue to play from the prior saved state where he/she broke and/or stopped playing in the previous session.

In another example, the paytable may be transferred from the EGM to another device (e.g., mobile device, etc.). Further, jurisdictional information may be utilized to modify the saved persistent game play function. For example, a player may move from one jurisdiction to another which may require that the saved persistent game play be modified. In one example, a player may move from Las Vegas to Atlantic City which would require that the game configuration be modified.

In one example, a player tracking can be combined with a persistent game card to form a player tracking/persistent game card. In one example, the EGM may generate a greater number of random numbers (e.g., RNG) than would be needed for the persistent game play to ensure that enough gaming outcomes are transferred from the EGM to the mobile device. In this example, random numbers from 1-1000 may be generated for a second chance base game play player which may be utilized on the mobile device while a second player playing on the EGM may start with random number 1001. In another example, bonuses, additional credits, additional spins, and/or any other reward may be utilized to entice a player to transfer game play to their mobile device and continue playing instead of not playing during their break (e.g., lunch, etc.).

In one embodiment, the electronic gaming device may include a plurality of reels. The plurality of reels includes one or more areas. The electronic gaming device may include a memory where the memory includes one or more persistent game play modules. The electronic gaming device may include a processor where the processor may generate one or more symbols to be located in the one or more areas. The processor may generate one or more persistent game play data and to transfer the one or more persistent game play data.

In another example, the processor may generate a ticket which includes at least one of the one or more persistent game play data. Further, the processor may restart game play at a saved state based on at least one of the one or more persistent game play data. In addition, the processor may transfer at least one of the one or more persistent game play data to a magnetic card. In another example, the processor may restart game play at a predetermined phase based on at least one of the one or more persistent game play data. Further, the processor may transfer at least one of the one or more persistent game play data to a mobile device. In addition, the processor may initiate game play with a saved configuration based on at least one of the one or more persistent game play data. In one example, the processor may transfer game play data to a mobile device where the mobile device is configured to initiate a gaming session based on the transferred game play data. In addition, the processor may place the electronic gaming device into a reserved state based on the transferred persistent game play data. Further, the processor may initiate a warning based on reserved state becoming unreserved within a predetermined time period.

In another embodiment, a method of providing game play via an electronic mobile device may include generating via one or more processors one or more persistent game play data and transferring via the one or more processors the one or more persistent game play data.

The method may also include generating a ticket which includes at least one of the one or more persistent game play data; restarting game play at a saved state based on at least one of the one or more persistent game play data; transferring at least one of the one or more persistent game play data to a magnetic card; restarting game play at a predetermined phase based on at least one of the one or more persistent game play data; and/or transferring at least one of the one or more persistent game play data to a mobile device.

In another embodiment, the electronic gaming system may include a server including a server processor and a server memory. The system may include a display device including a plurality of reels where the plurality of reels includes one or more areas. The server memory includes one or more persistent game play structures and the server processor may generate one or more symbols to be located in the one or more areas. The server processor may generate one or more persistent game play data and to transfer the one or more persistent game play data.

Further, the server processor may generate a ticket which includes at least one of the one or more persistent game play data. In addition, the server processor may transfer at least one of the one or more persistent game play data to a magnetic card. The server processor may transfer at least one of the one or more persistent game play data to a mobile device.

Figure 9:
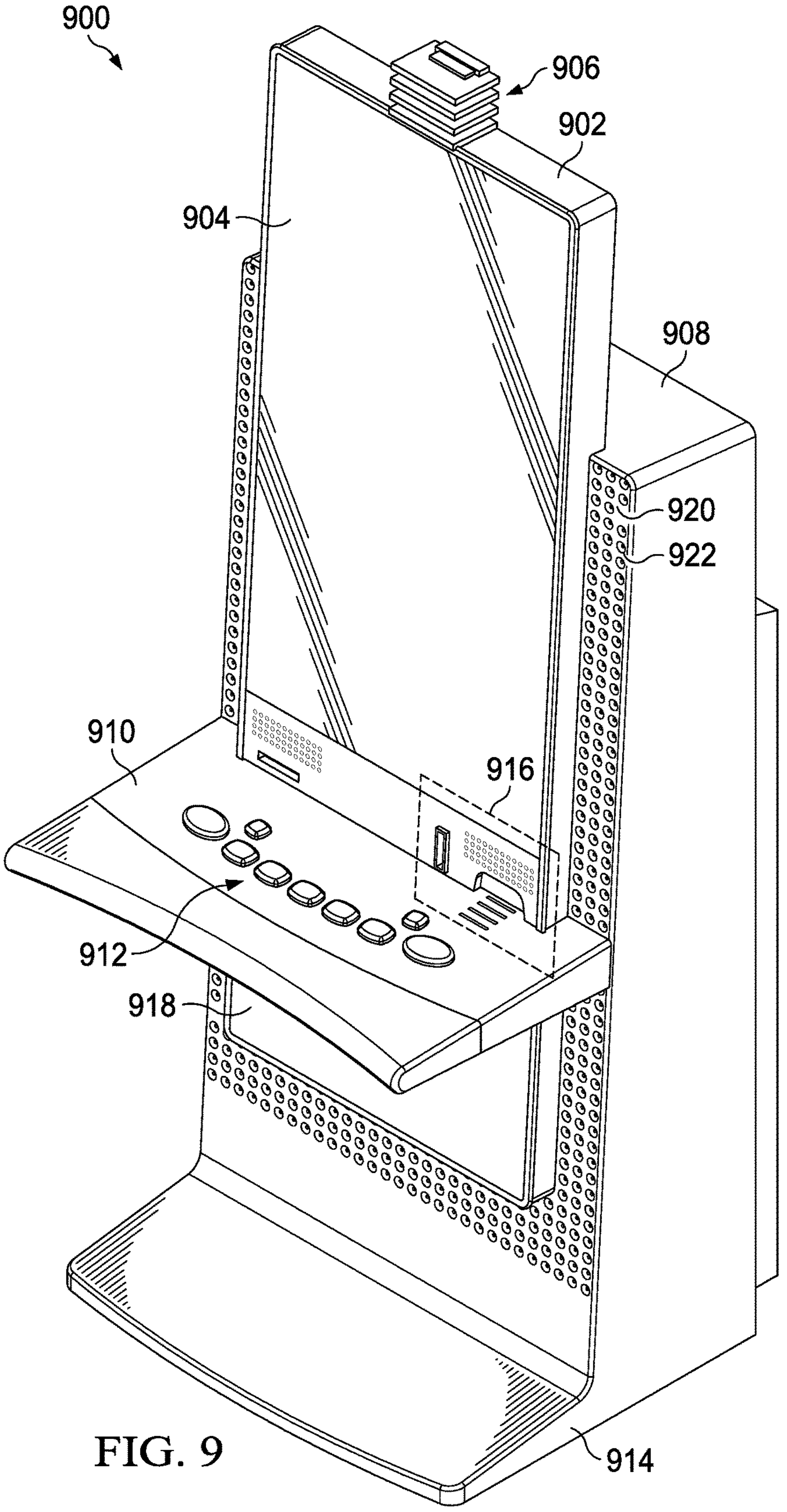
FIG. 9 is an illustration of an external lighting functionality on a gaming device, according to one embodiment.

In FIG. 9, an illustration of an external lighting functionality on a gaming device is shown, according to one embodiment. A first image 900 may include an electronic gaming device 902 where the electronic gaming device 902 includes a display screen 904, a game tower 906, a cabinet 908, a game deck area 910, one or more input devices 912, a base area 914, one or more money transferring devices 916, a bottom display area 918, an external wall of lights area 920, and one or more light sources 922. In one example, the display screen 904 may be utilized for a base slot machine type game which utilizes one or more paylines. The base slot machine type game may determine winning and/or non-winning outcomes based on a random number generating function. Further, there may be one or more bonus game associated with game play. In addition, the one or more paylines may be formed on the one or more digital display areas, the one or more mechanical reels, the one or more digital reels, and/or any combination thereof. In another example, the game tower 906 may be utilized to alert one or more casino employees that the gaming device requires attention, the player needs assistances, and/or one or more functions required for this gaming device. Further, the one or more money transferring devices 916 may be utilized to transfer monies into the gaming device and/or out of the gaming device. In one example, the external wall of lights area 920 includes one or more light sources 922. This external wall of lights area 920 may be utilized in normal game play (e.g., as part of the base slot machine type game and/or any bonus game—see FIGS. 23-25 and 33-35), in a game play attraction mode (see FIGS. 28 and 36-37), in a message announcement mode (see FIGS. 38-39), and/or any combination thereof. In various examples, the display screen 904 may be any size and/or shape. In one example, the display screen 904 is rectangular shape and is 42 inches in length. In various examples, the display screen 904 may be any size and/or shape. In another example, there may be 498 LEDs utilized as the one or more light sources 922. In various examples, the number of LEDS and/or lighting sources (e.g., 1, 2, . . . , 400, 401, 402, . . . , 500, 501, 502, 503, . . . , 600, 601, 602, 603, 604, . . . , and/or 1,000).

Figure 10:
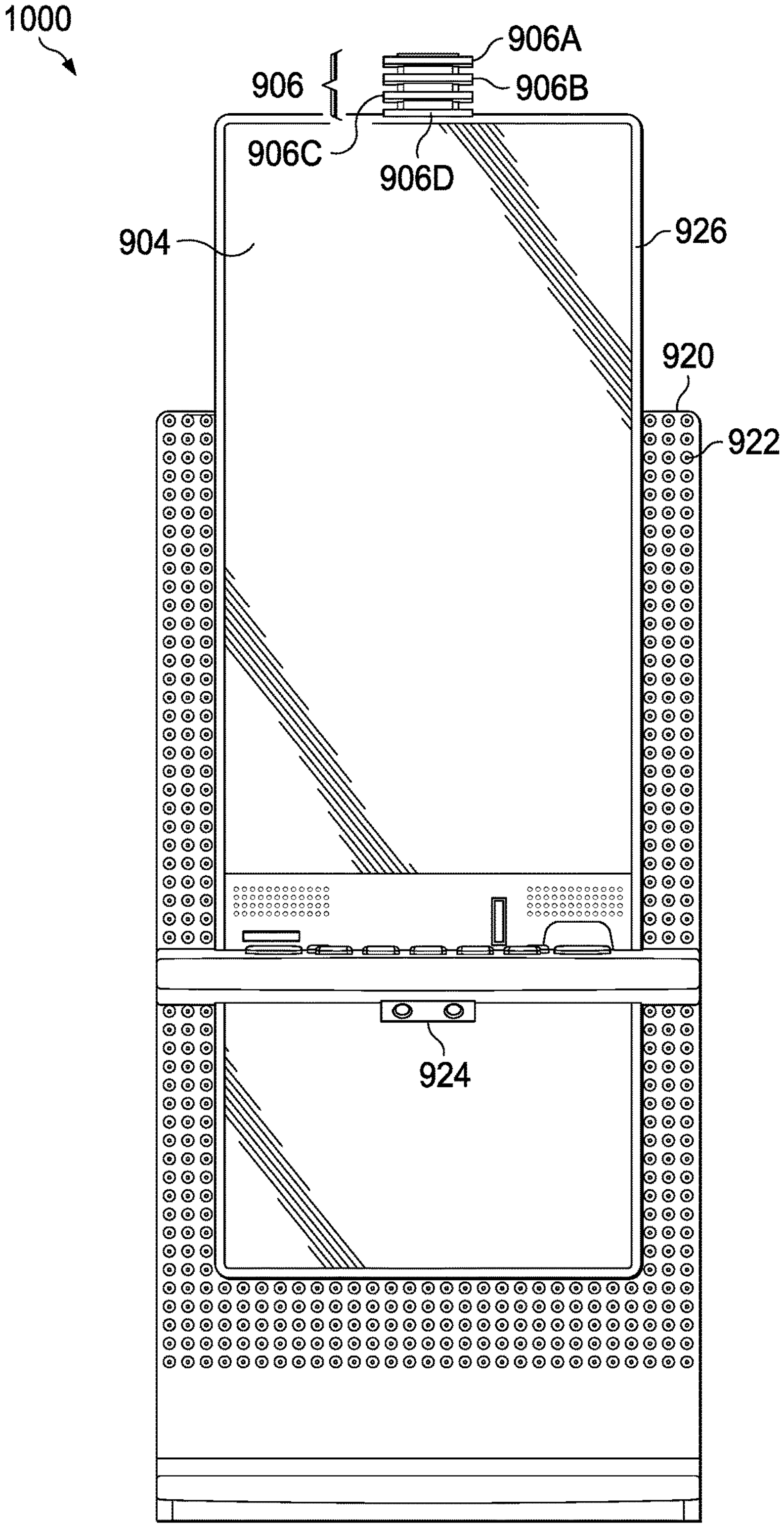
FIG. 10 is another illustration of an external lighting functionality on a gaming device, according to one embodiment.

In FIG. 10, another illustration of an external lighting functionality on a gaming device is shown, according to one embodiment. A second image 1000 may include electronic gaming device 902 with display screen 904 and a ring 926 (e.g., a border area) where the ring 926 may go around the entire display screen 904, a portion of the display screen 904, around the entire external wall of lights area 920, a portion of the external wall of lights area 920, and/or any other area on the electronic gaming device 902 (see area under game deck area 910). In one example, the ring 926 may include 125 LEDS (and/or 50, 51, 52, . . . , 199, and 200). In addition, one or more sensors and/or light sources 924 may be positioned under the game deck area 910. Further, the game tower 906 may include a light source channel 906A (where light is channeled from the light source (not shown) to one or more display areas (e.g., display decks), a first light area (e.g., a top deck or plane) 906B, a second light area (e.g., a middle deck or plane) 906C, and/or an Nth light area (e.g., a lower deck or plane) 906D. In one example, one or more of the first light area 906B, second light area 906C, and/or the Nth light area 906D may be separated by material which blocks the light coming from the light source channel 906A which creates the lighting effect that one or more of the first light area 906B, second light area 906C, and/or the Nth light area 906D are stand-alone images and/or floating images.

Figure 11:
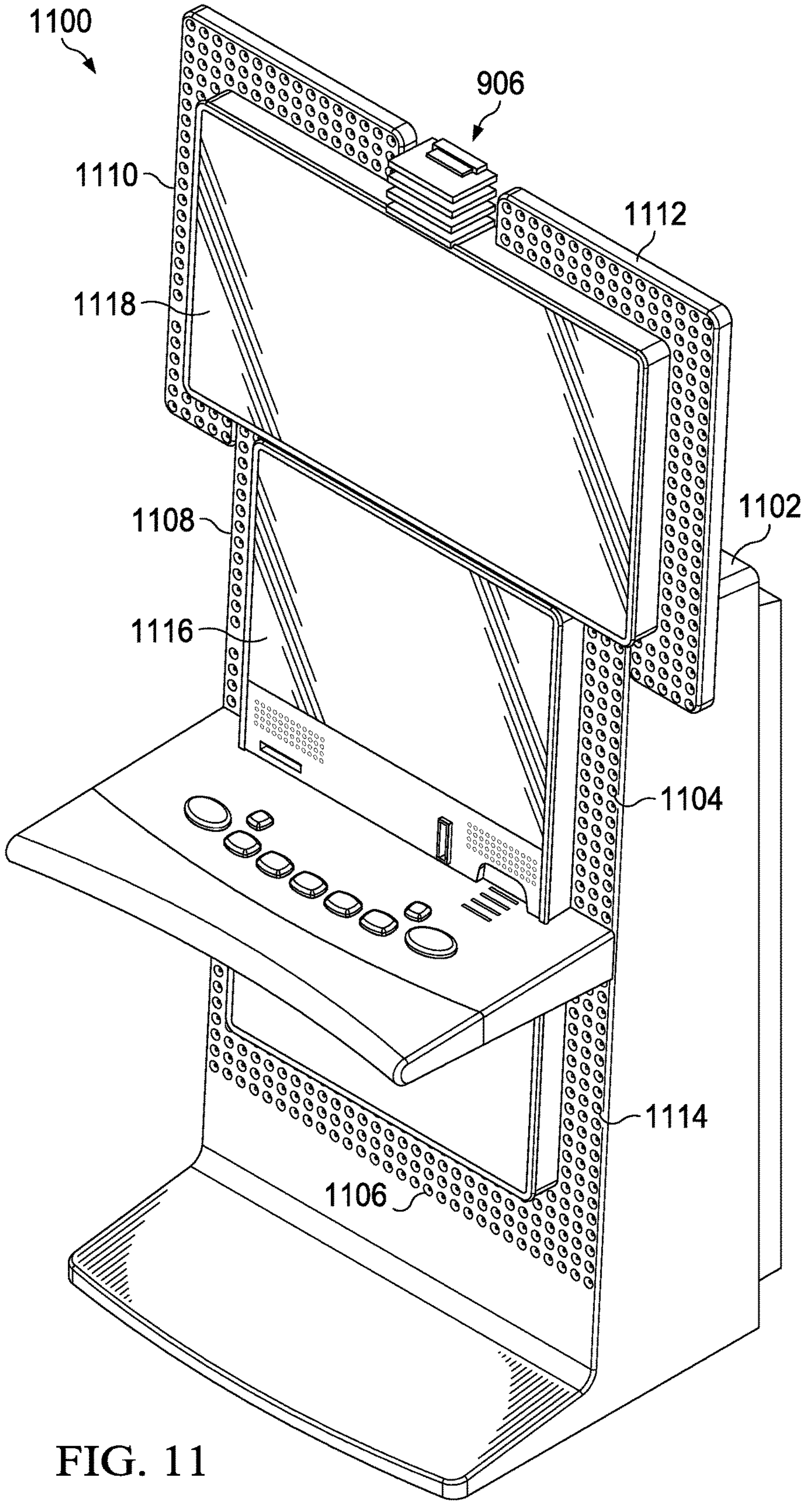
FIG. 11 is another illustration of an external lighting functionality on a gaming device, according to one embodiment.
Figure 12:
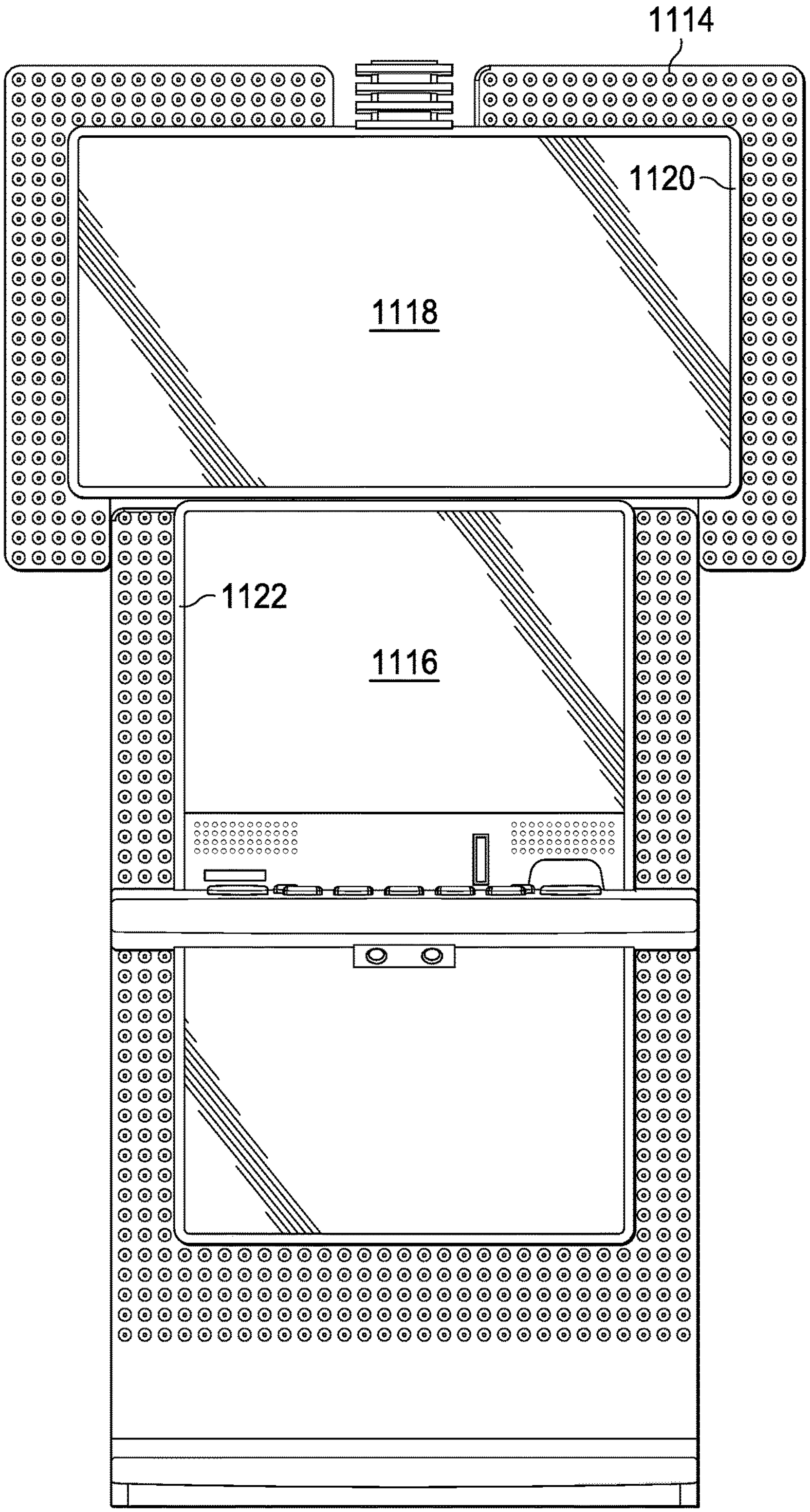
FIG. 12 is another illustration of an external lighting functionality on a gaming device, according to one embodiment.

In FIG. 11, another illustration of an external lighting functionality on a gaming device is shown, according to one embodiment. A third image 1100 may include an electronic gaming device 1102 which includes a first display area 1116 and a second display area 1118. In this example, the first display area 1116 is positioned vertically while the second display area 1118 is positioned horizontally. In addition, the first display area 1116 has a first external lighting area 1104 located to the right of the first display area 1116 and a second externa lighting area 1108 located to the left of the first display area 1116. Further, there is a bottom external lighting area 1106 located under the gaming deck 910. In addition, the second display area 1118 has a third external lighting area 1112 located to the right of the second display area 1118 and a fourth external lighting area 1110 located to the left of the second display area 1118. In this example, one or more lighting sources 1114 may be the lighting sources shown in FIGS. 45-55 and/or any other lighting source. In one example shown in FIG. 12, a first ring area 1120 (e.g., border area) is located around the second display area 1118 while a second ring area 1122 is located around the first display area 1116.

Figure 13:
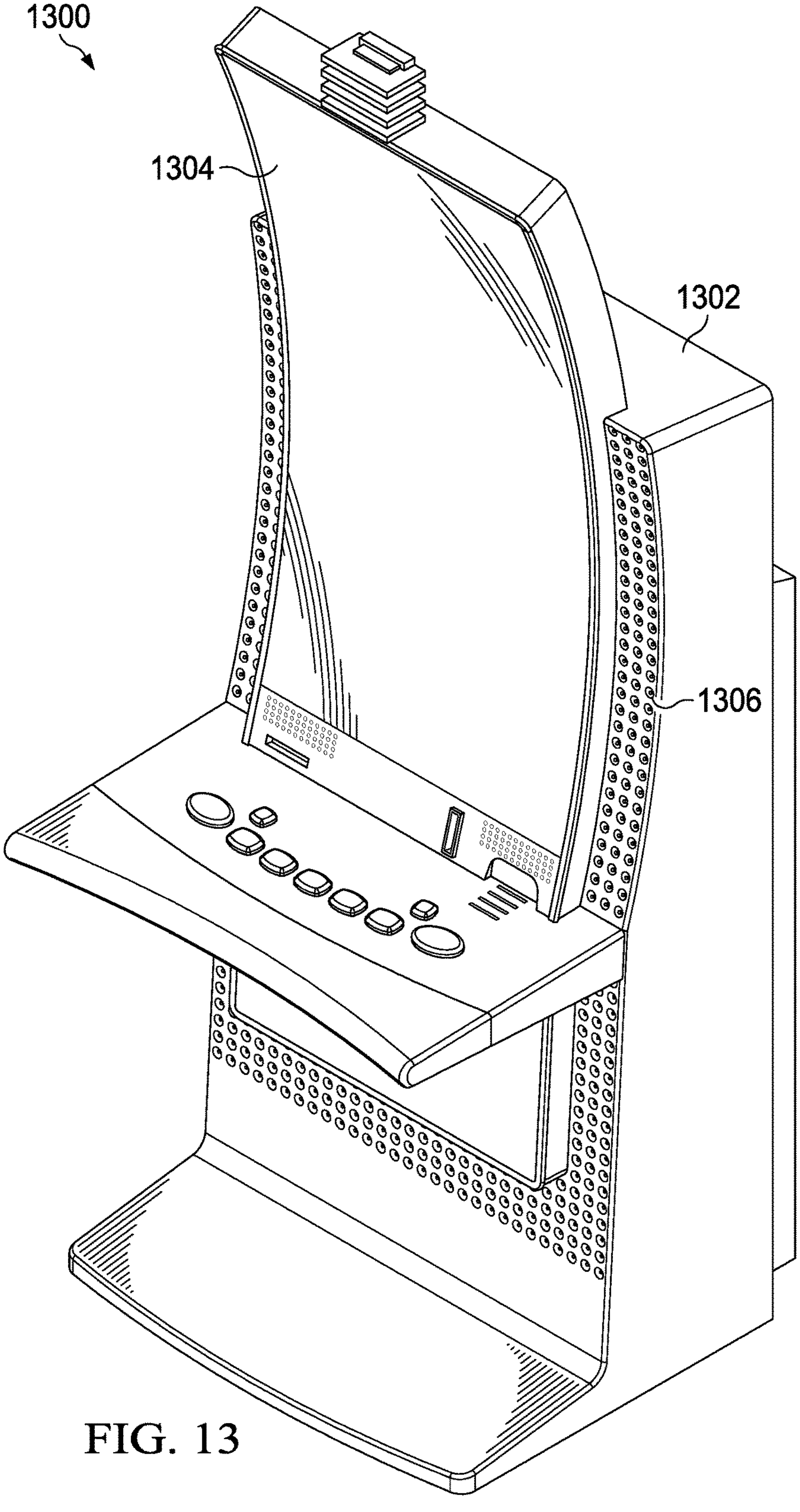
FIG. 13 is another illustration of an external lighting functionality on a gaming device, according to one embodiment.
Figure 14:
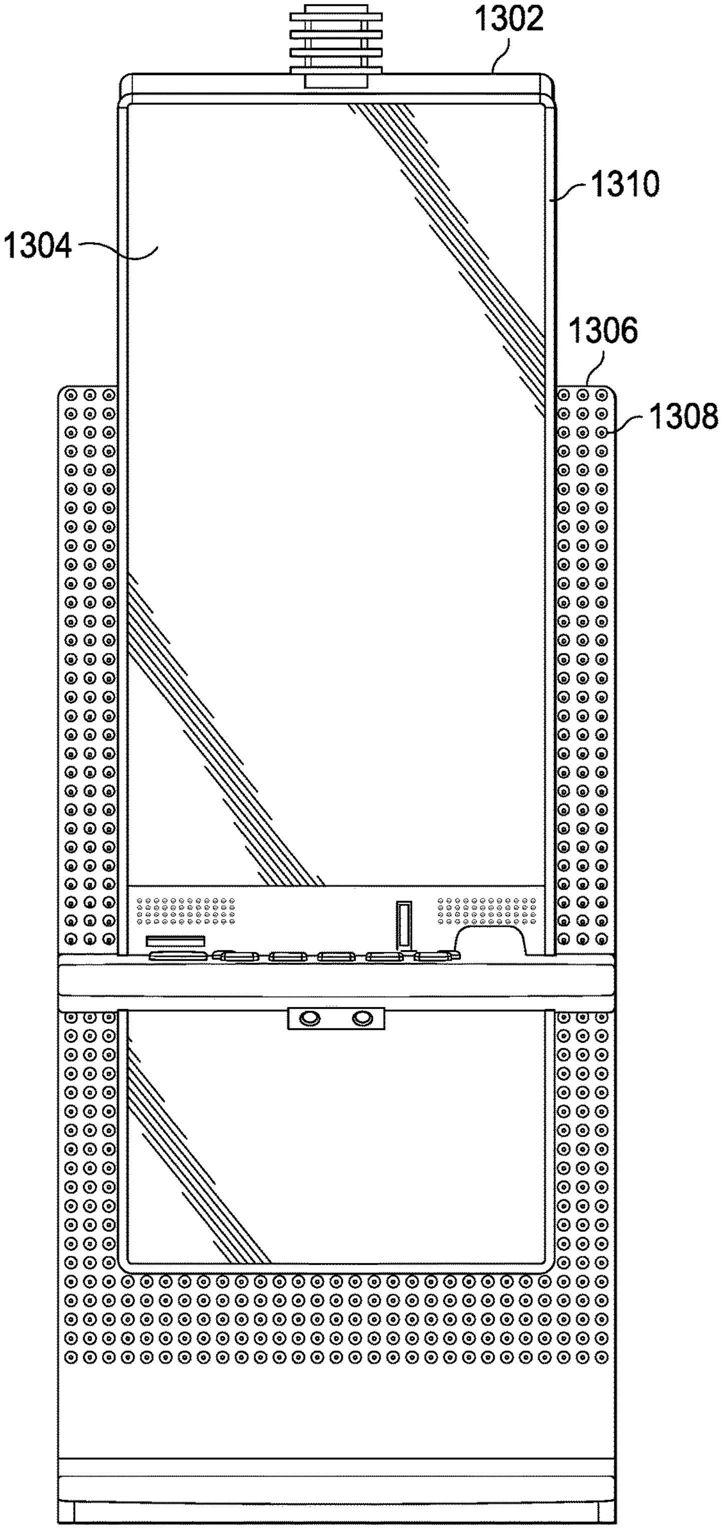
FIG. 14 is another illustration of an external lighting functionality on a gaming device, according to one embodiment.

In FIG. 13, another illustration of an external lighting functionality on a gaming device is shown, according to one embodiment. A fourth image 1300 may include an electronic gaming device 1302 with a curved display area 1304 and a curved external wall of lights area 1306. In one example, the curved display area 1304 allows the player to have a more in-depth gaming experience. In one example shown in FIG. 14, a curved ring area 1310 is positioned to go around at least a portion (and/or all) of the curved display area 1304 and/or the curved external wall of lights area 1306. In various examples, the one or more light sources 1308 may be the light sources shown in FIGS. 45-55, any other light source, and/or any combination thereof. For example, a first portion of the one or more light sources 1308 may be based on FIG. 45, a second portion of the one or more light sources 1308 may be based on FIG. 46, and an Nth portion of the one or more light sources 1308 may be based on FIG. 55.

Figure 15:
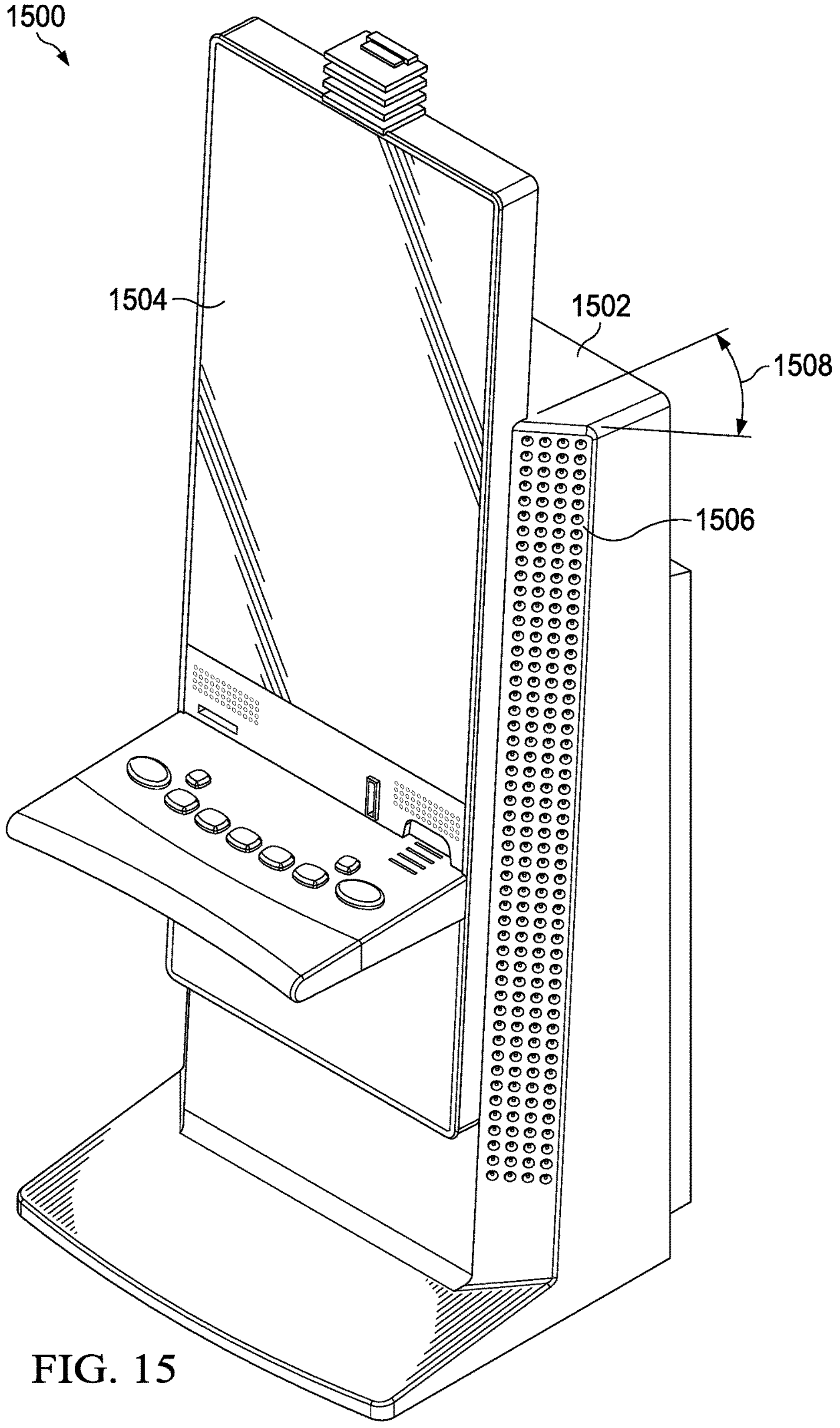
FIG. 15 is another illustration of an external lighting functionality on a gaming device, according to one embodiment.
Figure 16:
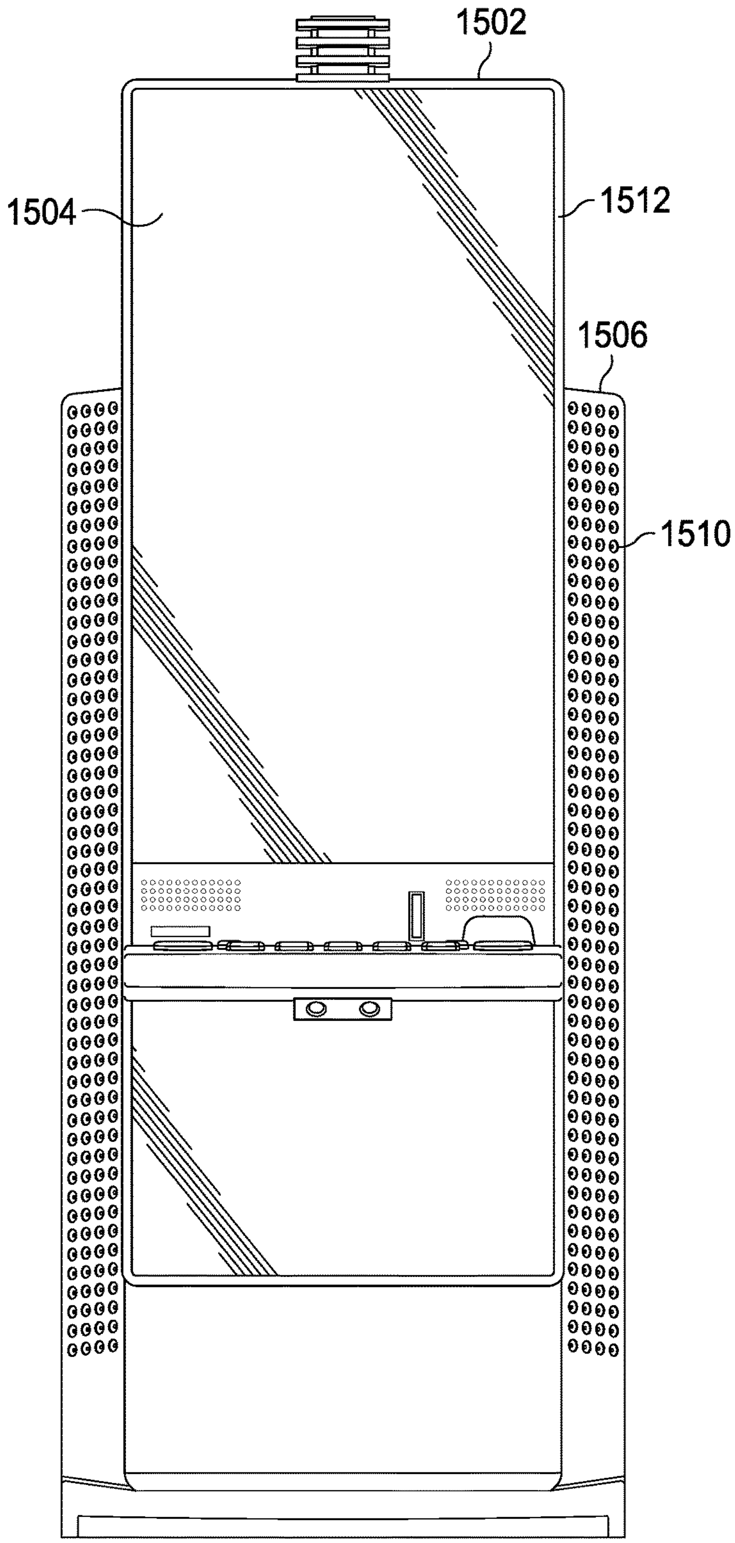
FIG. 16 is another illustration of an external lighting functionality on a gaming device, according to one embodiment.

In FIG. 15, another illustration of an external lighting functionality on a gaming device is shown, according to one embodiment. A fifth image 1500 may include an electronic gaming device 1502 with a display area 1504 and an angled external wall of lights area 1506. In this example, the angled external wall of lights 1506 is at an angle of 45 degrees relative to the display area. In various examples, the angle may be the following degrees: 1.00, 1.01, 1.02, 1.03, . . . , 10.00, 10.01, . . . , 25.00, 25.01, 25.02, . . . , 40.00, 40.01, 40.02, 40.03, 40.04, . . . , 44.97, 44.98, 44.99, . . . , 70.50, 70.51, . . . , 83.24, 83.25, . . . , 179.99, and 180.00. In addition, the angle may be relative to a first object from a second object. Further, the first object and the second object may be any objects and/or devices on the electronic gaming device 1502. In another example shown in FIG. 16, a ring area 1512 is positioned to go around at least a portion (and/or all) of the display area 1504 and/or the angled external wall of lights area 1506. In one example, the angled external wall of lights area 1506 can be utilized to attract other players and/or potential players. Further, the angled external wall of lights area 1506 can be utilized to generate presentations relating to game play. In addition, the angled external wall of lights area 1506 may be utilized in a notification function, upcoming event functionality, advertisement functionality, game play functionality, external wall of lights game play functionality, and/or external wall of lights functionality. Further, the angled external wall of lights area 1506 may be utilized with a curved configuration and/or any other configuration disclosed in this disclosure.

Figure 17:
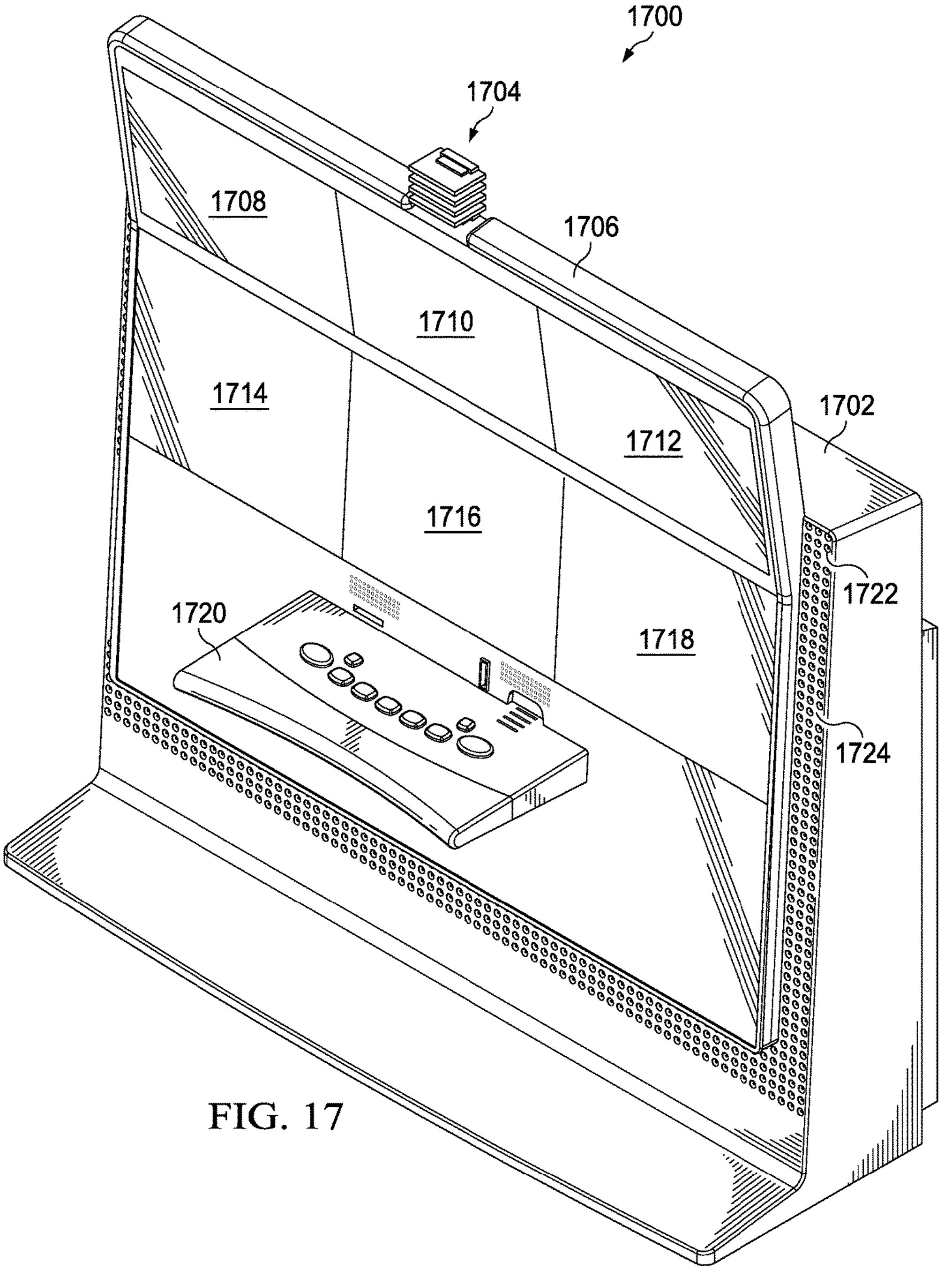
FIG. 17 is another illustration of an external lighting functionality on a gaming device, according to one embodiment.

In FIG. 17, another illustration of an external lighting functionality on a gaming device is shown, according to one embodiment. A sixth image 1700 includes a large electronic gaming device 1702 where the large electronic gaming device 1702 may include: a game tower 1704; a ring area 1706; a first display screen 1708, a second display screen 1710, a third display screen 1712, a fourth display screen 1714, a fifth display screen 1716, and/or an Nth display screen 1718; a game deck 1720 (with one or more inputs devices), one or more external wall of lights areas 1722, and/or one or more lighting sources 1724. For example, the large electronic gaming device 1702 can be utilized for multi-player game play and/or multi-level game play.

Figure 18:
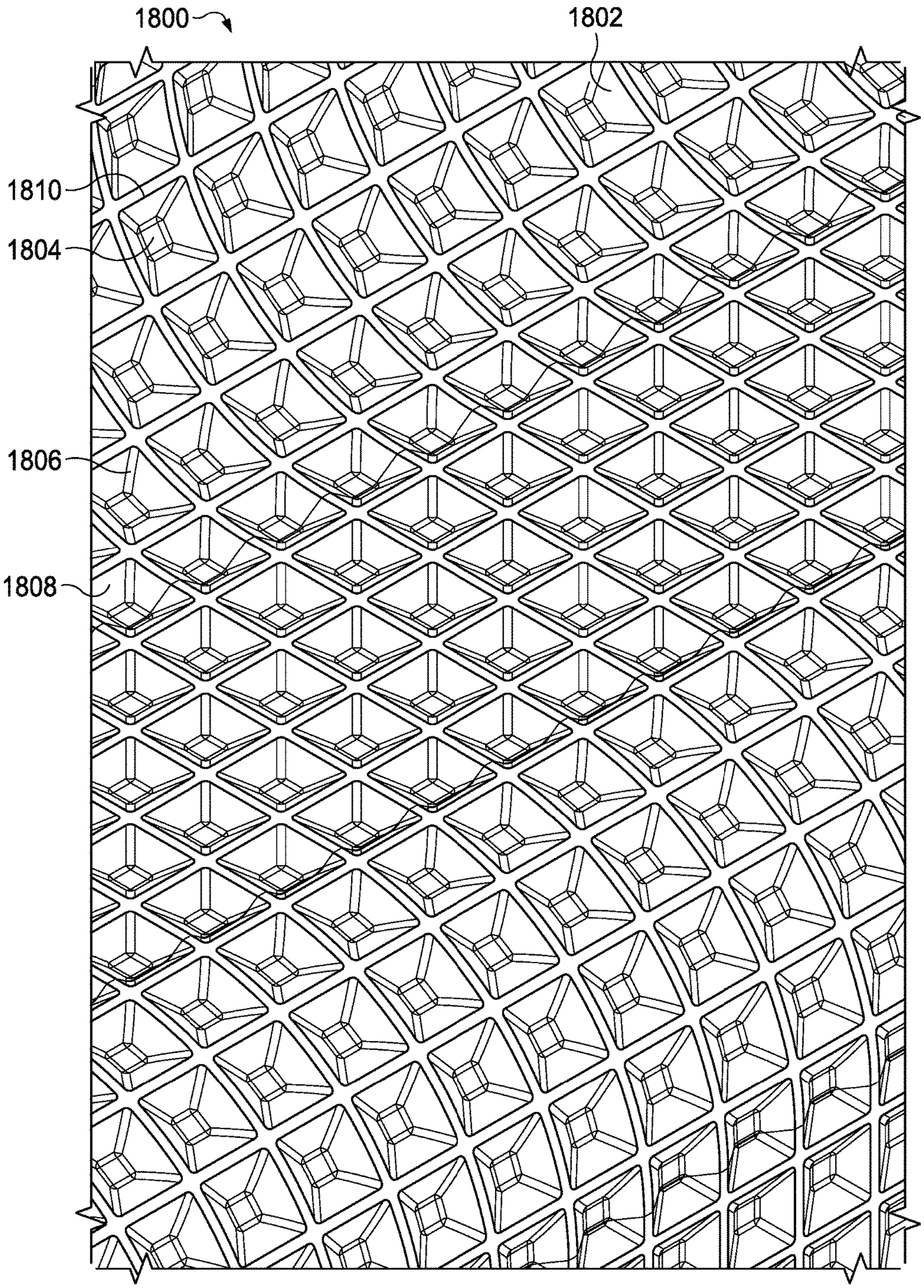
FIG. 18 is an illustration of material utilized with an external lighting functionality on a gaming device, according to one embodiment.

In FIG. 18, an illustration of material utilized with an external lighting functionality on a gaming device is shown, according to one embodiment. A seventh image 1800 may include a sheet 1810 which includes one or more diffusers (a diffuser 1802). Each diffuser 1802 may include one or more walls 1808, one or more diffuser sides 1806, and/or a diffuser top 1804. In one example, the nano-lumens utilized with the diffusers have the advantage that streaming live video may be utilized. Further, the nano-lumens have the advantage of a tight LED pitch.

Figure 19:
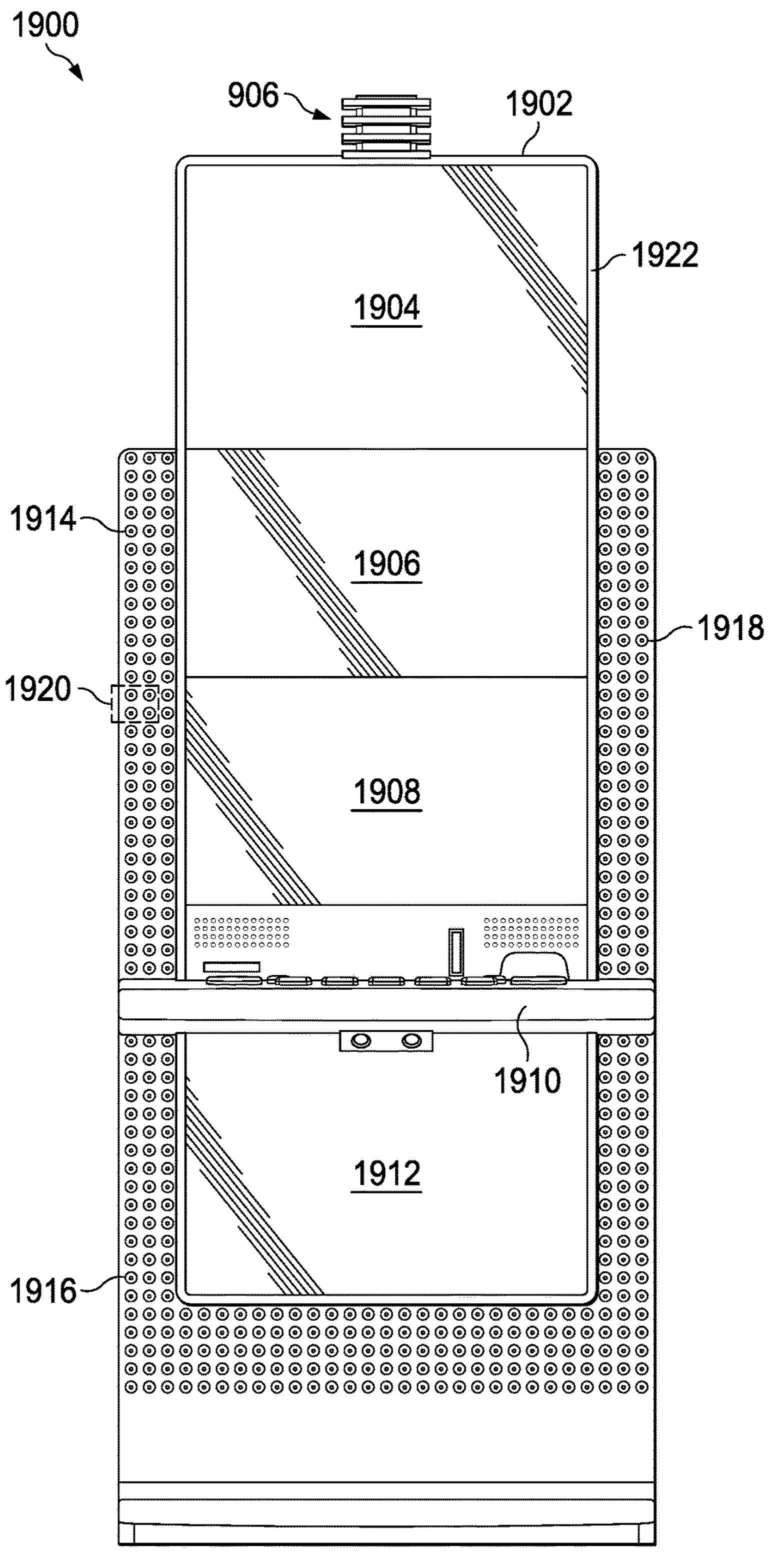
FIG. 19 is another illustration of an external lighting functionality on a gaming device, according to one embodiment.

In FIG. 19, another illustration of an external lighting functionality on a gaming device is shown, according to one embodiment. An eighth image 1900 may include an electronic gaming device 1902 which includes game tower 906, a message area 1904 (which can also be utilized as a game title area and/or game information area), a first display screen 1906, a second display screen 1908, a game deck 1910, a bottom message area 1912, a bottom external wall of lights 1916, a side external wall of lights 1918 (e.g., right and/or left side—further a top external wall of lights may be utilized), one or more light sources 1920, and a ring area 1922.

Figure 20A:
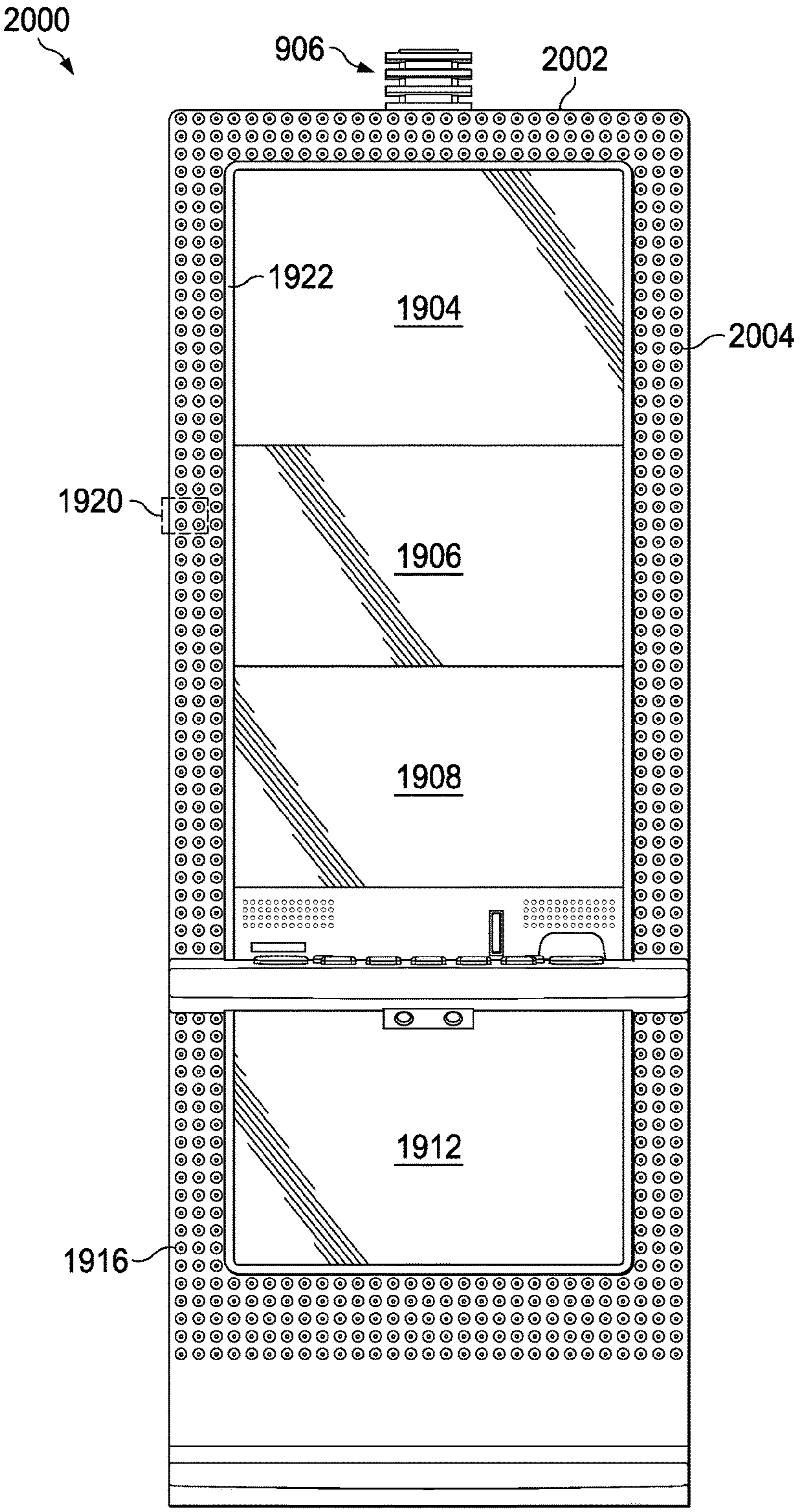
FIG. 20A is another illustration of an external lighting functionality on a gaming device, according to one embodiment.

In FIG. 20A, another illustration of an external lighting functionality on a gaming device is shown, according to one embodiment. A ninth image 2000 may include an electronic gaming device 2002 which includes a wrap-around externa wall of lights 2004, message area 1904, game tower 906, first display screen 1906, second display screen 1908, bottom message area 1912, ring area 1922, and bottom external wall of lights 1916. In this example, game tower 906 is located on the top of the wrap-around external wall of lights 2004.

Figure 20B:
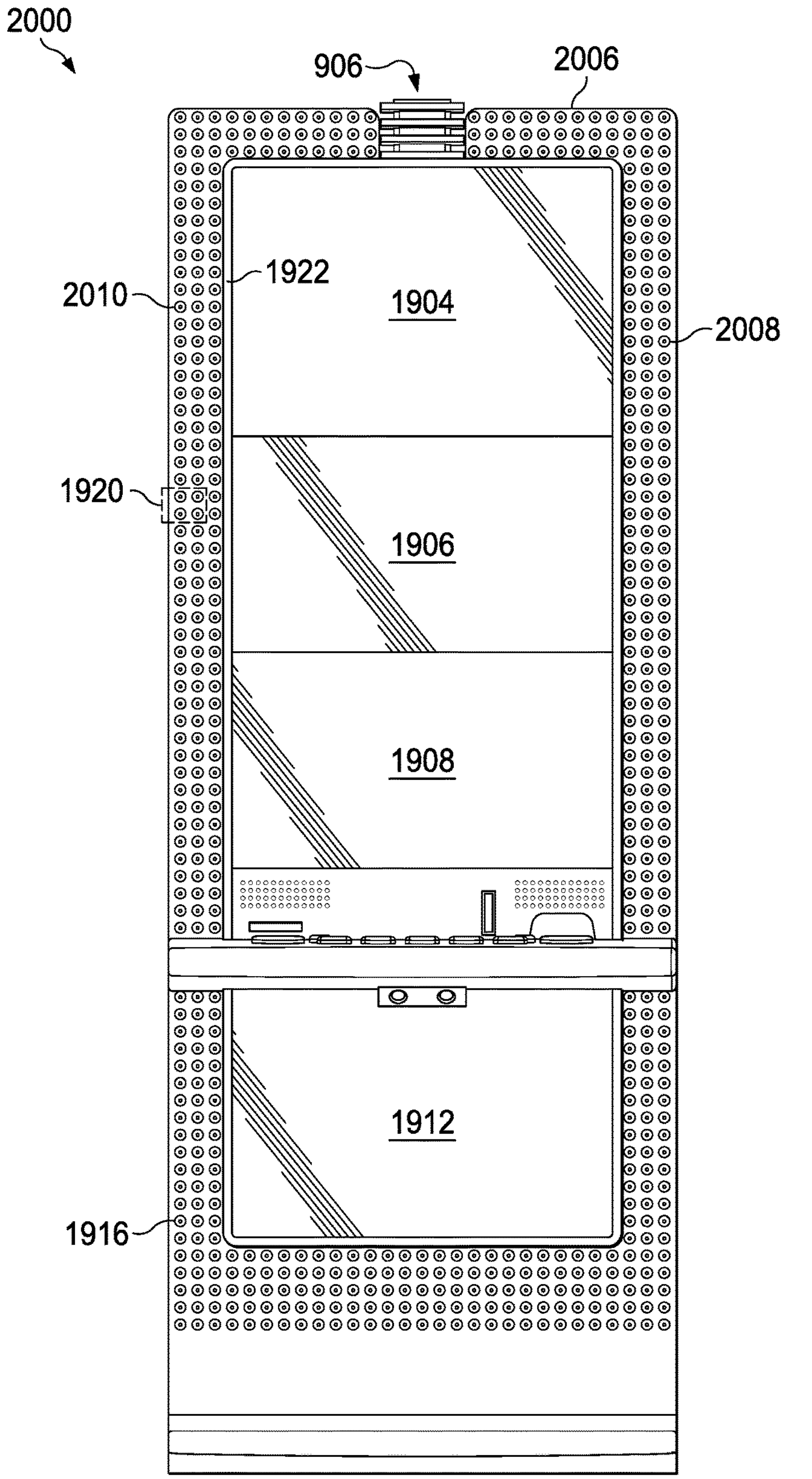
FIG. 20B is another illustration of an external lighting functionality on a gaming device, according to one embodiment.

In FIG. 20B, another illustration of an external lighting functionality on a gaming device is shown, according to one embodiment. In this example, there is an electronic gaming device 2006 with a right external wall of lights 2008 and a left external wall of lights 2010 which both have an L-shape. Further, the game tower 906 is located between the right external wall of lights 2008 and the left external wall of lights 2010.

Figure 20C:
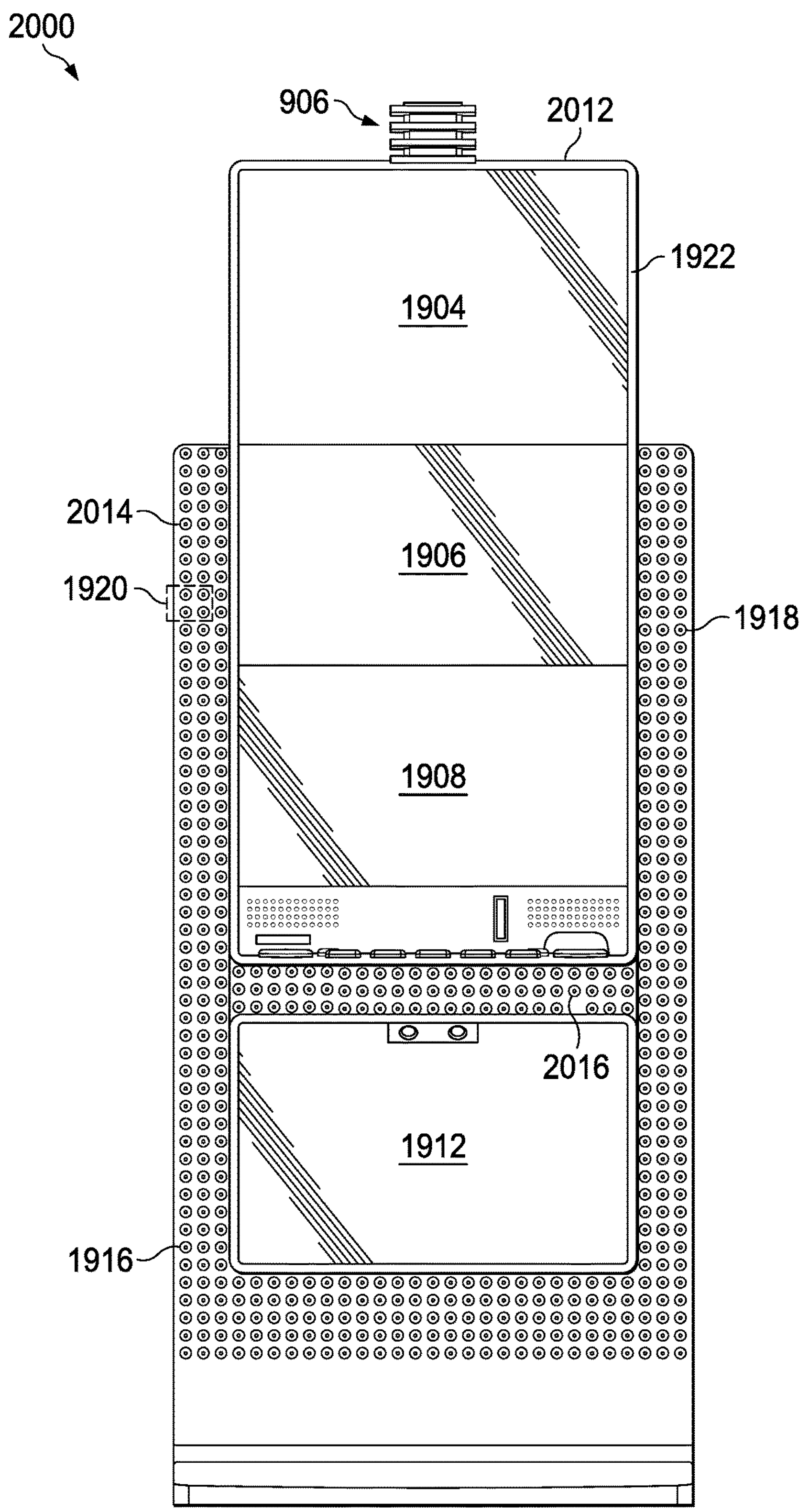
FIG. 20C is another illustration of an external lighting functionality on a gaming device, according to one embodiment.

In FIG. 20C, another illustration of an external lighting functionality on a gaming device is shown, according to one embodiment. In this example, an electronic gaming device 2012 has a U-Shaped external wall of lights 2014 and a middle section external wall of lights 2016.

Figure 20D:
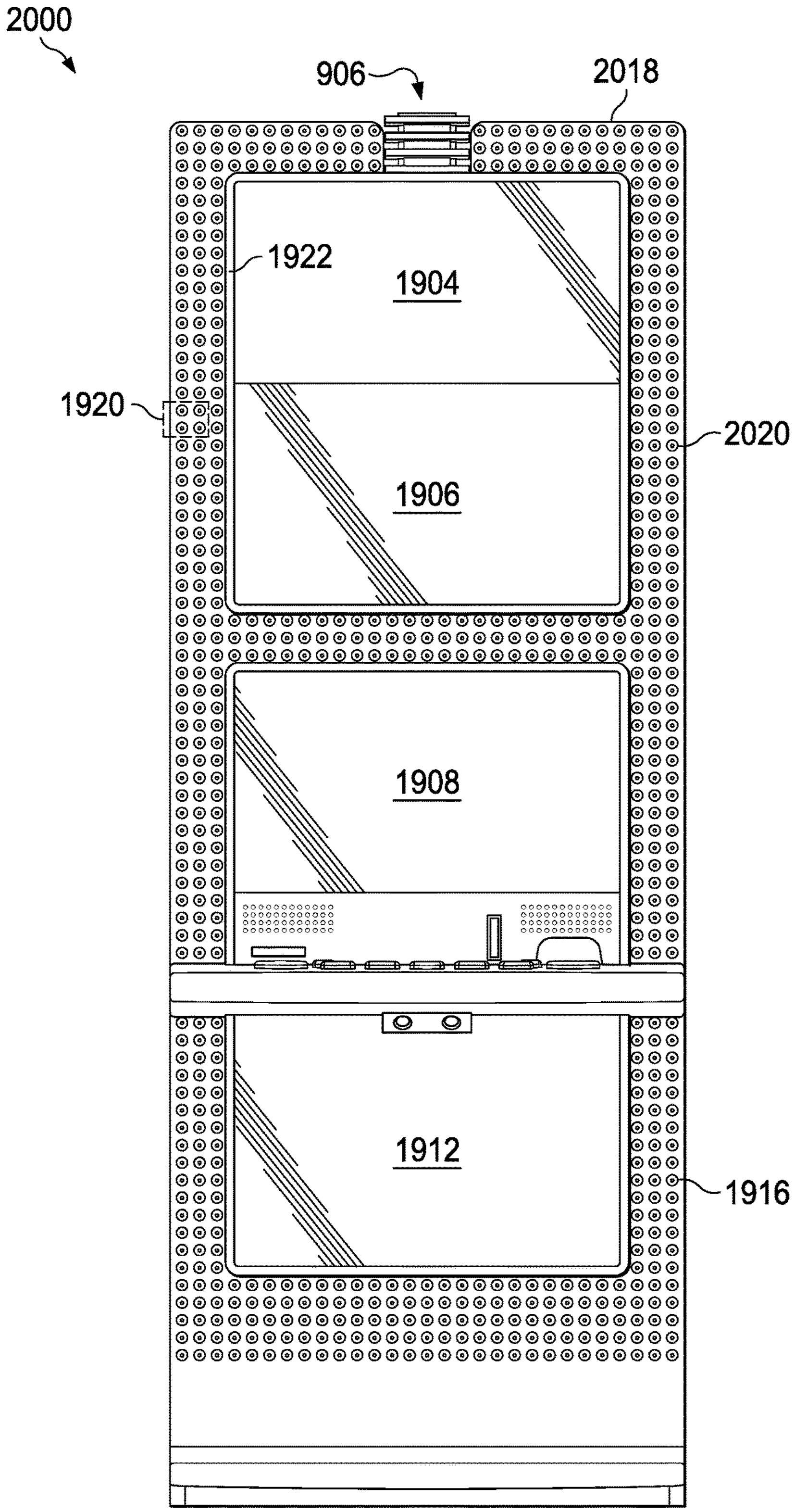
FIG. 20D is another illustration of an external lighting functionality on a gaming device, according to one embodiment.

In FIG. 20D, another illustration of an external lighting functionality on a gaming device is shown, according to one embodiment. In this example, an electronic gaming device 2018 has an upper external wall of lights 2020 where the game tower 906 is located between the upper portion of the upper externa wall of lights 2020 and bottom external wall of lights 1916.

Figure 21:
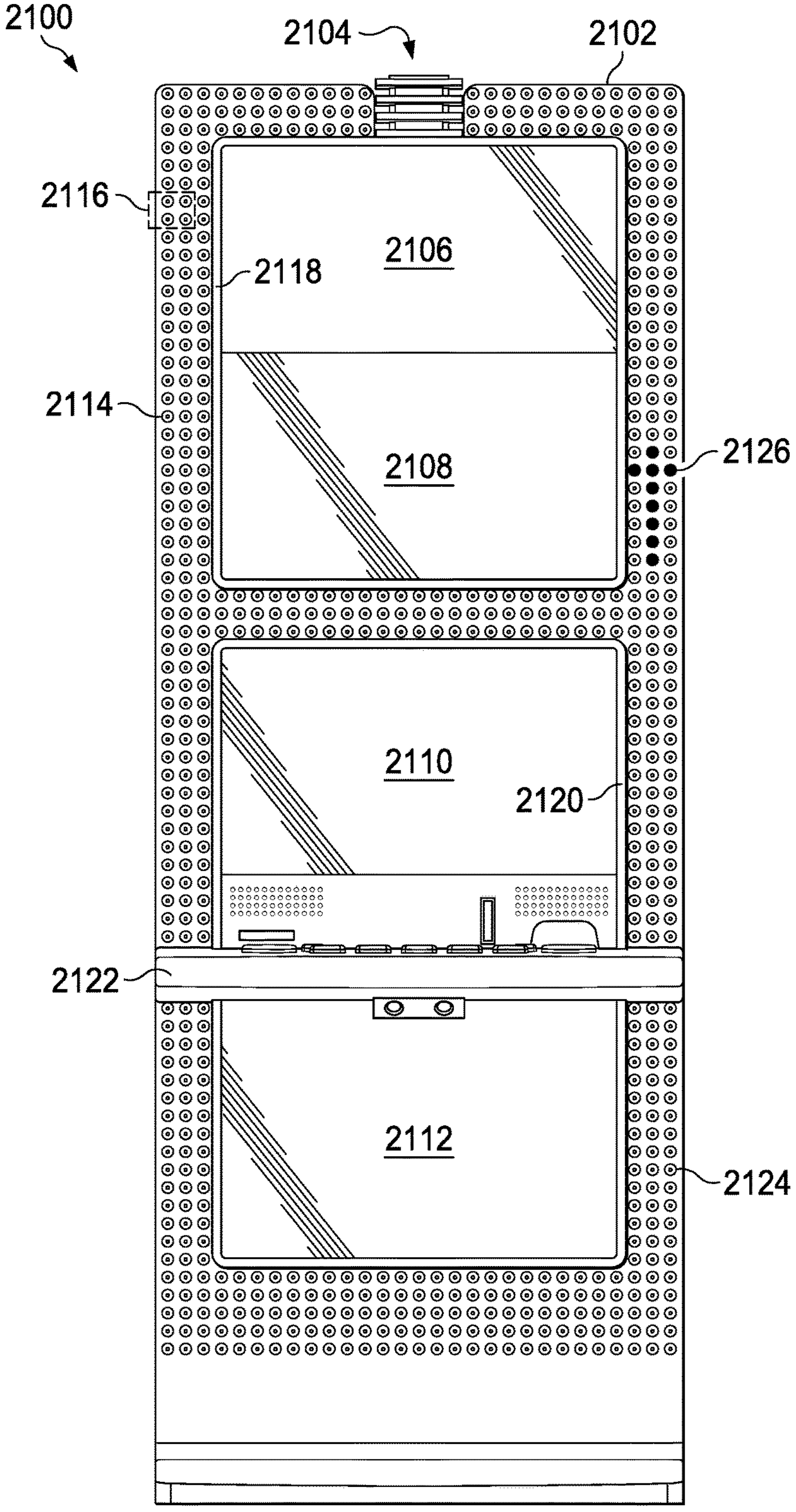
FIG. 21 is another illustration of an external lighting functionality on a gaming device, according to one embodiment.

In FIG. 21, another illustration of an external lighting functionality on a gaming device is shown, according to one embodiment. A tenth image 2100 may include an electronic gaming device 2102 with an external wall of lights 2114 where the external wall of lights 2114 includes a plurality of lighting devices 2116. In addition, the electronic gaming device 2102 includes a first message area 2106, a first display screen 2108, a second display screen 2110, and a second message area 2112. Further, the electronic gaming device 2102 may include a lower external wall of lights 2124 and a player input deck 2122. In this example, the first display screen 2108 and/or the first message area 2106 may be surrounded (and/or partially surrounded) by a first ring area 2118. Further, the second display screen 2110 and/or the second message area 2112 may be surrounded (and/or partially surrounded by a second ring area 2120). In one example, an external wall image 2126 may travel to any portion of the externa wall of lights 2114 and/or the lower external wall of lights 2114. In one example, external wall image 2126 may be utilized in an attraction mode to try to entice the player to come over and play a game. For example, the external wall image 2126 may be an image of a rabbit moving around the gaming device and going into a prize hole which may invite the player over with a promotion. Further, the external wall image 2126 may be an image of a rabbit moving from one gaming device to another gaming device which brings the player's attention to one or more gaming devices. Further, the external wall image 2126 may be utilized during game play. For example, the external wall image 2126 may be an image of a rabbit and when the rabbit stops at a predetermined position a prize is award and/or the external wall image 2126 may interact with the reel game play to enhance a winning prize from the reel game play. In another example, the external wall image 2126 may be included in a winning presentation of game play. For example, when a first player on a first gaming device has a winning triggering event, then the external wall image 2126 may go from a first gaming device to a second gaming device (in the same gaming bank, in the same gaming type of device, and/or any other relationship) to notify the other players of the winning triggering event.

Figure 22:
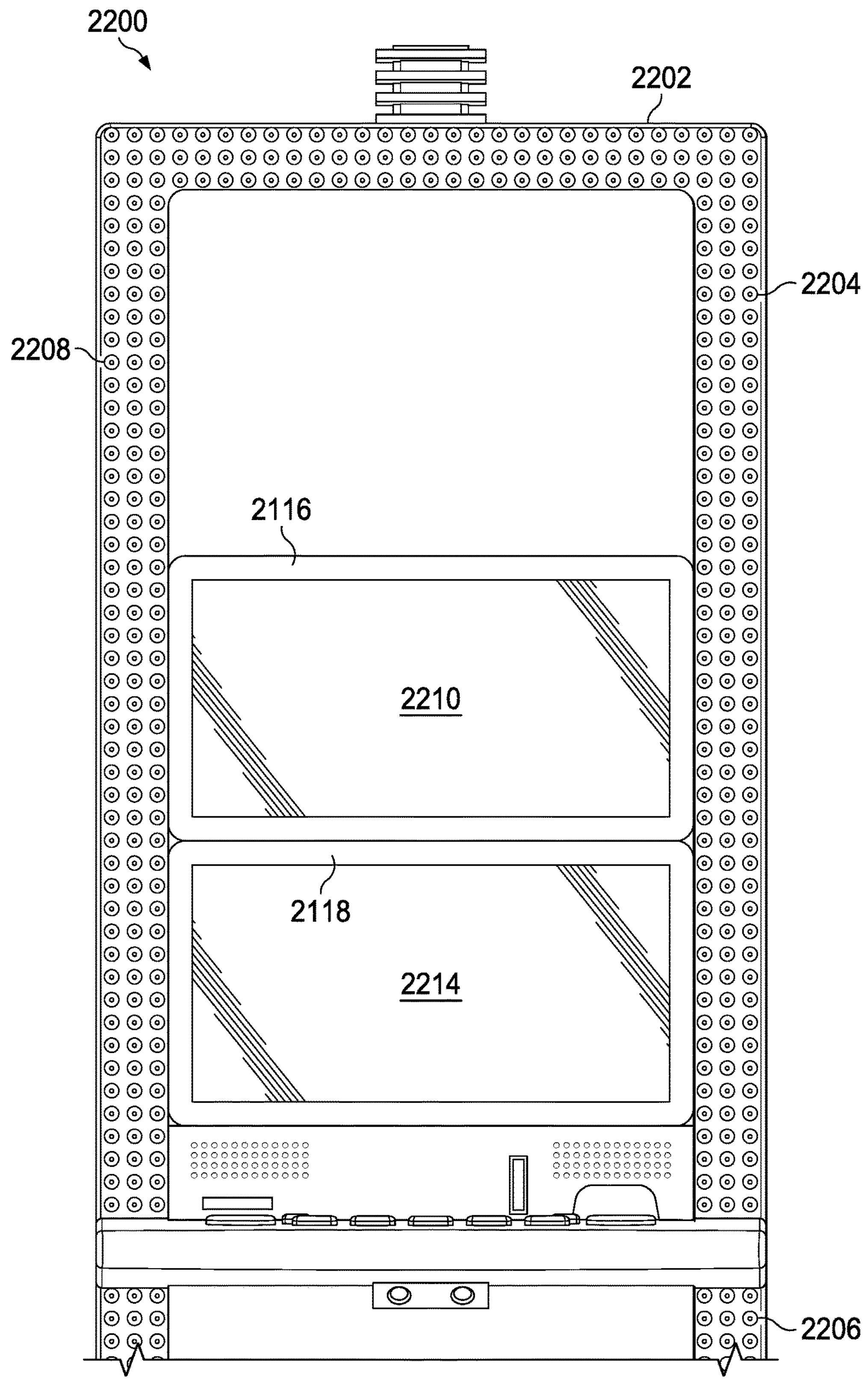
FIG. 22 is another illustration of an external lighting functionality on a gaming device, according to one embodiment.
Figure 23:
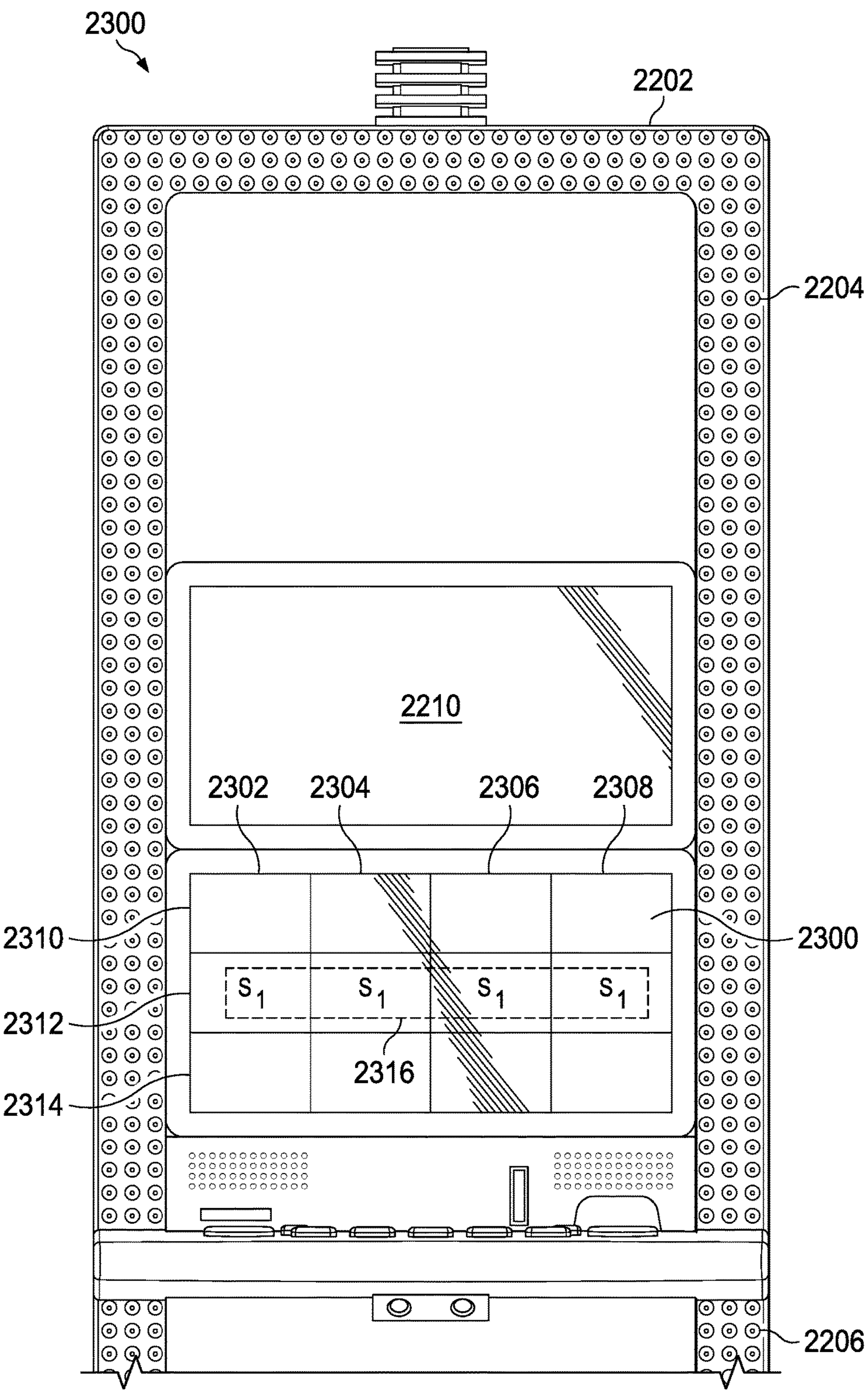
FIG. 23 is another illustration of an external lighting functionality on a gaming device, according to one embodiment.
Figure 24:
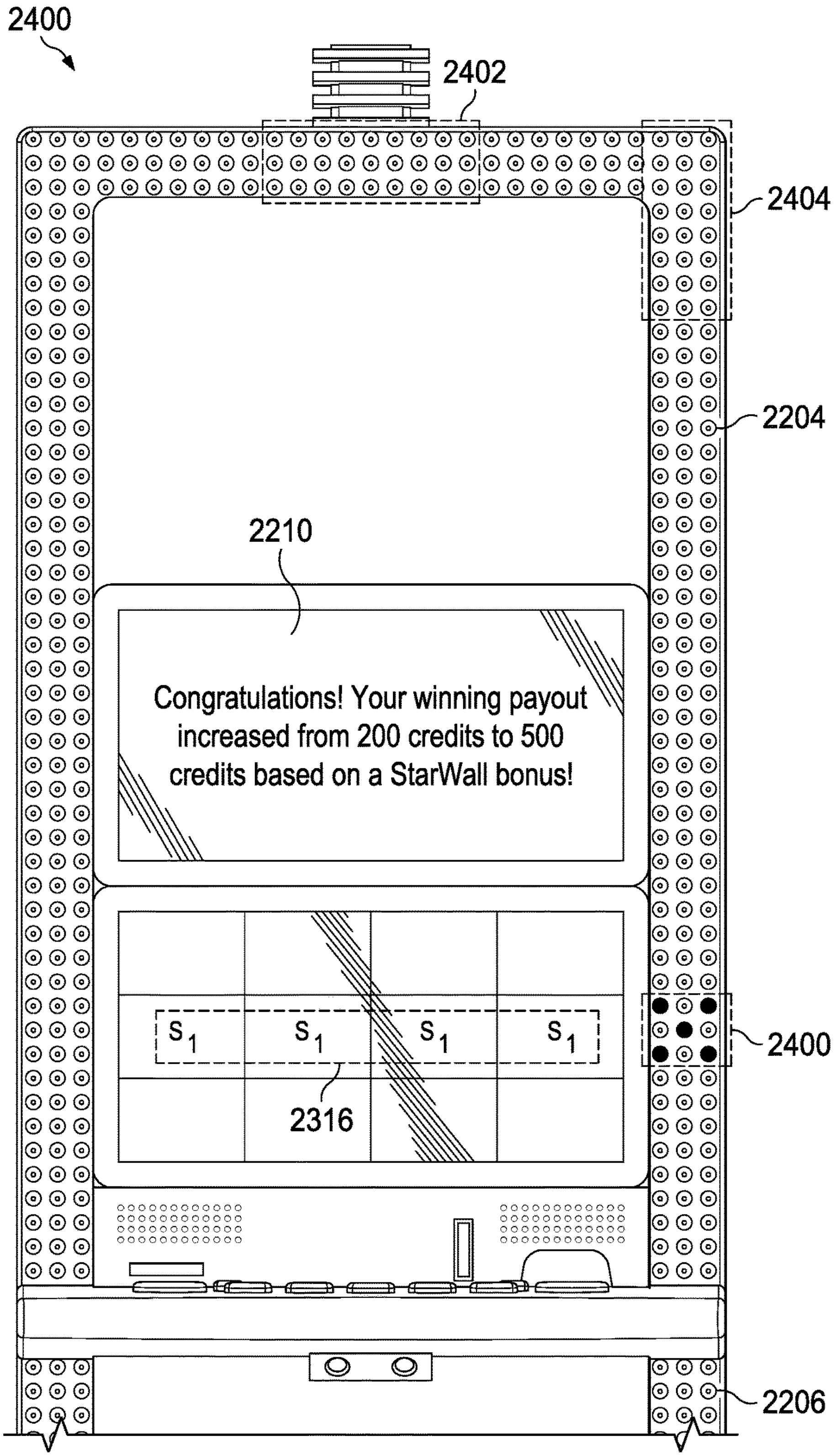
FIG. 24 is another illustration of an external lighting functionality on a gaming device, according to one embodiment.
Figure 25:
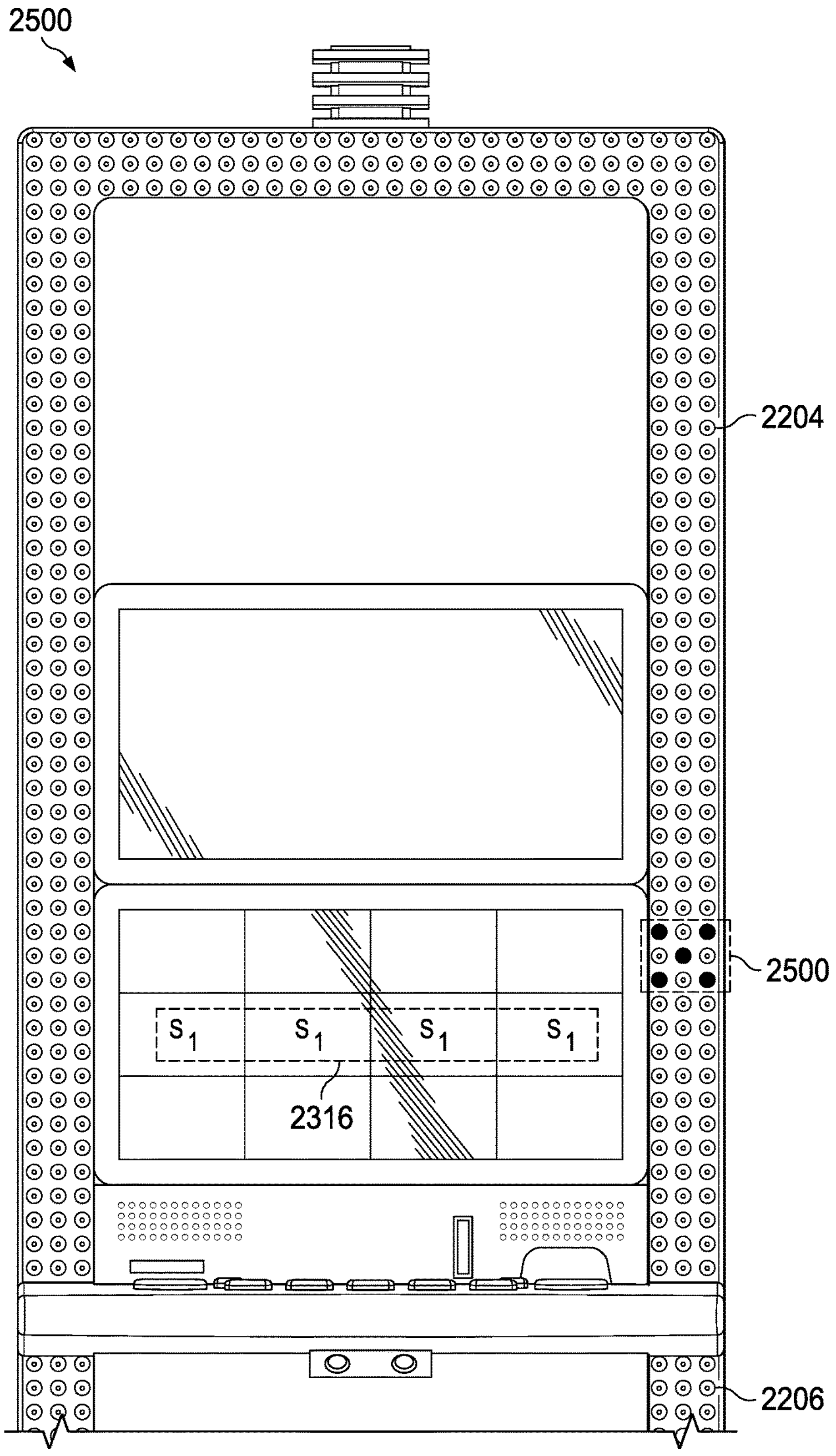
FIG. 25 is another illustration of an external lighting functionality on a gaming device, according to one embodiment.

In FIG. 22, another illustration of an external lighting functionality on a gaming device is shown, according to one embodiment. In one example, an electronic gaming device 2202 may include a top external wall of lights 2204 and a low external wall of lights 2206. In addition, a first display screen 2210, a second display screen 2214, a first ring area 2216 around the first display screen 2210, and a second ring area 2218 around the second display screen 2214 may be utilized on the electronic gaming device 2202. Further, a plurality of lighting devices 2208 may be utilized with the top external wall of lights 2204 and/or the low external wall of lights 2206. In one example shown in FIG. 23, the second display screen 2214 may include a symbol display area 2300 (e.g., a reel display area, a plurality of symbol display areas, etc.). The symbol display area 2300 may include a first row 2310, a second row 2312, a third row 2314, a first column 2302, a second column 2304, a third column 2306, and a fourth column 2308. In addition, any of the configurations shown in FIGS. 6A-6J may be utilized with this example. Further, a winning payline 2316 may be formed on symbol display area 2300 based on a winning combination of symbols (e.g., S1, S1, S1, and S1 ) appearing in the second row 2312 at the completion of game play. In this example, this winning combination has an associated award value of 200 credits. In one example, a bonus game and/or an external lighting area game may be triggered by one or more triggering events (e.g., a combination of symbols, random number generation, time period elapsed, predetermined pattern, etc.). In this external lighting area game, an external lighting area image 2400 may move along any portion of the top external wall of lights 2204 and/or the low externa wall of lights 2206. In one example shown in FIG. 24, the external lighting area image 2400 stops in a bonus position (e.g., on the right side of the winning payline 2316, on the left side of the winning payline 2316, in a first externa lighting area bonus area 2402, . . . , an Nth external lighting area bonus area 2404) relative to winning payline 2316 which increases the award value from 200 credits to 500 credits. In this example, the first display screen 2210 displays a message that states “Congratulations! Your winning payout increased from 200 credits to 500 credits based on a Starwall bonus!”

In another example, the external lighting area image 2400 may need to land in a first external lighting area bonus area 2402 to increase the award value and/or the external lighting area image 2400 may need to land in the Nth externa lighting area bonus area 2404 to increase the award value. In another example, the award value may be increased by varying values depending on where the external lighting area image 2400 stops. For example, if the external lighting area image 2400 stops in the first external lighting area bonus area 2402, the award value may be increased by two times. However, if the external lighting area image 2400 stops in the Nth external lighting area bonus area 2404, the award value may be increased by five times. In addition, if the external lighting area image 2400 stops at a position to the left of the winning payline 2316, the award value may be increased by three times. Whereas, if the external lighting area image 2400 stops at a position to the right of the winning payline (position shown in FIG. 24), the award value may be increased up to one hundred times. The actual increase in award value may be predetermined and/or may be determined by a random number function. In another example shown in FIG. 25, the external lighting area image 2400 stops in a non-winning position 2500.

Figure 26:
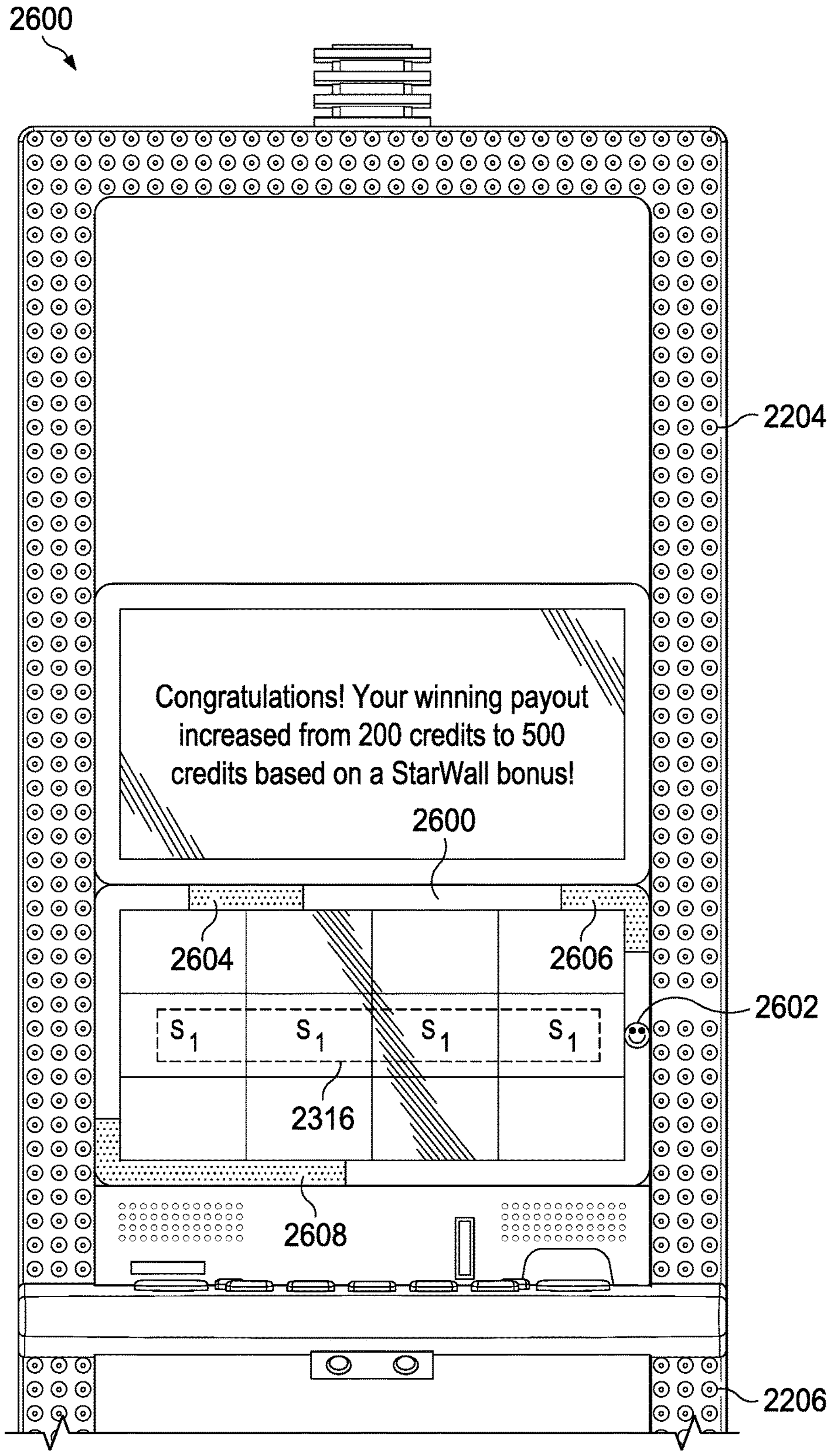
FIG. 26 is another illustration of an external lighting functionality on a gaming device, according to one embodiment.

In another example shown in FIG. 26, a first ring area 2600 may be utilized for the bonus game and/or the external lighting area game. In this example, the winning payline 2316 has been generated during game play and a triggering event has occurred to initiate the bonus game and/or the externa lighting area game. In this example, a ring image 2602 may move around the first ring area 2600. In various examples, the ring image 2602 may stop on an area to the left of winning payline 2316 (where the ring image 2602 is shown in FIG. 26), a first ring bonus area 2604, a second ring bonus area 2606, and/or an Nth ring bonus area 2608. In the example shown in FIG. 26, the ring image 2602 has stop in the area to the right of winning payline 2316 which increased the award value from 200 credits to 500 credits. In addition, if the ring image 2602 had stopped in the first ring bonus area 2604 the award value may have been increased by three times and/or bonus free spins may have been awarded. Further, if the ring image 2602 had stopped in the second ring bonus area 2606 the award value may have been increased by five times, bonus free spins may have been awarded, and/or any other prize may have been awarded. In addition, if the ring image 2602 had stopped in the Nth ring bonus area 2608 the award value may have been increased by one thousand times, bonus free spins may have been awarded, and/or any other prize (e.g., tickets, free stay, car, etc.) may have been awarded.

Figure 27:
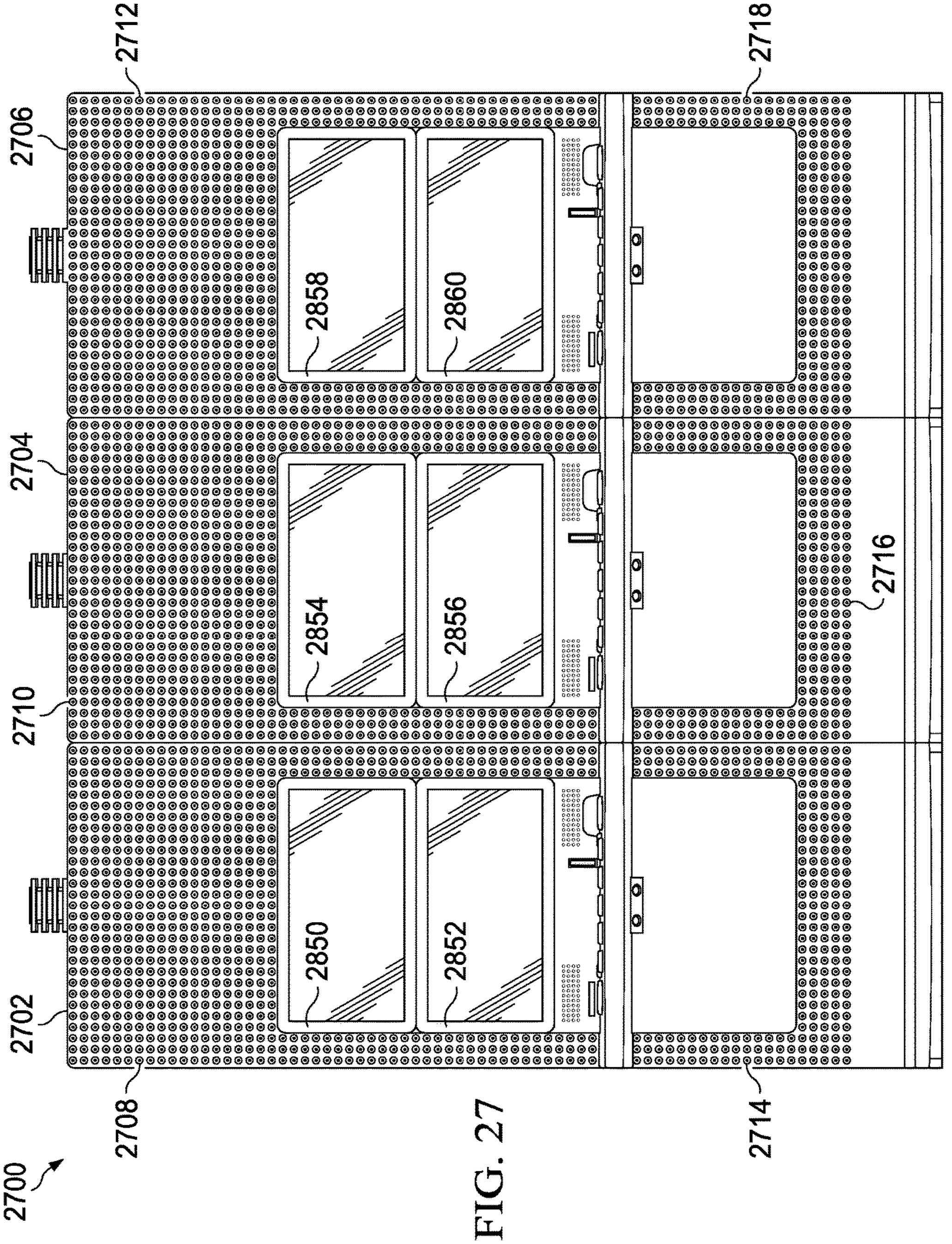
FIG. 27 is another illustration of an external lighting functionality on a gaming device, according to one embodiment.

In FIG. 27, another illustration of an external lighting functionality on a gaming device is shown, according to one embodiment. In this example, a first electronic gaming device 2702, a second electronic gaming device 2704, and an Nth electronic gaming device 2706 are positioned next to each other (and/or in a bank of games). The first electronic gaming device 2702 includes a first top external wall of lights 2708 and a first bottom external wall of lights 2714. The second electronic gaming device 2704 includes a second top external wall of lights 2710 and a second bottom external wall of lights 2716. The Nth electronic gaming device 2706 includes an Nth top external wall of lights 2712 and an Nth bottom external wall of lights 2718. In one example shown in FIG. 28, an attraction mode may be implemented by combining one or more display areas on the first electronic gaming device 2702, the second electronic gaming device 2704, and/or the Nth electronic gaming device 2706. In this example, an image (e.g., an American flag) 2804 is shown via a stars image 2802 and a strips image 2806 which are located on all three electronic gaming devices (e.g., first electronic gaming device 2702, second electronic gaming device 2704, and Nth electronic gaming device 2706). As shown in FIG. 28, the first electronic gaming device 2702 includes a first display screen 2808, a second display screen 2810, a first ring area 2850 (shown on FIG. 27 for clarity), and a second ring area 2852 which are all utilized to display a portion of the image 2804. Further, the second electronic gaming device 2704 includes a first display screen 2812, a second display screen 2814, a first ring area 2854 (shown on FIG. 27 for clarity), and a second ring area 2856 which are all utilized to display a portion of the image 2804. Further, the Nth electronic gaming device 2706 includes a first display screen 2816, a second display screen 2818, a first ring area 2858 (shown on FIG. 27 for clarity), and a second ring area 2860 which are all utilized to display a portion of the image 2804. In addition, the first top external wall of lights 2708 and the first bottom external wall of lights 2714 of the first electronic gaming device 2702 are utilized to display a portion of the image 2804. Further, the second top external wall of lights 2710 and the second bottom external wall of lights 2716 of the second electronic gaming device 2704 are utilized to display a portion of the image 2804. In addition, the Nth top external wall of lights 2712 and the Nth bottom external wall of lights 2718 of the Nth electronic gaming device 2706 are utilized to display a portion of the image 2804. It should be noted that any combination of displays, rings, external walls of lights, and/or any other display surface may be utilized in any position on the electronic gaming device, and/or in any combination (e.g., the top external wall of lights for the first electronic gaming device with the second display screen for the second electronic gaming device; the bottom external wall of lights for the first electronic gaming device with the first display screen of the second electronic gaming device and the second display screen of the third electronic gaming device; the first display screen of the second electronic gaming device with the second display screen of the third electronic gaming device and the second ring area of the third electronic gaming device and the top external wall of lights of the first electronic gaming device; etc.).

Figure 29:
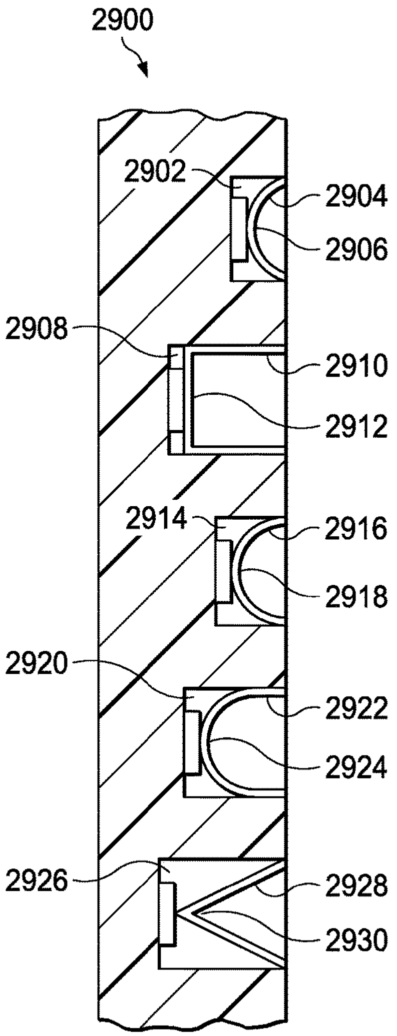
FIG. 29 is an illustration of various configurations for the externa lighting device, according to various embodiments.

In FIG. 29, an illustration of various configurations for the externa lighting device is shown, according to various embodiments. An eleventh image 2900 includes a first concave lighting device 2902, a second concave lighting device 2908, a third concave lighting device 2914, a fourth concave lighting device 2920, and a fifth concave lighting device 2926. In one example, the first concave lighting device 2902 may have a first concave diffuser 2904 and a first light source 2906. In this example, the first concave diffuser 2904 has a curved portion at a first circular angle (e.g., a first radian, a first angle, etc.). Further, the first light source 2906 has a first length, a first height, a first power output, and a first lumen output. In one example, the second concave lighting device 2908 may have a second concave diffuser 2910 and a second light source 2912. In this example, the second concave diffuser 2910 has a square portion with both sides at a second angle (e.g., 90 degrees) to a base. Further, the second light source 2912 has a second length, a second height, a second power output, and a second lumen output. In one example, the third concave lighting device 2914 may have a third concave diffuser 2916 and a third light source 2918. In this example, the third concave diffuser 2916 has a curved portion at a second circular angle (e.g., a second radian, a second angle, etc.). Further, the third light source 2918 has a third length, a third height, a third power output, and a third lumen output. In one example, the fourth concave lighting device 2920 may have a fourth concave diffuser 2922 and a fourth light source 2924. In this example, the fourth concave diffuser 2922 has a curved portion at a third circular angle (e.g., a third radian, a third angle, etc.). Further, the fourth light source 2924 has a fourth length, a fourth height, a fourth power output, and a fourth lumen output. In one example, the fifth concave lighting device 2926 may have a fifth concave diffuser 2928 and a fifth light source 2930. In this example, the fifth concave diffuser 2928 has a V-Shaped portion with two sides at a relative angle (e.g., from 1 degree to 180 degrees) to each other. Further, the fifth light source 2930 has a fifth length, a fifth height, a fifth power output, and a fifth lumen output. In various examples, the concave diffuser may be a hexagon shape, an ellipse shape, circle, square, rectangle, etc. In addition, the various measurements disclosed with FIGS. 45-55 may be utilized in any combination with these examples.

In various examples, the first length, the second length, the third length, the fourth length, and the fifth length may be different lengths and/or one or more of these elements may be the same value. In various examples, the first height, the second height, the third height, the fourth height, and the fifth height may be different heights and/or one or more of these elements may be the same value. In various examples, the first power output, the second power output, the third power output, the fourth power output, and the fifth power output may be different power outputs and/or one or more of these elements may be the same value. In various examples, the first lumen output, the second lumen output, the third lumen output, the fourth lumen output, and the fifth lumen output may be different lumen outputs and/or one or more of these elements may be the same value. In various examples, the first concave lighting device 2902, the second concave lighting device 2908, the third concave lighting device 2914, the fourth concave lighting device 2920, and/or the fifth concave lighting device 2926 may be utilized as lighting devices for one or more external walls of light. Further, any other lighting device (e.g., LEDs) disclosure in this document may be utilized with any other lighting device (e.g., nano LEDs, luminescent, etc.) disclosed in this document for one or more external walls of light.

Figure 30:
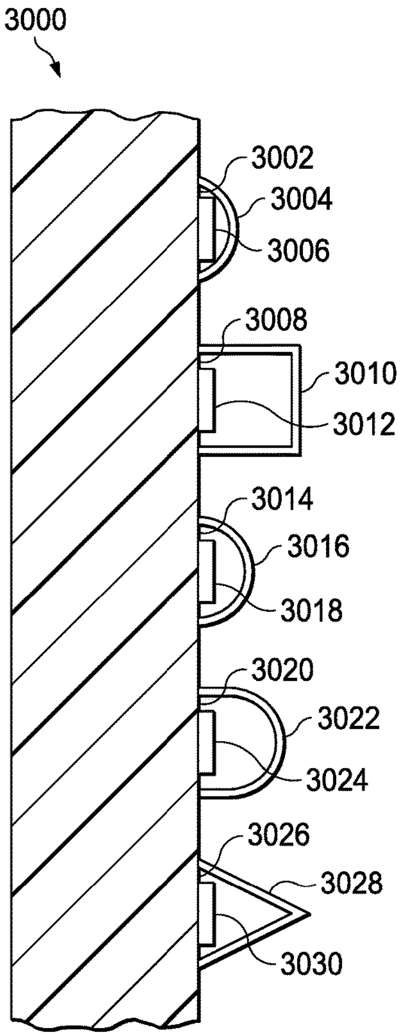
FIG. 30 is another illustration of various configurations for the externa lighting device, according to various embodiments.

In FIG. 30, another illustration of various configurations for the externa lighting device is shown, according to various embodiments. A twelfth image 3000 includes a first convex lighting device 3002, a second convex lighting device 3008, a third convex lighting device 3014, a fourth convex lighting device 3020, and a fifth convex lighting device 3026. In one example, the first convex lighting device 3002 may have a first convex diffuser 3004 and a first light source 3006. In this example, the first convex diffuser 3004 has a curved portion at a first circular angle (e.g., a first radian, a first angle, etc.). Further, the first light source 3006 has a first length, a first height, a first power output, and a first lumen output. In one example, the second convex lighting device 3008 may have a second convex diffuser 3010 and a second light source 3012. In this example, the second convex diffuser 3010 has a square portion with both sides at a second angle (e.g., 90 degrees) to a base. Further, the second light source 3012 has a second length, a second height, a second power output, and a second lumen output. In one example, the third convex lighting device 3014 may have a third convex diffuser 3016 and a third light source 3018. In this example, the third convex diffuser 3016 has a curved portion at a second circular angle (e.g., a second radian, a second angle, etc.). Further, the third light source 3018 has a third length, a third height, a third power output, and a third lumen output. In one example, the fourth convex lighting device 3020 may have a fourth convex diffuser 3022 and a fourth light source 3024. In this example, the fourth convex diffuser 3022 has a curved portion at a third circular angle (e.g., a third radian, a third angle, etc.). Further, the fourth light source 3024 has a fourth length, a fourth height, a fourth power output, and a fourth lumen output. In one example, the fifth convex lighting device 3026 may have a fifth convex diffuser 3028 and a fifth light source 3030. In this example, the fifth convex diffuser 3028 has a V-Shaped portion with two sides at a relative angle (e.g., from 1 degree to 180 degrees) to each other. Further, the fifth light source 3030 has a fifth length, a fifth height, a fifth power output, and a fifth lumen output. In addition, the various measurements disclosed with FIGS. 45-55 may be utilized in any combination with these examples.

In various examples, the first length, the second length, the third length, the fourth length, and the fifth length may be different lengths and/or one or more of these elements may be the same value. In various examples, the first height, the second height, the third height, the fourth height, and the fifth height may be different heights and/or one or more of these elements may be the same value. In various examples, the first power output, the second power output, the third power output, the fourth power output, and the fifth power output may be different power outputs and/or one or more of these elements may be the same value. In various examples, the first lumen output, the second lumen output, the third lumen output, the fourth lumen output, and the fifth lumen output may be different lumen outputs and/or one or more of these elements may be the same value. In various examples, the first convex lighting device 3002, the second convex lighting device 3008, the third convex lighting device 3014, the fourth convex lighting device 3020, and/or the fifth convex lighting device 3026 may be utilized as lighting devices for one or more external walls of light. Further, any other lighting device disclosure (e.g., concave lighting device) in this document may be utilized with any other lighting device (e.g., convex lighting device) disclosed in this document for one or more external walls of light.

Figure 31:
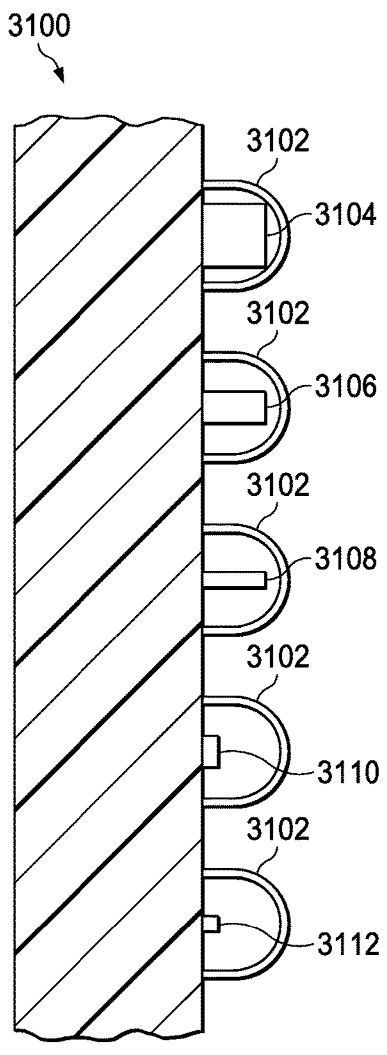
FIG. 31 is another illustration of various configurations for the externa lighting device, according to various embodiments.

In FIG. 31, another illustration of various configurations for the externa lighting device is shown, according to various embodiments. In one example, the first convex lighting device may have a first convex diffuser 3102 and a first light source 3104. In this example, the first convex diffuser 3102 has a curved portion at a first circular angle (e.g., a first radian, a first angle, etc.). Further, the first light source 3104 has a first length (e.g., 2 cm), a first height (e.g., 2 cm), a first power output (e.g., 100 milliwatts), and a first lumen output (e.g., 10 lumens). In another example, a second light source 3106 has a second length (e.g., 1 cm), a second height (e.g., 2.1 cm), a second power output (e.g., 50 milliwatts), and a second lumen output (e.g., 5 lumens). In another example, a third light source 3108 has a third length (e.g., 0.8 cm), a third height (e.g., 2.3 cm), a third power output (e.g., 150 milliwatts), and a third lumen output (e.g., 150 milliwatts). In another example, a fourth light source 3110 has a fourth length (e.g., 1.2 cm), a fourth height (e.g., 0.5 cm), a fourth power output (e.g., 75 milliwatts), and a fourth lumen output (e.g., 9 lumens). In another example, a fifth light source 3112 has a fifth length (e.g., 0.7 cm), a fifth height (e.g., 0.6 cm), a fifth power output (e.g., 25 milliwatts), and a fifth lumen output (e.g., 8 lumens). In addition, the various measurements disclosed with FIGS. 45-55 may be utilized in any combination with these examples.

Figure 32:
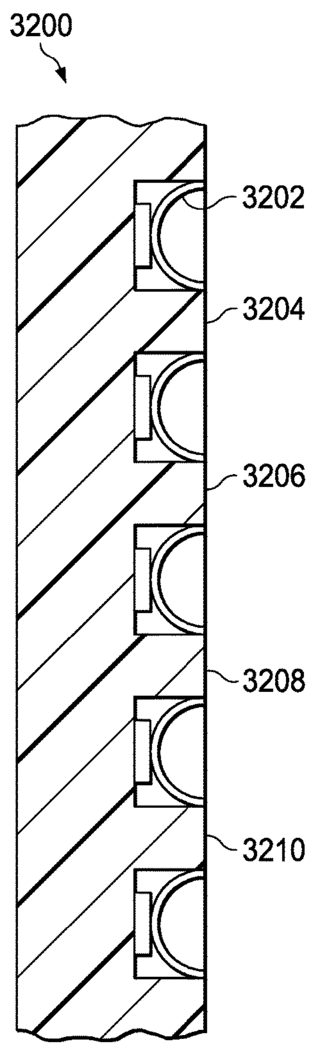
FIG. 32 is another illustration of various configurations for the externa lighting device, according to various embodiments.

In FIG. 32, another illustration of various configurations for the externa lighting device is shown, according to various embodiments. In this example, there are five concave lighting devices 3202 which are each separated from each other by a first area 3204, a second area 3206, a third area 3208, and a fourth area 3210. In this example, the first area 3204, the second area 3206, the third area 3208, and the fourth area 3210 are the same size. However, the first area 3204, the second area 3206, the third area 3208, and/or the fourth area 3210 may vary in size. Further, the material utilized for the first area 3204, the second area 3206, the third area 3208, and/or the fourth area 3210 may be selected to enhance and/or absorb light. In addition, the size of the areas utilized for the first area 3204, the second area 3206, the third area 3208, and the fourth area 3210 may be selected to enhance and/or absorb light.

Figure 33:
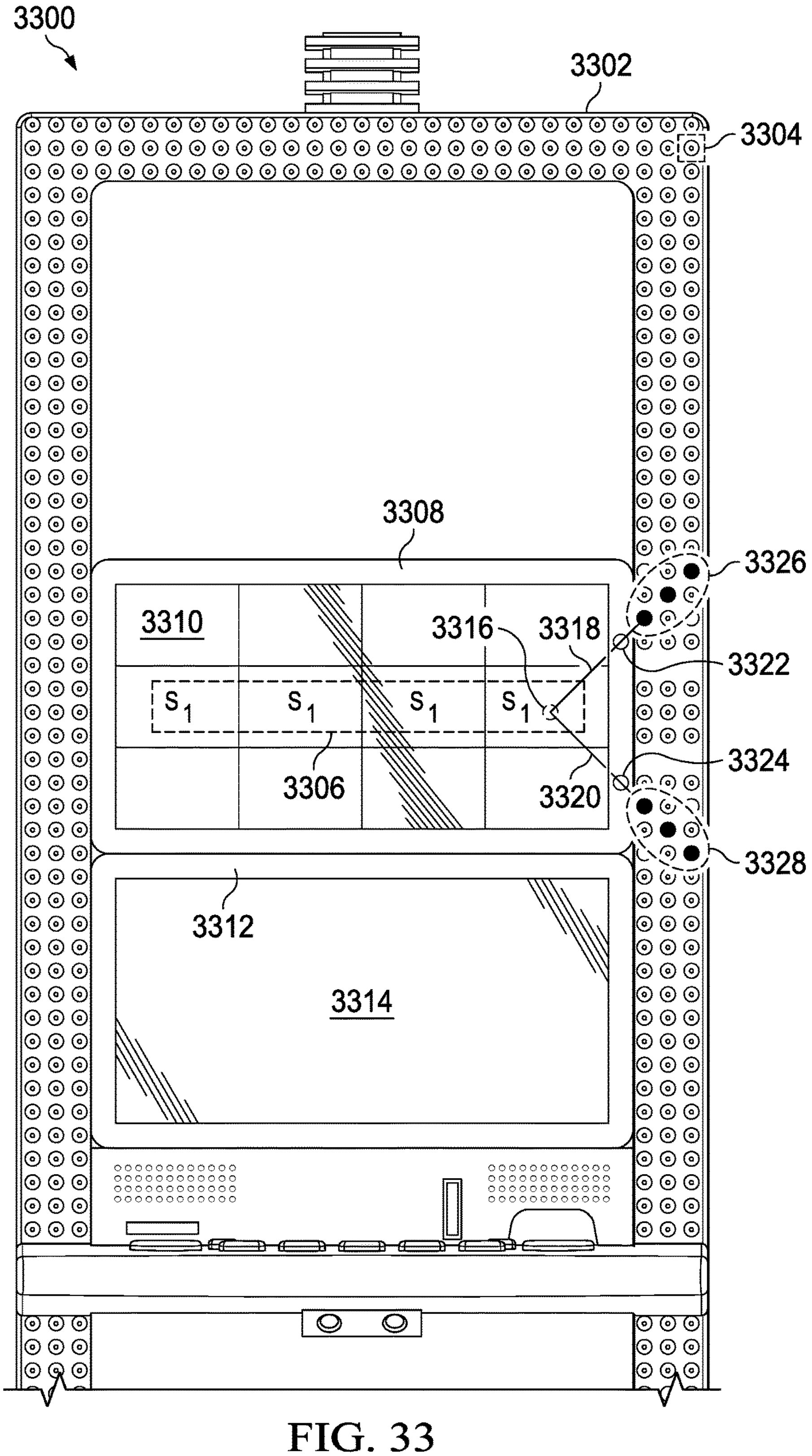
FIG. 33 is another illustration of an external lighting functionality on a gaming device, according to one embodiment.

In FIG. 33, another illustration of an external lighting functionality on a gaming device is shown, according to one embodiment. An electronic gaming device 3300 may include an external wall of lights 3302 which includes a plurality of light devices 3304. In one example, the electronic gaming device 3300 may include a first display screen 3310 and a second display screen 3314 where a first ring area 3308 surrounds at least a portion of the first display screen 3310 and a second ring area 3312 surrounds at least a portion of the second display screen 3314. In one example, a winning payline area 3306 includes an image 3316 which moves in a first movement direction 3318 and/or a second movement direction 3320. In this example, the image 3316 moves across the first ring area 3308 at a first ring point 3322 (via the first movement direction 3318) and/or a second ring point 3324 (via the second movement direction 3320). In addition, the image 3316 (and/or a portion of the image) moved to the external wall of lights 3302 to display a first external wall of lights image 3326. Further, the image 3316 (and/or a portion of the image) moved to the external wall of lights 3302 to display a second external wall of lights image 3328. In one example, a rocket image (image 3316) may take off and leave the first display screen 3310 and the first ring area 3308 and be viewed as the first external wall of lights image 3326. In another example, the rocket image (image 3316) may take off and crash via the first display screen 3310 and the first ring area 3308 and be viewed as crashing as the second external wall of lights image 3328. In addition, the first external wall of lights image 3326 and/or the second external wall of lights image 3328 may be utilized to enhance a prize relating to game play on the first display screen 3310 (and/or the second display screen 3314). For example, where the first external wall of lights image 3326 and/or the second external wall of lights image 3328 travels to, moves to, and/or stops on may enhance one or more prizes from game play.

Figure 34:
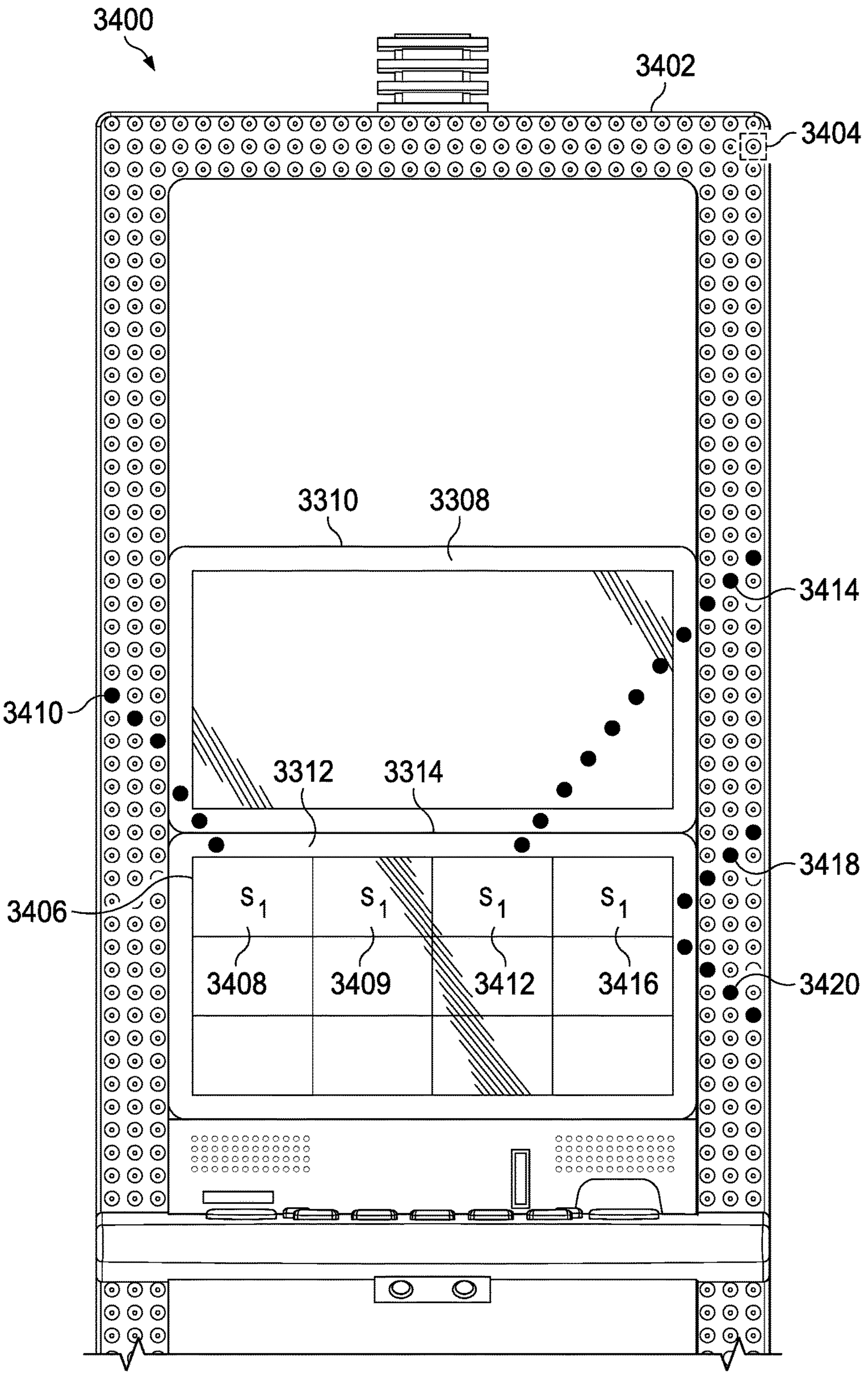
FIG. 34 is another illustration of an external lighting functionality on a gaming device, according to one embodiment.

In FIG. 34, another illustration of an external lighting functionality on a gaming device is shown, according to one embodiment. An electronic gaming device 3400 may include an external wall of lights 3402 which includes a plurality of lighting devices 3404. In this example, the electronic gaming device 3400 includes the first display screen 3310 with the first ring area 3308 and the second display screen 3314 with the second ring area 3312. Further, the second display screen 3314 may include a first symbol 3408, a second symbol 3409, a third symbol 3412, and a fourth symbol 3416 on a game play area 3406 (e.g., reel area, symbol display area, etc.). In this example, the first symbol 3408 (and/or a portion of the first symbol and/or a presentation associated with the first symbol 3408) may move via a first path 3410 which moved through the second display screen 3314, the second ring area 3312, the first ring area 3308, and the externa wall of lights 3402. Further, the second symbol 3409 does not move. In addition, the third symbol 3412 (and/or a portion of the second symbol and/or a presentation associated with the second symbol 3412) may move via a second path 3414 which moved through the second display screen 3314, the second ring area 3312, the first ring area 3308, the first display screen 3310, and the externa wall of lights 3402. Further, the fourth symbol 3416 (and/or a portion of the fourth symbol and/or a presentation associated with the fourth symbol 3416) may move via a third path 3418 and/or a fourth path 3420 through the second display screen 3314, the second ring area 3312 and the external wall of lights 3402.

Figure 35:
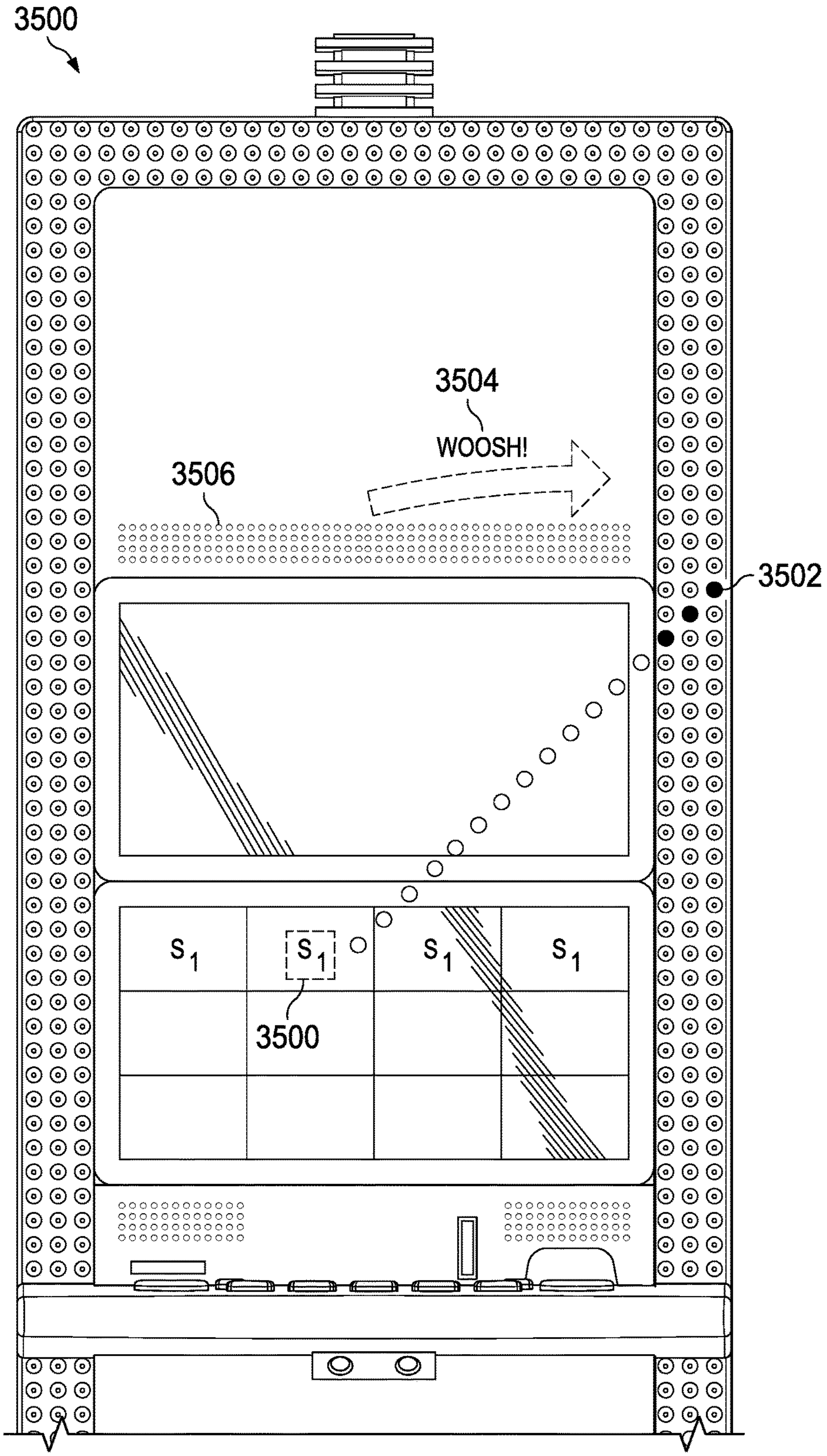
FIG. 35 is another illustration of an external lighting functionality on a gaming device, according to one embodiment.

In FIG. 35, another illustration of an external lighting functionality on a gaming device is shown, according to one embodiment. In this example, a second symbol 3500 moves via a first path 3502 through the second display screen 3314, the second ring area 3312, the first ring area 3308, the first display screen 3310, and the external wall of lights 3402. In this example, during the movement of the second symbol 3500 (and/or a portion of second symbol and/or a presentation related to second symbol 3500), one or more speakers 3506 generates a sound 3504 which may be synchronized with the movement of the second symbol 3500. In addition, the sounds generated may not be synchronized with the movement of the second symbol 3500.

Figure 36:
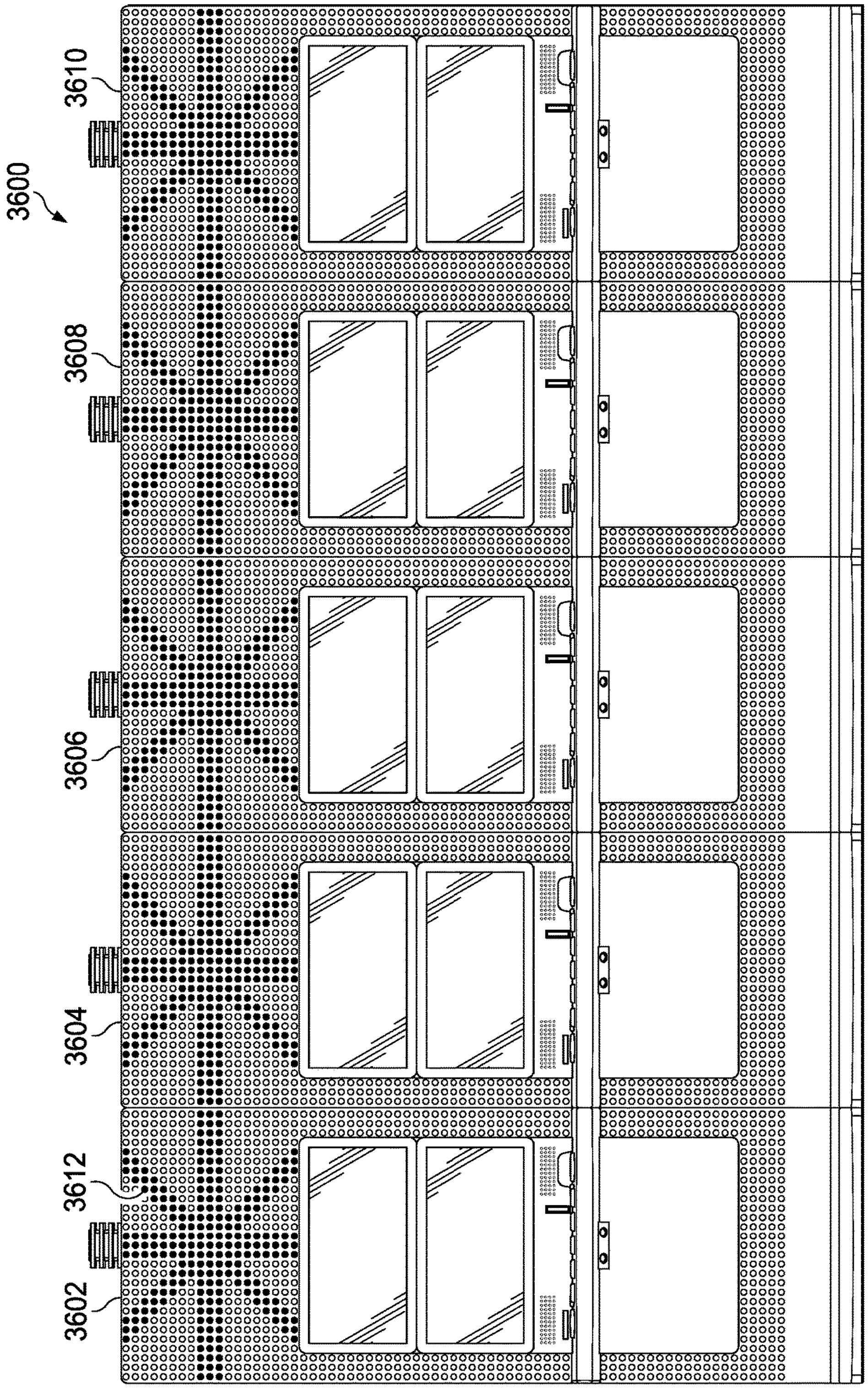
FIG. 36 is another illustration of an external lighting functionality on a gaming device, according to one embodiment.
Figure 37:
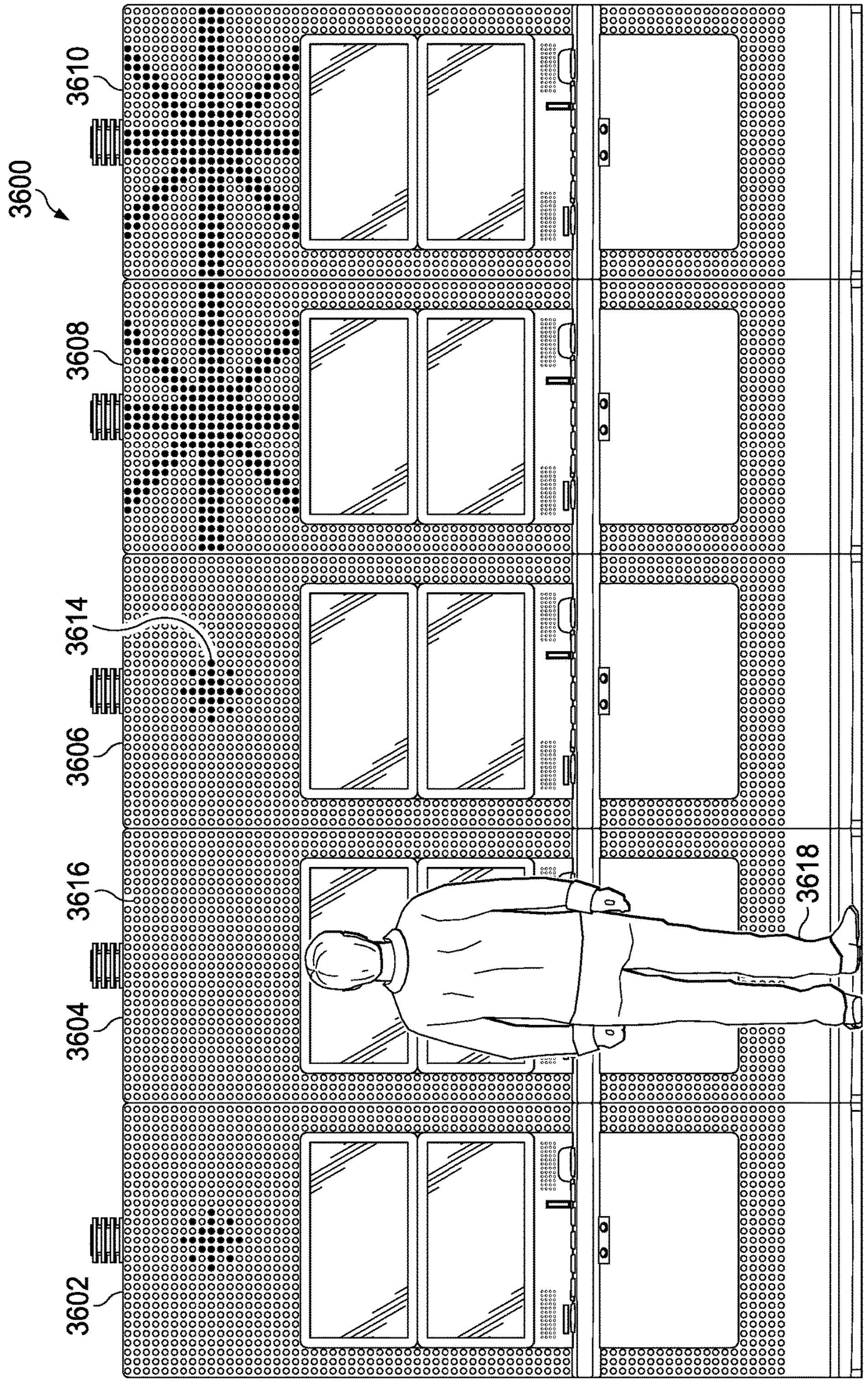
FIG. 37 is another illustration of an external lighting functionality on a gaming device, according to one embodiment.

In FIG. 36, another illustration of an external lighting functionality on a gaming device is shown, according to one embodiment. A banked game image 3600 includes a first electronic gaming device 3602, a second electronic gaming device 3604, a third electronic gaming device 3606, a fourth electronic gaming device, and an Nth electronic gaming device 3610 in a banked formation. In this example, an image 3612 may be created which utilizes one or more display areas on one or more of the first electronic gaming device 3602, the second electronic gaming device 3604, the third electronic gaming device 3606, the fourth electronic gaming device, and the Nth electronic gaming device 3610. Further, the image 3612 may be utilized in an attraction mode, gaming mode, advertisement mode, and/or any combination thereof. In this example, the image 3612 may be utilized in this example as a high attraction mode function. In another example shown in FIG. 37, once a player 3618 engages with the second electronic gaming device 3604, the attraction mode which was symbolized by image 3612 may be eliminated and/or stopped. Further, a low level attraction mode (e.g., a second image 3614) may be implemented on the gaming devices (e.g., the first electronic gaming device 3602 and the third electronic gaming device 3606) adjacent to the electronic gaming device (e.g., the second electronic gaming device 3604) which the player has engaged with. Further, the high attraction mode function (symbolized by the image 3612) may continue on the fourth electronic gaming device 3608 and/or the Nth electronic gaming device 3610.

Figure 38:
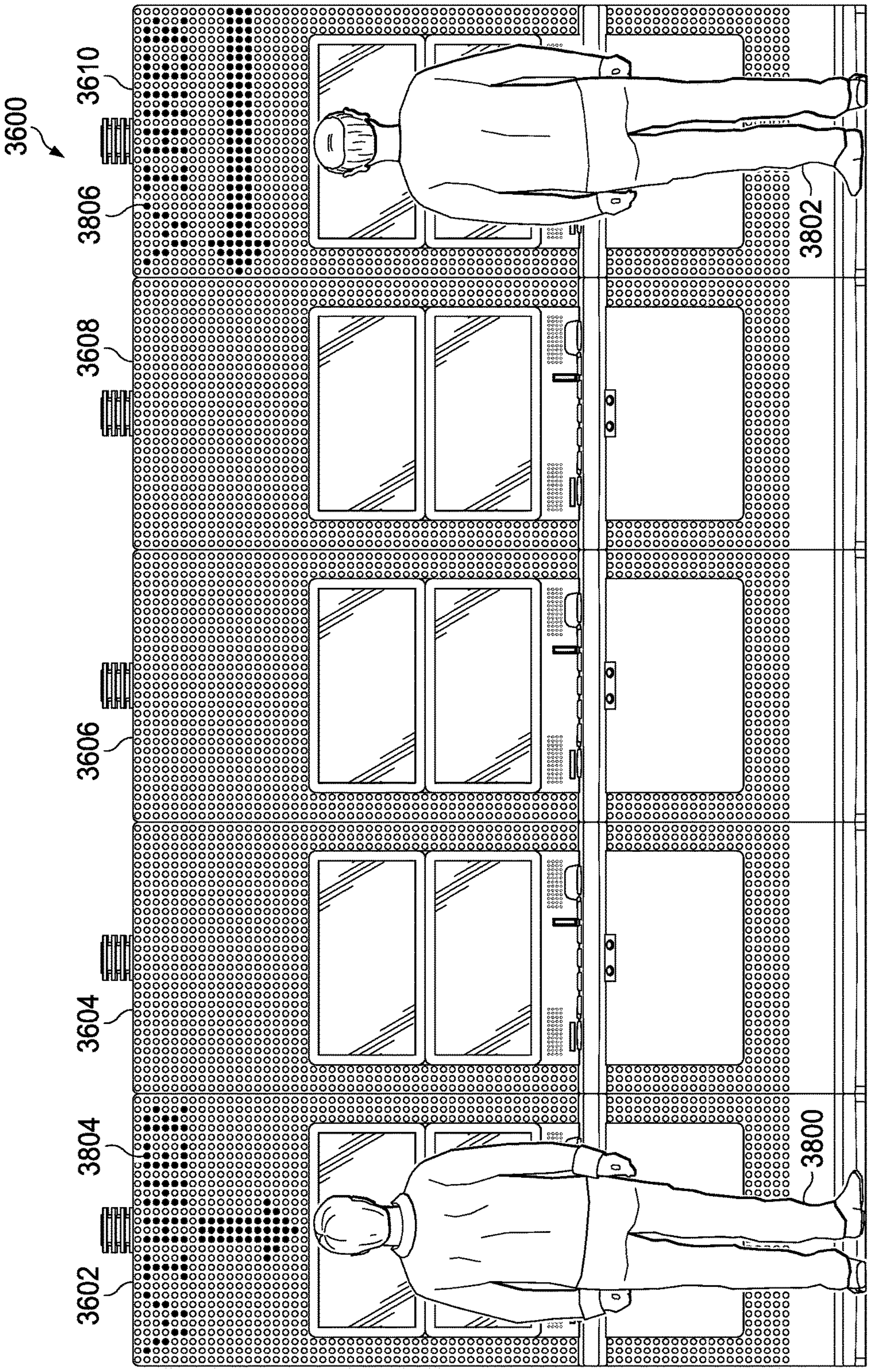
FIG. 38 is another illustration of an external lighting functionality on a gaming device, according to one embodiment.

In FIG. 38, another illustration of an external lighting functionality on a gaming device is shown, according to one embodiment. In this example, a first player 3800 is engaged (e.g., playing) with the first electronic gaming device 3602 while a second player 3802 is playing the Nth electronic gaming device 3610. In this example, the first player 3800 via the first electronic gaming device 3602 has generated a winning event. In this example, the Nth electronic gaming device 3610 may generate a message 3806 via the external wall of lights which indicates that the first player 3800 has generated a winning event where the message 3806 allows the second player 3802 to know that a winning event has occurred on another electronic gaming device. Further, a second message 3804 may be generated on the external wall of lights on the first electronic gaming device 3602 to indicate that the first electronic gaming device 3602 is the winning device. In one example, when the first player 3800 wins a prize, the second player 3802 is also awarded a prize. In another example, when the second player 3802 wins a prize, the first player 3800 is also awarded a prize.

Figure 39:
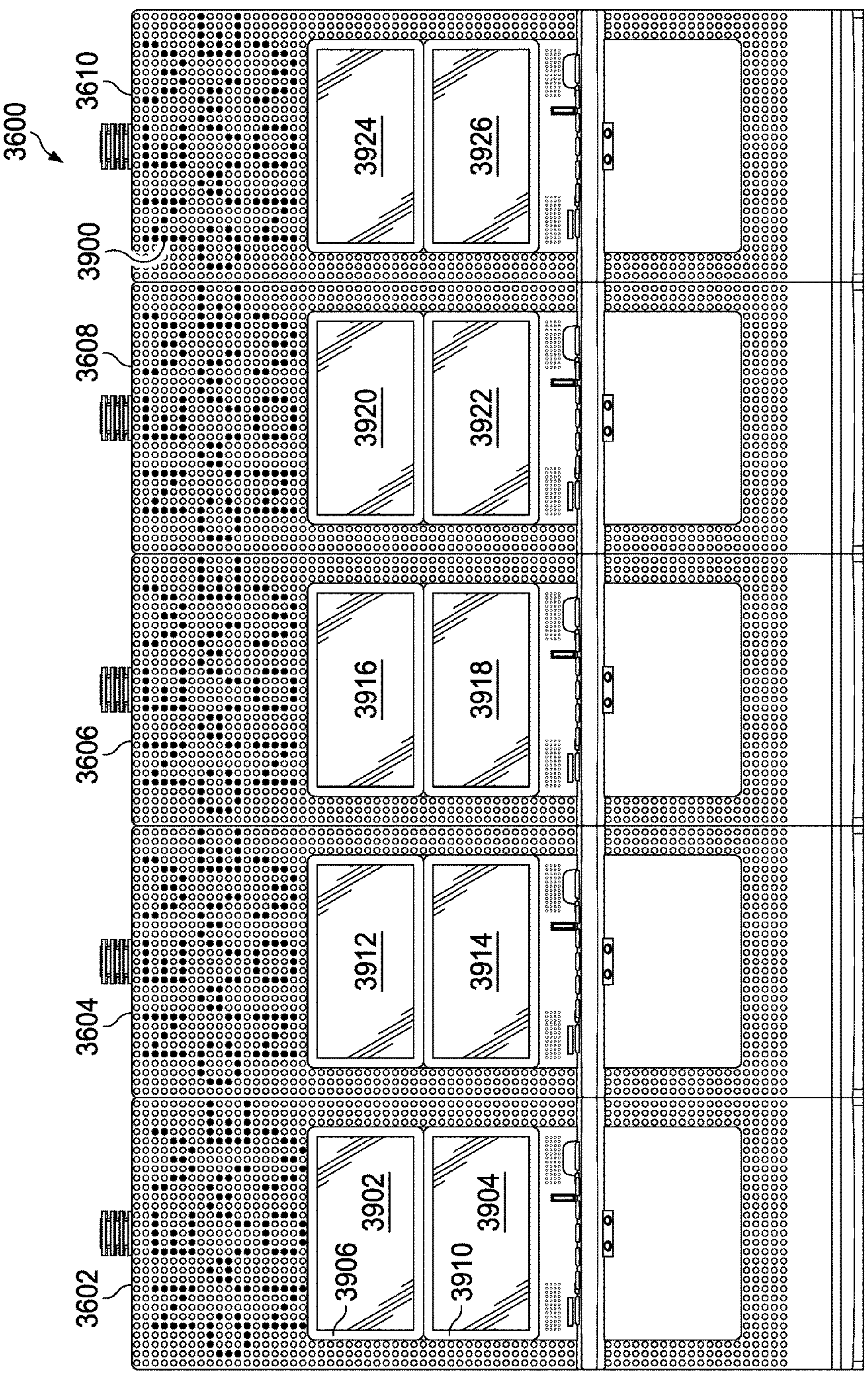
FIG. 39 is another illustration of an external lighting functionality on a gaming device, according to one embodiment.

In FIG. 39, another illustration of an external lighting functionality on a gaming device is shown, according to one embodiment. In this example, an advertisement message 3900 (and/or announcement message) is being displayed via one or more external wall of lights on one or more of the first electronic gaming device 3602, the second electronic gaming device 3604, the third electronic gaming device 3606, the fourth electronic gaming device, and the Nth electronic gaming device 3610. Further, the advertisement message 3900 may also be displayed utilizing any display screen (e.g., 3902, 3904, 3912, 3914, 3916, 3918, 3920, 3922, 3924, and/or 3926) associated with the first electronic gaming device 3602, the second electronic gaming device 3604, the third electronic gaming device 3606, the fourth electronic gaming device, and the Nth electronic gaming device 3610. In addition, the advertisement message 3900 may also be displayed utilizing any ring areas (e.g., 3906, 3910 for first electronic gaming device as an example) associated with the first electronic gaming device 3602, the second electronic gaming device 3604, the third electronic gaming device 3606, the fourth electronic gaming device, and the Nth electronic gaming device 3610.

Figure 40:
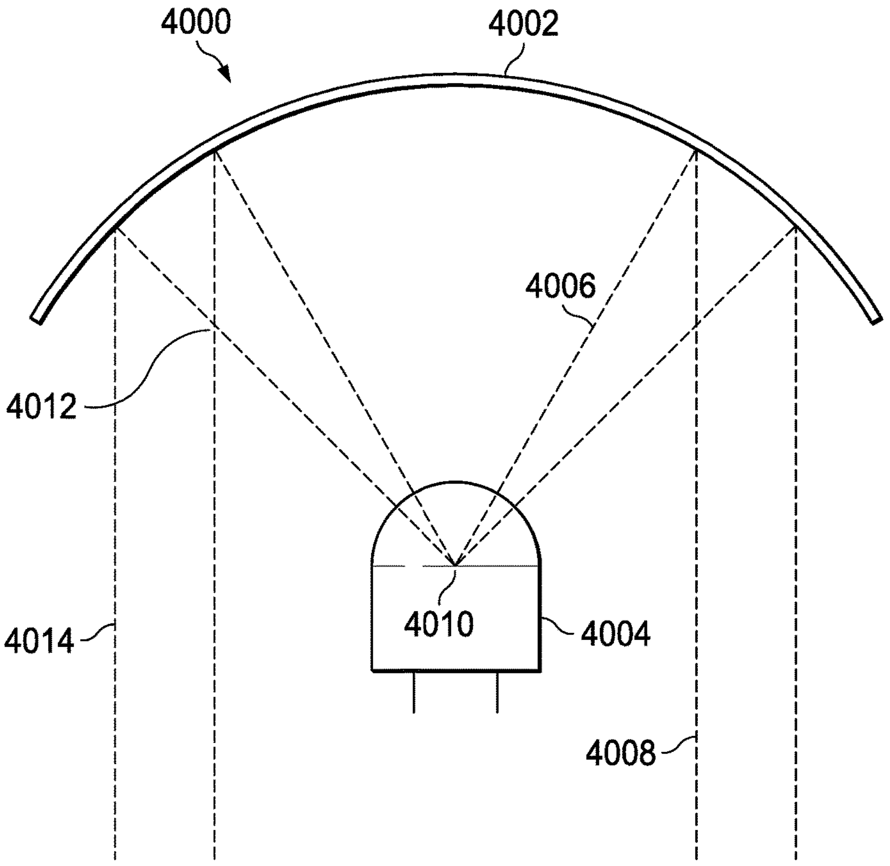
FIG. 40 is another illustration of an external lighting device configuration, according to one embodiment.

In FIG. 40, another illustration of an external lighting device configuration is shown, according to one embodiment. A lighting device 4000 may include a lighting source 4004 and a diffuser 4002. In this example, light 4010 is emitting from the lighting source 4004 via a first path 4006 and a second path 4012 towards the diffuser 4002. The diffuser 4002 redirects the first path 4006 to a third path 4008 and the second path 4012 to a fourth path 4014 which directs light to the targeted area.

Figure 41:
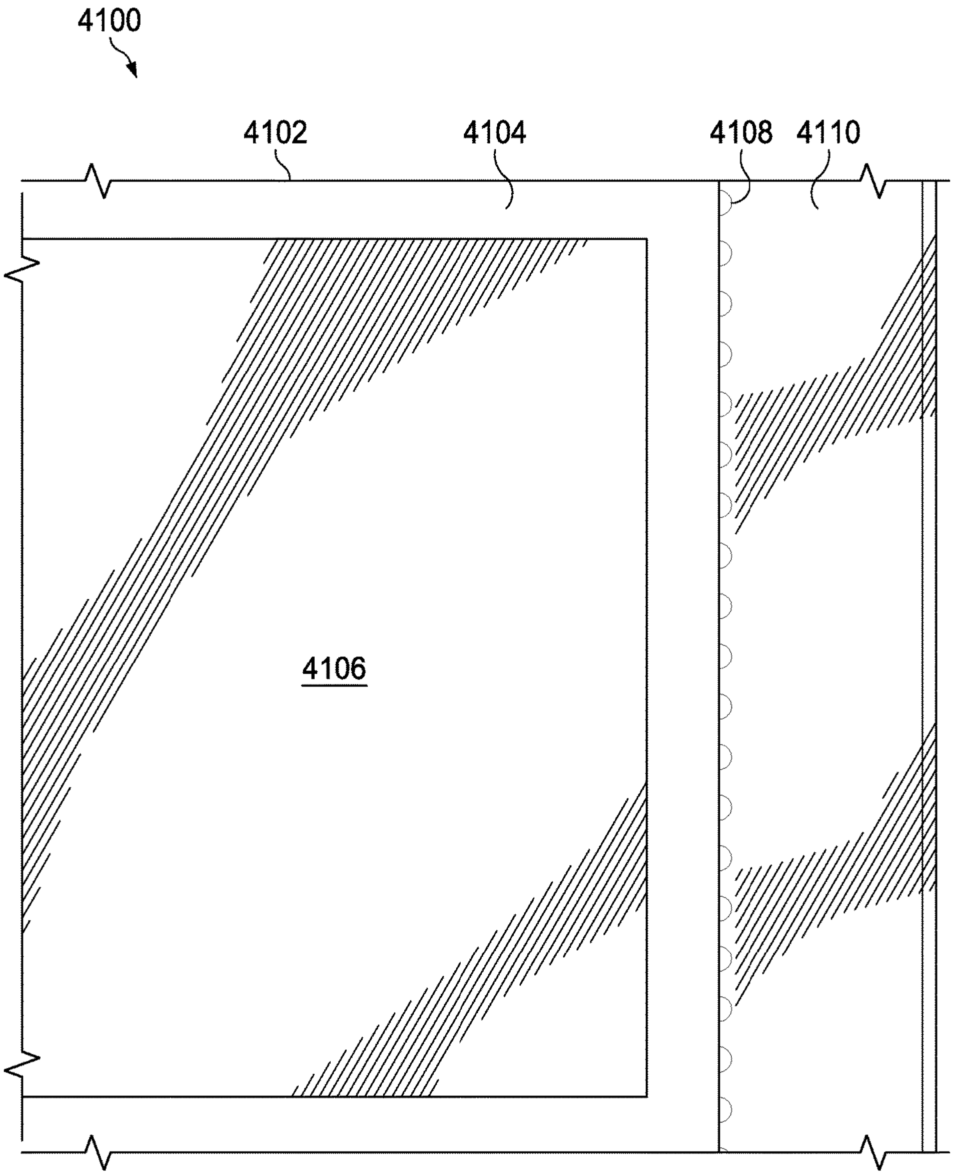
FIG. 41 is another illustration of an external lighting device configuration, according to one embodiment.

In FIG. 41, another illustration of an external lighting device configuration is shown, according to one embodiment. A cabinet image 4100 may include an electronic gaming device 4102 with a ring area 4104, a display screen 4106, a plurality of lighting sources 4108, and an external material 4110. In this example, the plurality of lighting sources 4108 are positioned adjacent to the ring area 4104 (however, the plurality of lighting sources 4108 may also be positioned adjacent to the display screen 4106 and/or any other location on the cabinet which would allow the plurality of lighting sources 4108 to illuminate the external material 4110). In this example, the plurality of lighting sources 4108 direct light towards the external material 4110 to create an external wall of lights and/or simulate an external wall of lights.

Figure 42:
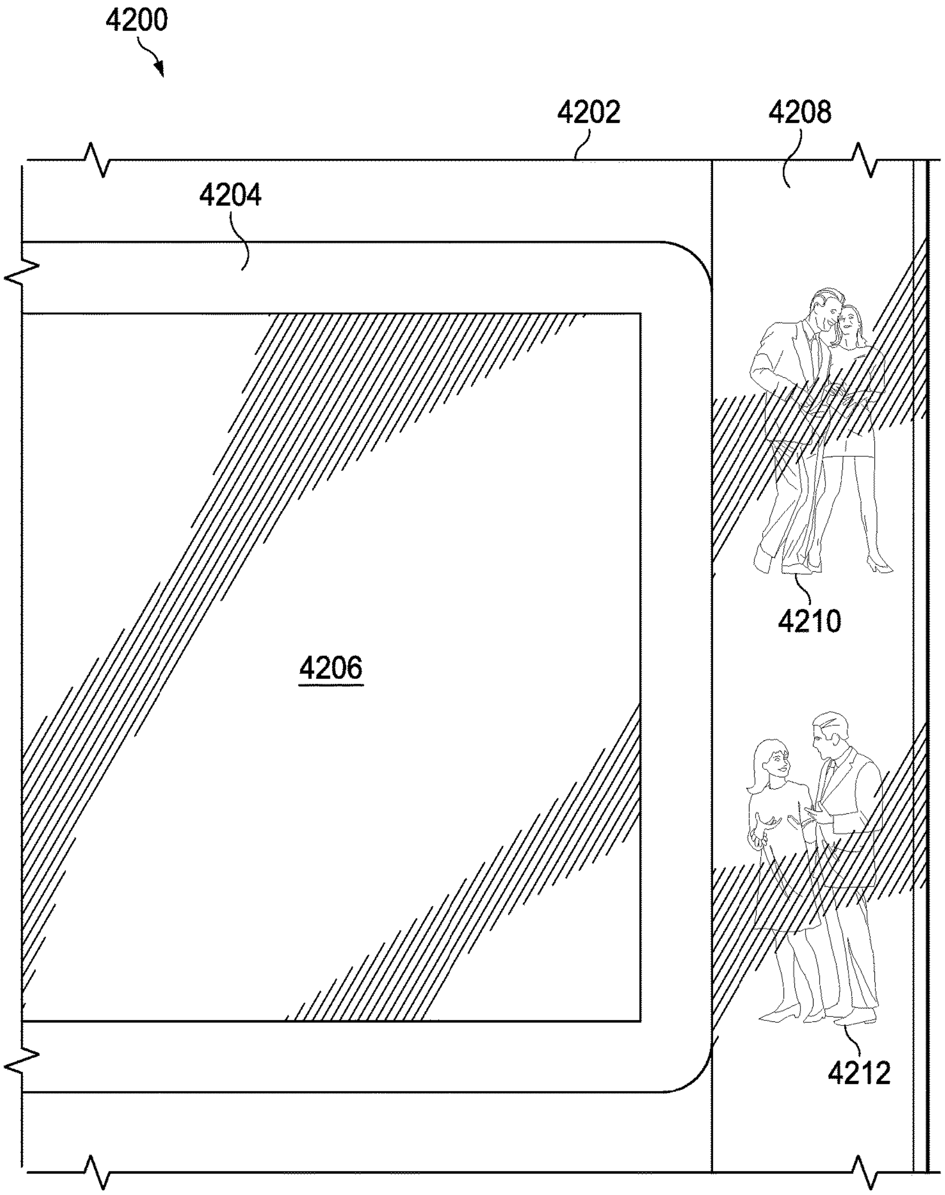
FIG. 42 is another illustration of an external lighting device configuration, according to one embodiment.

In FIG. 42, an illustration of a simulated external lighting wall is shown, according to one embodiment. A second cabinet image 4200 may include an electronic gaming device 4202 with a ring area 4204, a display screen 4206, and a reflective material area 4208. In this example, the simulated external lighting wall which is located on the reflective material area 4208 displays a first image 4210 and a second image 4212 which are generated by ambient images surrounding the electronic gaming device 4202.

Figure 43:
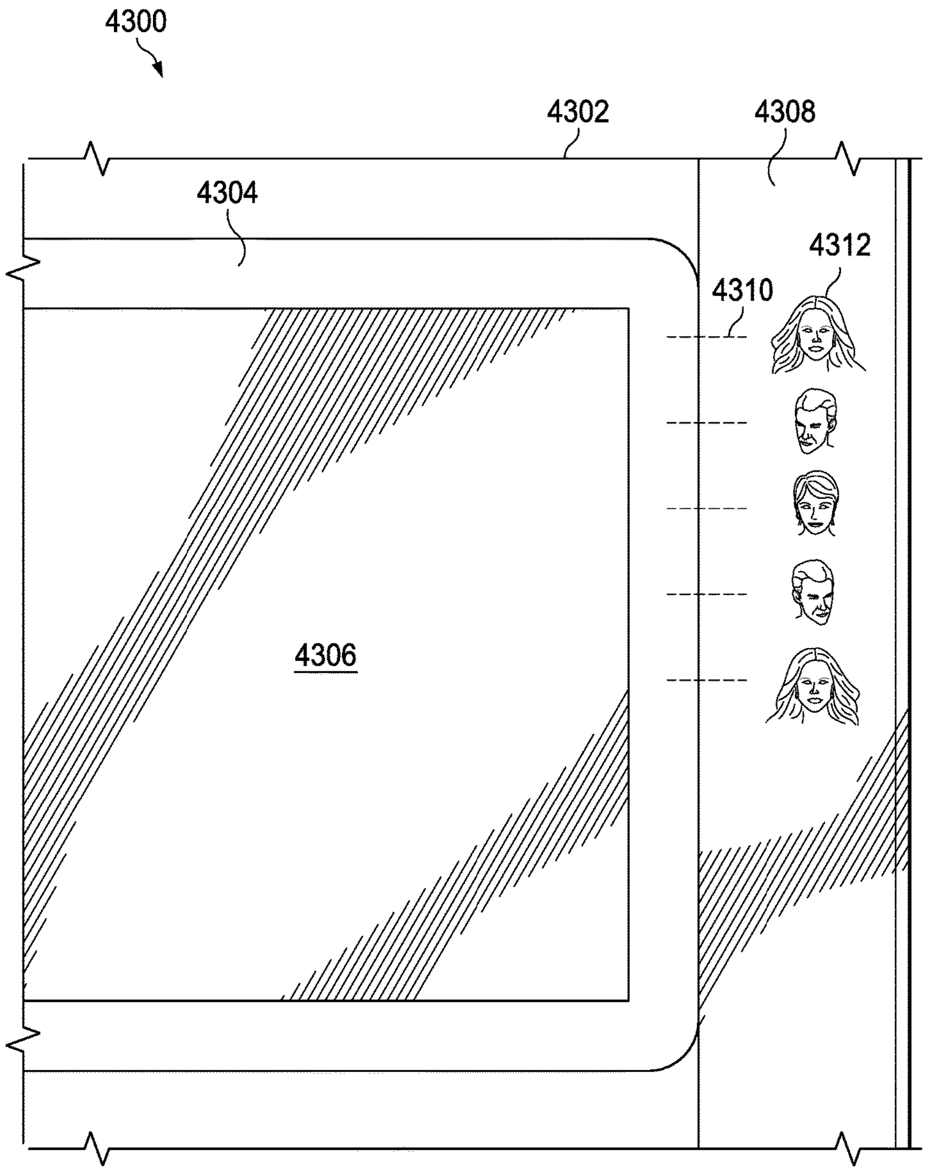
FIG. 43 is another illustration of an external lighting device configuration, according to one embodiment.

In FIG. 43, an illustration of an external lighting device configuration is shown, according to one embodiment. A ring area lighting source image 4300 may include an electronic gaming device 4302 with a ring area 4304, a display screen 4306, and a target material area 4308. In this example, the ring area 4304 is utilized to direct light 4310 to generate one or more images on the target material area 4308.

Figure 44A:
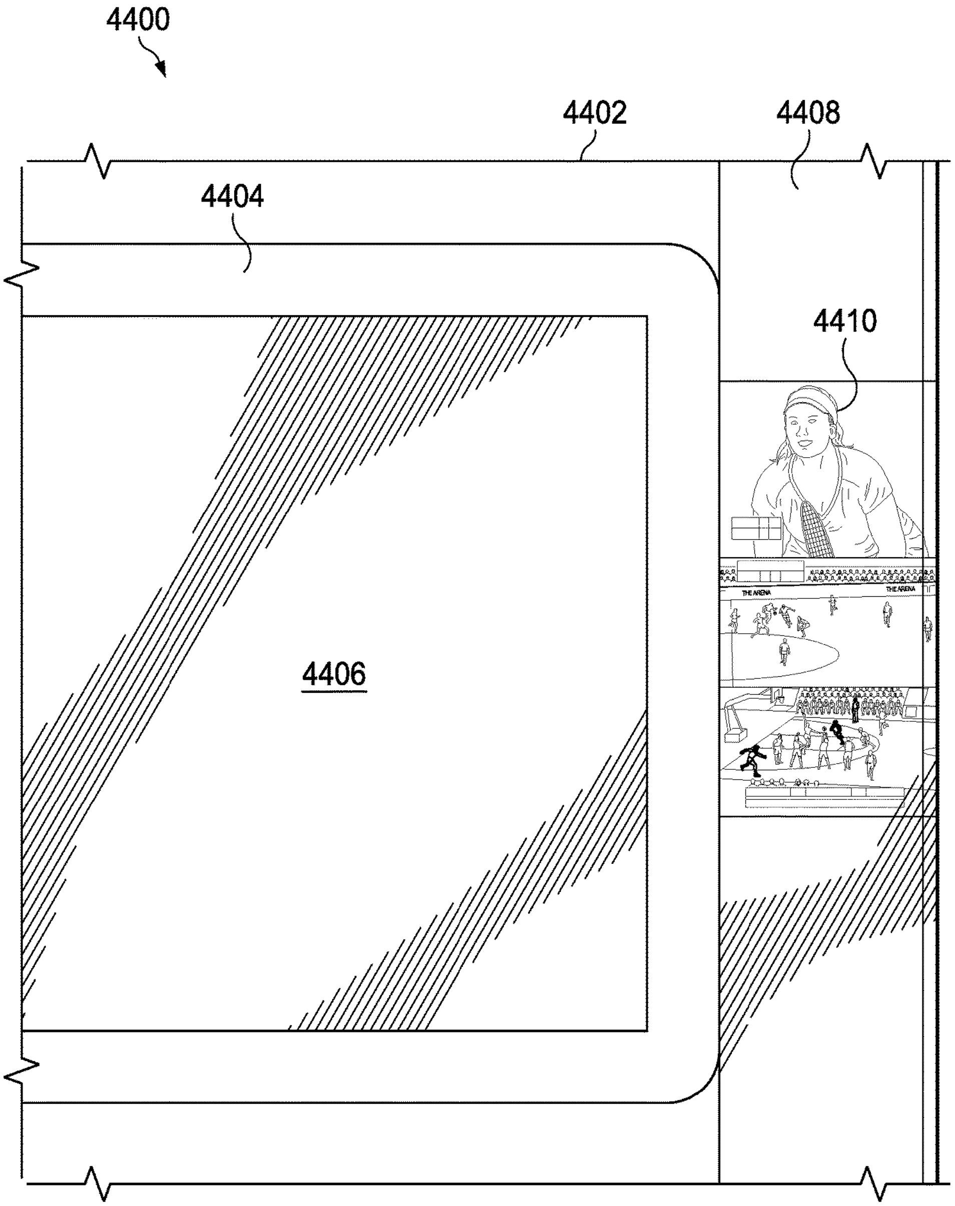
FIG. 44A is another illustration of an external lighting device configuration, according to one embodiment.

In FIG. 44A, another illustration of an external lighting device configuration is shown, according to one embodiment. A third cabinet image 4400 includes an electronic gaming device 4402 with a ring area 4404, a display screen 4406, and a video display strip area 4408. In this example, the video display strip area 4408 streams one or more images 4410.

Figure 44B:
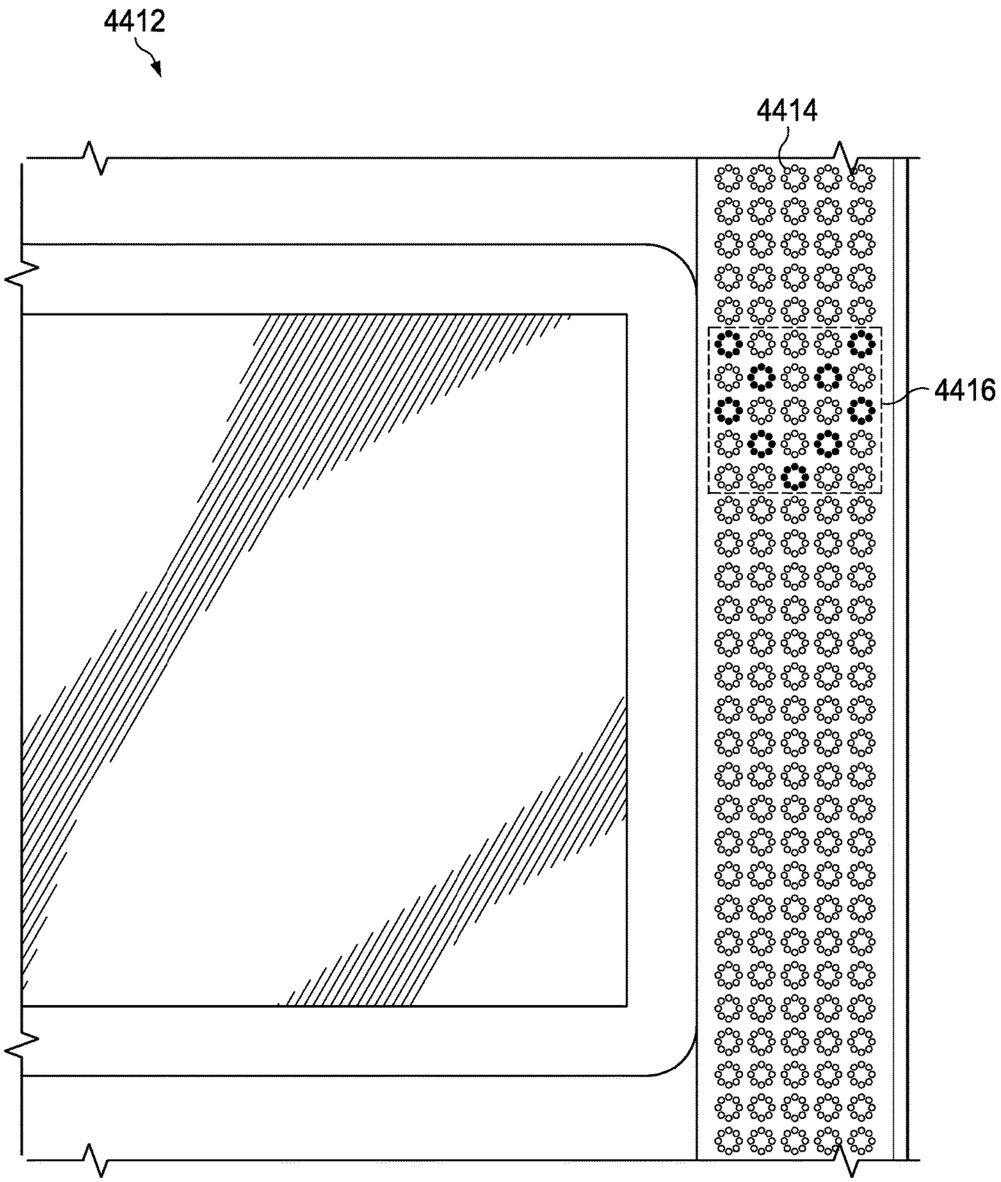
FIG. 44B is another illustration of an external lighting device configuration, according to one embodiment.

In FIG. 44B, another illustration of an external lighting device configuration is shown, according to one embodiment. A fourth cabinet image 4412 includes an external wall of lights 4414 (see FIGS. 9-22). In this example, a video feed with a first video frame, a second video frame, and an Nth video frame may be converted into an LED grid pattern which is then displayed via one or more LED light sources on the external wall of lights 4414. In this example, a converted image 4416 is shown on the external wall of lights 4414 where the converted image 4416 was originally one or more video frames.

Figure 45:
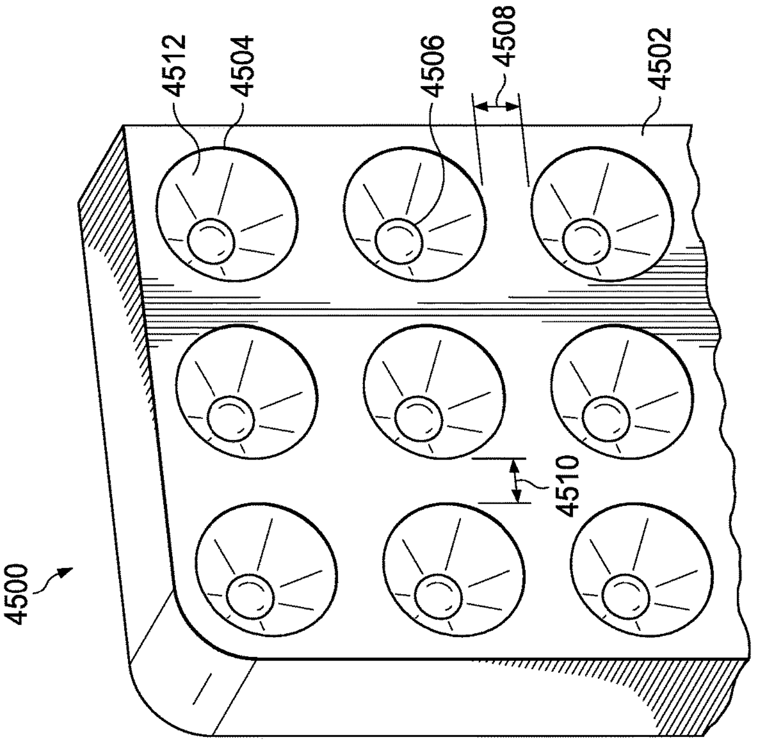
FIG. 45 is another illustration of an external lighting device configuration, according to one embodiment.

In FIG. 45, another illustration of an external lighting device configuration is shown, according to one embodiment. A first external wall of lights image 4500 includes a first surface area 4502, a first lighting device 4504 (and/or a plurality of lighting devices), and a first light source 4506. In this example, a first vertical distance 4508 and a first horizontal distance 4510 may be utilized to separate one lighting device from another lighting device. Further, the first surface area 4502 may be a lit surface, a non-lit surface, a light absorbing surface, a reflective surface, and/or any combination thereof. In addition, the first lighting device 4504 may have a first diffuser 4512 where the first diffuser 4512 has a first concave shape. The first concave shape is a cylinder shape and/or semi-circle shape in this example. In addition, the first light source 4506 has a circle shape. In one example of a cup with medium round design and a small domed diffuser with gloss configuration measurements may be an overall width of 2.5", a cup/prism width of 0.59", a cup/prism depth of 0.16", a diffuser width of 0.18", and a diffuser height of 0.16". Further, these measurements may be utilized with any configuration shown in this disclosure. Further, the overall width may be within 1" to 5", a cup/prism width may be within 0.25" to 1.5", a cup/prism depth may be 0.10" to 0.35, a diffuser width of 0.1" to 0.3", and a diffuser height of 0.12" to 0.22". In addition, a first vertical distance 4508 may be in a range from 0.01" to 1.0". Further, a first horizontal distance 4510 may be in a range from 0.01" to 1.0".

Figure 46:
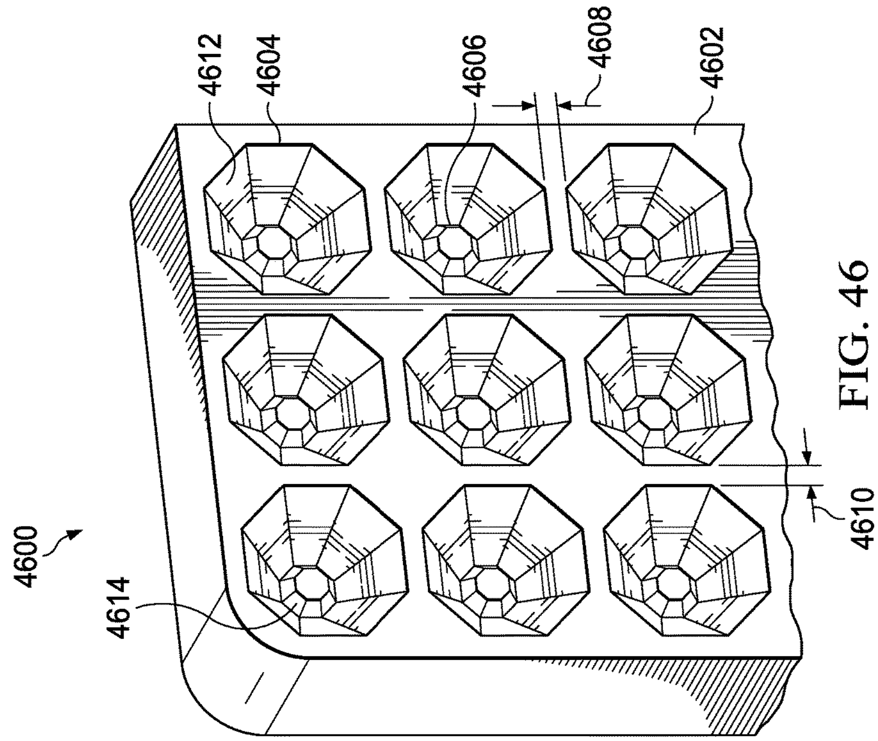
FIG. 46 is another illustration of an external lighting device configuration, according to one embodiment.

In FIG. 46, another illustration of an external lighting device configuration is shown, according to one embodiment. A second external wall of lights image 4600 includes a second surface area 4602, a second lighting device 4604 (and/or a plurality of lighting devices), and a second light source 4606. In this example, a second vertical distance 4608 and a second horizontal distance 4610 may be utilized to separate one lighting device from another lighting device. Further, the second surface area 4602 may be a lit surface, a non-lit surface, a light absorbing surface, a reflective surface, and/or any combination thereof. In addition, the second lighting device 4604 may have a second diffuser 4612 where the second diffuser 4612 has a second concave shape. The second concave shape is an octagon shape (e.g., a first sized octagon shape) in this example. In addition, the second light source 4606 has an octagon shape. In one example of a cup with large octagon design and a large octagon diffuser with gloss configuration measurements may be an overall width of 2.5", a cup/prism width of 0.75", a cup/prism depth of 0.39", a diffuser width of 0.25", and a diffuser height of 0.21". Further, these measurements may be utilized with any configuration shown in this disclosure. Further, the overall width may be within 1.1" to 5.2", a cup/prism width may be within 0.225" to 1.65", a cup/prism depth may be 0.10" to 0.55, a diffuser width of 0.12" to 0.45", and a diffuser height of 0.1" to 0.3". In addition, a second vertical distance 4608 may be in a range from 0.001" to 1.1". Further, a second horizontal distance 4610 may be in a range from 0.001" to 1.01".

Figure 47:
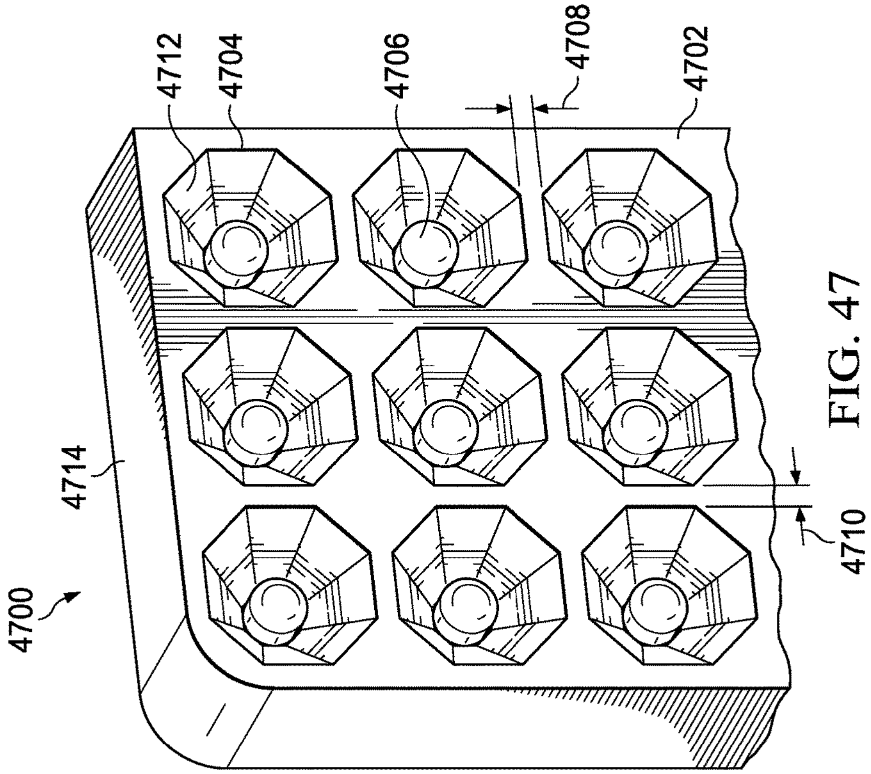
FIG. 47 is another illustration of an external lighting device configuration, according to one embodiment.

In FIG. 47, another illustration of an external lighting device configuration is shown, according to one embodiment. A third external wall of lights image 4700 includes a third surface area 4702, a third lighting device 4704 (and/or a plurality of lighting devices), and a third light source 4706. In this example, a third vertical distance 4708 and a third horizontal distance 4710 may be utilized to separate one lighting device from another lighting device. Further, the third surface area 4702 may be a lit surface, a non-lit surface, a light absorbing surface, a reflective surface, and/or any combination thereof. In addition, the third lighting device 4704 may have a third diffuser 4712 where the third diffuser 4712 has a third concave shape. The third concave shape is an octagon shape (e.g., a second sized octagon shape which is larger than the first sized octagon shape) in this example. In addition, the third light source 4606 has an octagon shape which is larger than the octagon shape utilized for the second light source 4506. In addition, a side wall 4714 may be any length, width, and thickness. In one example of a cup with large octagon design and a large round diffuser with matte configuration measurements may be an overall width of 2.5", a cup/prism width of 0.75", a cup/prism depth of 0.39", a diffuser width of 0.25", and a diffuser height of 0.23". Further, these measurements may be utilized with any configuration shown in this disclosure. Further, the overall width may be within 1" to 5", a cup/prism width may be within 0.25" to 1.5", a cup/prism depth may be 0.10" to 0.55", a diffuser width of 0.08" to 0.46", and a diffuser height of 0.11" to 0.44". In addition, a third vertical distance 4708 may be in a range from 0.02" to 0.9". Further, a third horizontal distance 4710 may be in a range from 0.03" to 0.8".

Figure 48:
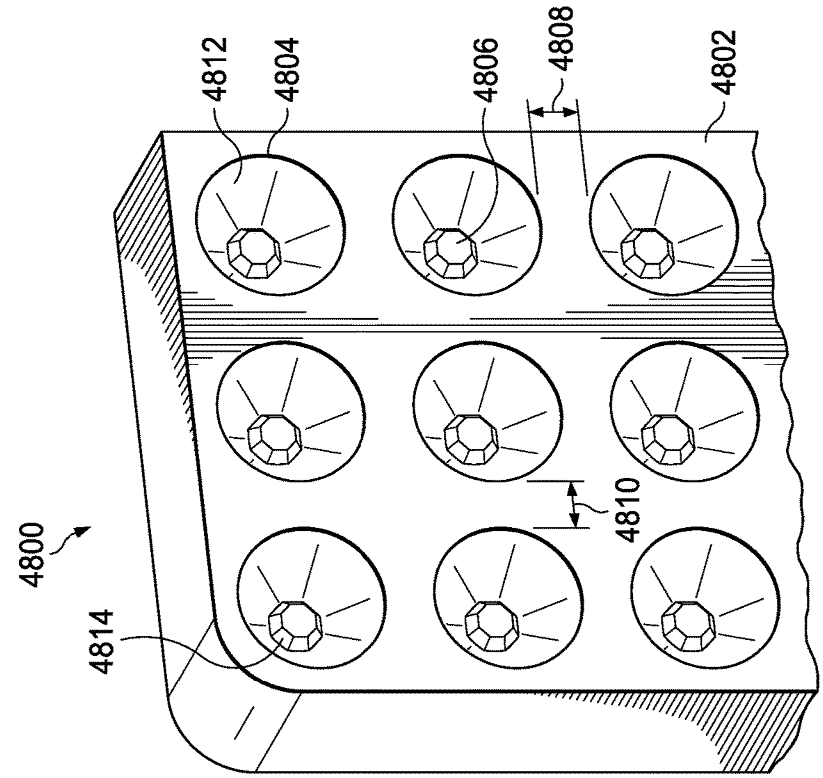
FIG. 48 is another illustration of an external lighting device configuration, according to one embodiment.

In FIG. 48, another illustration of an external lighting device configuration is shown, according to one embodiment. A fourth external wall of lights image 4800 includes a fourth surface area 4802, a fourth lighting device 4804 (and/or a plurality of lighting devices), and a fourth light source 4806. In this example, a fourth vertical distance 4808 and a fourth horizontal distance 4810 may be utilized to separate one lighting device from another lighting device. Further, the fourth surface area 4802 may be a lit surface, a non-lit surface, a light absorbing surface, a reflective surface, and/or any combination thereof. In addition, the fourth lighting device 4804 may have a fourth diffuser 4812 where the fourth diffuser 4812 has a fourth concave shape. The fourth concave shape is an octagon shape (e.g., a third sized octagon shape which is larger than the first and/or second sized octagon shape) in this example. In addition, the fourth light source 4806 has a round, circle, and/or semi-circle shape which is larger than the first light source size. In one example of a cup with large round design and a large octagon diffuser with gloss configuration measurements may be an overall width of 2.5", a cup/prism width of 0.63", a cup/prism depth of 0.20", a diffuser width of 0.25", and a diffuser height of 0.21". Further, these measurements may be utilized with any configuration shown in this disclosure. Further, the overall width may be within 1" to 5", a cup/prism width may be within 0.35" to 1.45", a cup/prism depth may be 0.10" to 0.55", a diffuser width of 0.11" to 0.47", and a diffuser height of 0.10" to 0.32". In addition, a fourth vertical distance 4808 may be in a range from 0.011" to 1.01". Further, a fourth horizontal distance 4810 may be in a range from 0.011" to 1.01".

Figure 49:
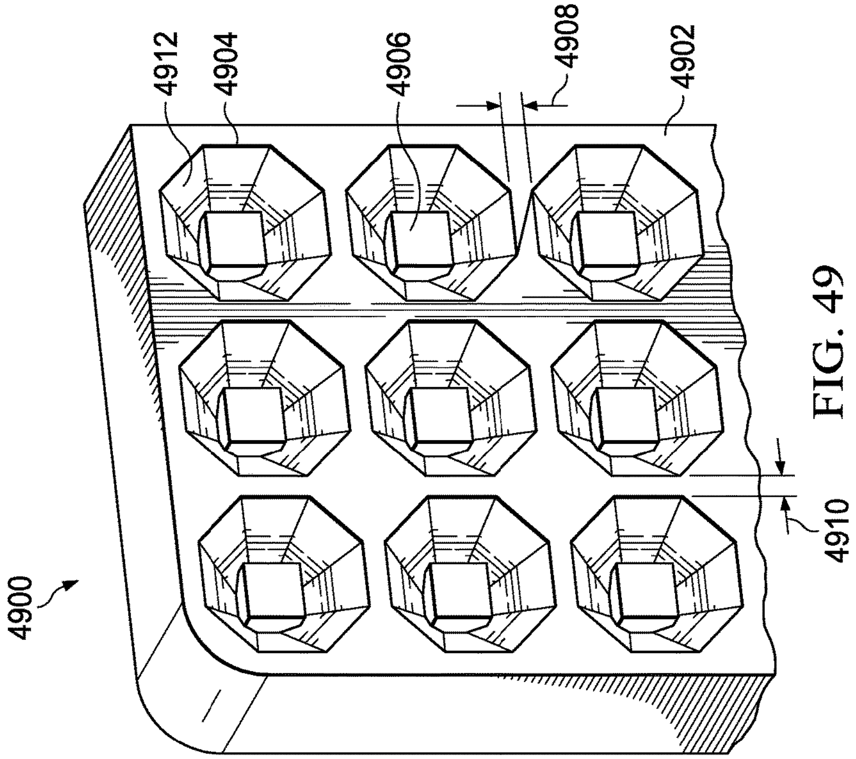
FIG. 49 is another illustration of an external lighting device configuration, according to one embodiment.

In FIG. 49, another illustration of an external lighting device configuration is shown, according to one embodiment. A fifth external wall of lights image 4900 includes a fifth surface area 4902, a fifth lighting device 4904 (and/or a plurality of lighting devices), and a fifth light source 4906. In this example, a fifth vertical distance 4908 and a fifth horizontal distance 4910 may be utilized to separate one lighting device from another lighting device. Further, the fifth surface area 4902 may be a lit surface, a non-lit surface, a light absorbing surface, a reflective surface, and/or any combination thereof. In addition, the fifth lighting device 4904 may have a fifth diffuser 4912 where the fifth diffuser 4912 is a large square diffuser and has a fifth concave shape. The fifth concave shape is a square octagon shape (e.g., a fourth sized octagon shape) in this example. In addition, the fifth light source 4906 has a square shape. In this example, the diffuser has a rough coating. In one example of a cup with large octagon design and a large square diffuser with matte configuration measurements may be an overall width of 2.5", a cup/prism width of 0.75", a cup/prism depth of 0.39", a diffuser width of 0.27", and a diffuser height of 0.20". Further, these measurements may be utilized with any configuration shown in this disclosure. Further, the overall width may be within 1" to 5", a cup/prism width may be within 0.25" to 1.5", a cup/prism depth may be 0.10" to 0.55", a diffuser width of 0.0.5" to 0.75", and a diffuser height of 0.15" to 0.54". In addition, a fifth vertical distance 4908 may be in a range from 0.04" to 0.7". Further, a fifth horizontal distance 4910 may be in a range from 0.04" to 0.7".

Figure 50:
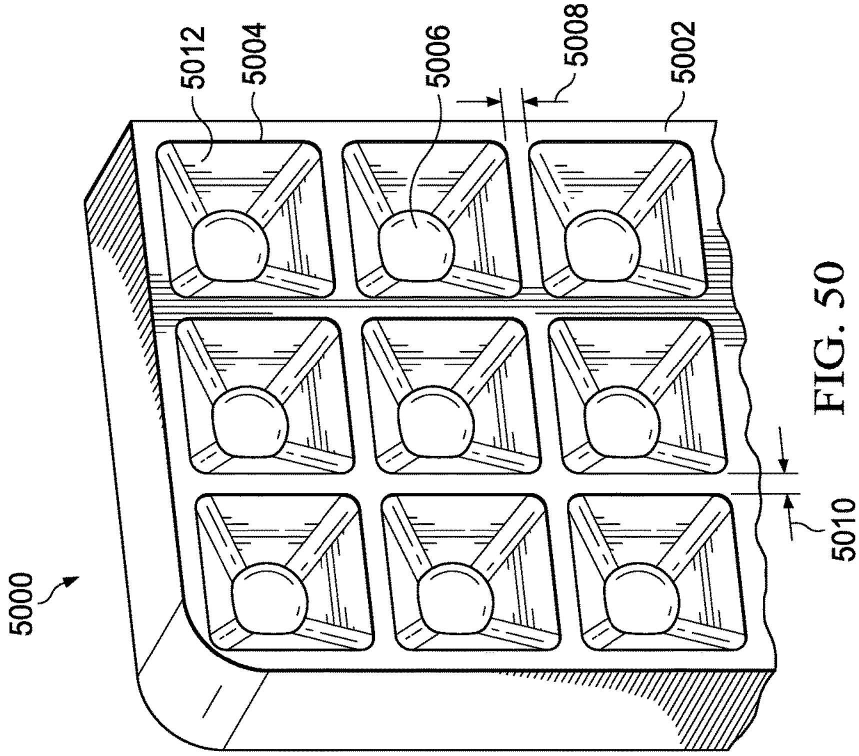
FIG. 50 is another illustration of an external lighting device configuration, according to one embodiment.

In FIG. 50, another illustration of an external lighting device configuration is shown, according to one embodiment. A sixth external wall of lights image 5000 includes a sixth surface area 5002, a sixth lighting device 5004 (and/or a plurality of lighting devices), and a sixth light source 5006. In this example, a sixth vertical distance 5008 and a sixth horizontal distance 5010 may be utilized to separate one lighting device from another lighting device. Further, the sixth surface area 5002 may be a lit surface, a non-lit surface, a light absorbing surface, a reflective surface, and/or any combination thereof. In addition, the sixth lighting device 5004 may have a sixth diffuser 5012 where the sixth diffuser 5012 has a sixth concave shape. The sixth concave shape has a domed shape in this example. In addition, the sixth light source 5006 has a circle and/or semi-circle shape. Further, the diffuser has a gloss coating. In one example of a cup with large square design and a small domed diffuser with gloss configuration measurements may be an overall width of 2.5", a cup/prism width of 0.71", a cup/prism depth of 0.24", a diffuser width of 0.18", and a diffuser height of 0.16". Further, these measurements may be utilized with any configuration shown in this disclosure. Further, the overall width may be within 1" to 5", a cup/prism width may be within 0.25" to 1.5", a cup/prism depth may be 0.10" to 0.55", a diffuser width of 0.08" to 0.26", and a diffuser height of 0.10" to 0.20". In addition, a sixth vertical distance 5008 may be in a range from 0.01" to 1.0". Further, a sixth horizontal distance 5010 may be in a range from 0.01" to 1.0".

Figure 51:
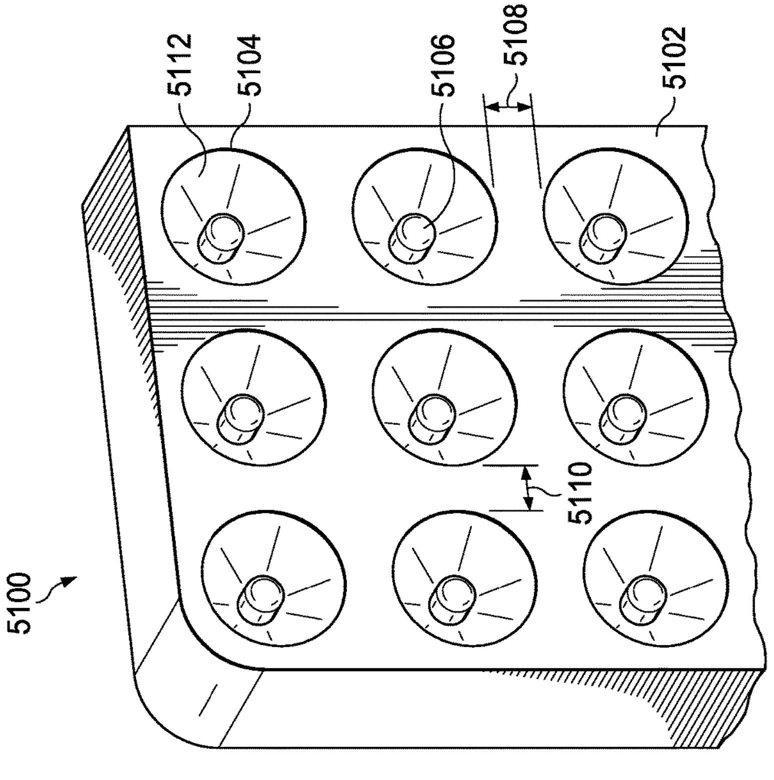
FIG. 51 is another illustration of an external lighting device configuration, according to one embodiment.

In FIG. 51, another illustration of an external lighting device configuration is shown, according to one embodiment. A seventh external wall of lights image 5100 includes a seventh surface area 5102, a seventh lighting device 5104 (and/or a plurality of lighting devices), and a seventh light source 5106. In this example, a seventh vertical distance 5108 and a seventh horizontal distance 5110 may be utilized to separate one lighting device from another lighting device. Further, the seventh surface area 5102 may be a lit surface, a non-lit surface, a light absorbing surface, a reflective surface, and/or any combination thereof. In addition, the seventh lighting device 5104 may have a seventh diffuser 5112 where the seventh diffuser 5112 has a seventh concave shape. The seventh concave shape is a round and/or semi-circle shape (e.g., a fourth sized round shape which is larger than either the first sized round shape, the second sized round shape, and/or the third sized round shape) in this example. In addition, the seventh light source 4606 has a round shape. In one example of a cup with large round design and a large round diffuser with gloss configuration measurements may be an overall width of 2.5", a cup/prism width of 0.71", a cup/prism depth of 0.24", a diffuser width of 0.30", and a diffuser height of 0.24". Further, these measurements may be utilized with any configuration shown in this disclosure. Further, the overall width may be within 1" to 5", a cup/prism width may be within 0.65" to 0.85", a cup/prism depth may be 0.10" to 0.55", a diffuser width of 0.25" to 0.35", and a diffuser height of 0.23" to 0.28". In addition, a seventh vertical distance 5108 may be in a range from 0.01" to 1.0". Further, a seventh horizontal distance 5110 may be in a range from 0.01" to 1.0".

Figure 52:
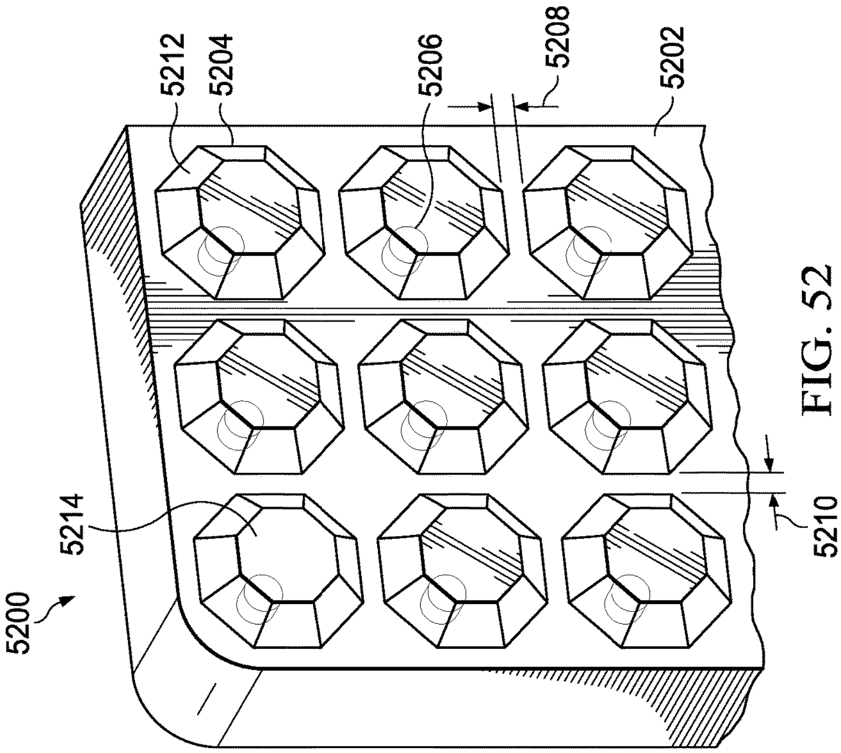
FIG. 52 is another illustration of an external lighting device configuration, according to one embodiment.

In FIG. 52, another illustration of an external lighting device configuration is shown, according to one embodiment. An eighth external wall of lights image 5200 includes an eighth surface area 5202, an eighth lighting device 5204 (and/or a plurality of lighting devices), and an eighth light source 5206. In this example, an eighth vertical distance 5208 and an eighth horizontal distance 5210 may be utilized to separate one lighting device from another lighting device. Further, the eighth surface area 5202 may be a lit surface, a non-lit surface, a light absorbing surface, a reflective surface, and/or any combination thereof. In addition, the eighth lighting device 5204 may have an eighth diffuser 5212 where the eighth diffuser 5212 has a first convex shape. The first convex shape is an octagon shape (e.g., a first sized convex octagon shape) in this example. In addition, the eighth light source 5206 has an octagon shape. In addition, the surface is a frosted surface with black paint. In one example of a prism with an octagon design with a frosted surface and black paint measurements may be an overall width of 2.5", a cup/prism width of 0.76", and a cup/prism depth of 0.51". For this design, there are no diffuser width and diffuser height. Further, these measurements may be utilized with any configuration shown in this disclosure.

Further, the overall width may be within 1" to 5", a cup/prism width may be within 0.25" to 1.5", and a cup/prism depth may be 0.10" to 0.75". In addition, an eighth vertical distance 5208 may be in a range from 0.01" to 1.0". Further, an eighth horizontal distance 5210 may be in a range from 0.01" to 1.0".

Figure 53:
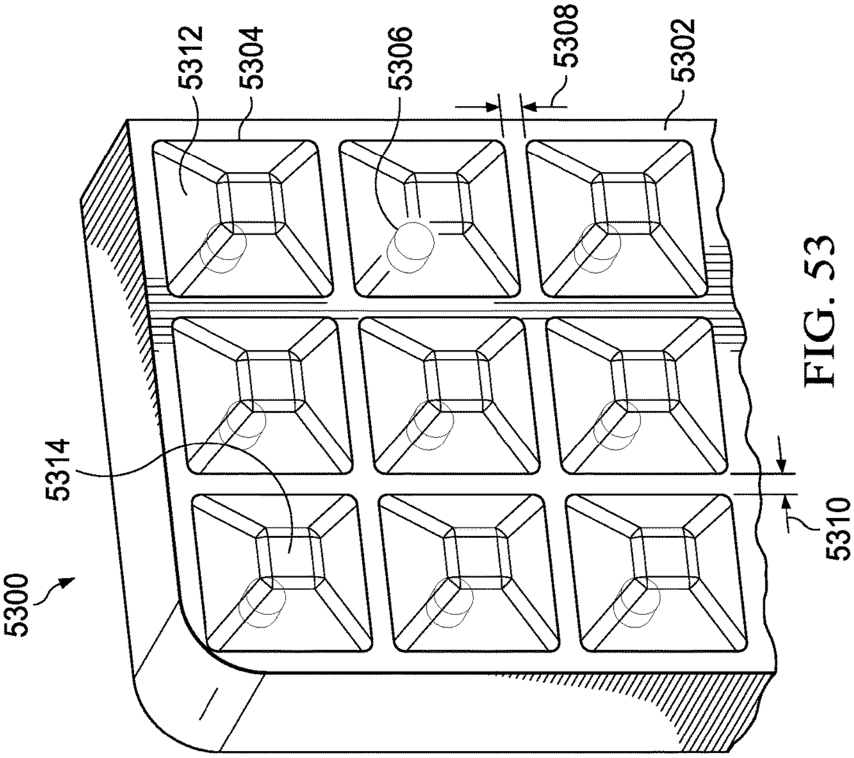
FIG. 53 is another illustration of an external lighting device configuration, according to one embodiment.

In FIG. 53, another illustration of an external lighting device configuration is shown, according to one embodiment. A ninth external wall of lights image 5300 includes a ninth surface area 5302, a ninth lighting device 5304 (and/or a plurality of lighting devices), and a ninth light source 5306. In this example, a ninth vertical distance 5308 and a ninth horizontal distance 5310 may be utilized to separate one lighting device from another lighting device. Further, the ninth surface area 5302 may be a lit surface, a non-lit surface, a light absorbing surface, a reflective surface, and/or any combination thereof. In addition, the ninth lighting device 5304 may have a ninth diffuser 5312 where the ninth diffuser 5312 has a second convex shape. The second convex shape is a pyramid shape in this example. In addition, the ninth light source 5306 has an octagon shape. In addition, the surface is a frosted surface with black paint. In one example of a prism with a pyramid design with a frosted surface measurements may be an overall width of 2.5", a cup/prism width of 0.76", and a cup/prism depth of 0.51". For this design, there are no diffuser width and diffuser height. Further, these measurements may be utilized with any configuration shown in this disclosure. Further, the overall width may be within 1" to 5", a cup/prism width may be within 0.25" to 1.5", and a cup/prism depth may be 0.10" to 0.75". In addition, a ninth vertical distance 5308 may be in a range from 0.01" to 1.0". Further, a ninth horizontal distance 5310 may be in a range from 0.01" to 1.0".

Figure 54:
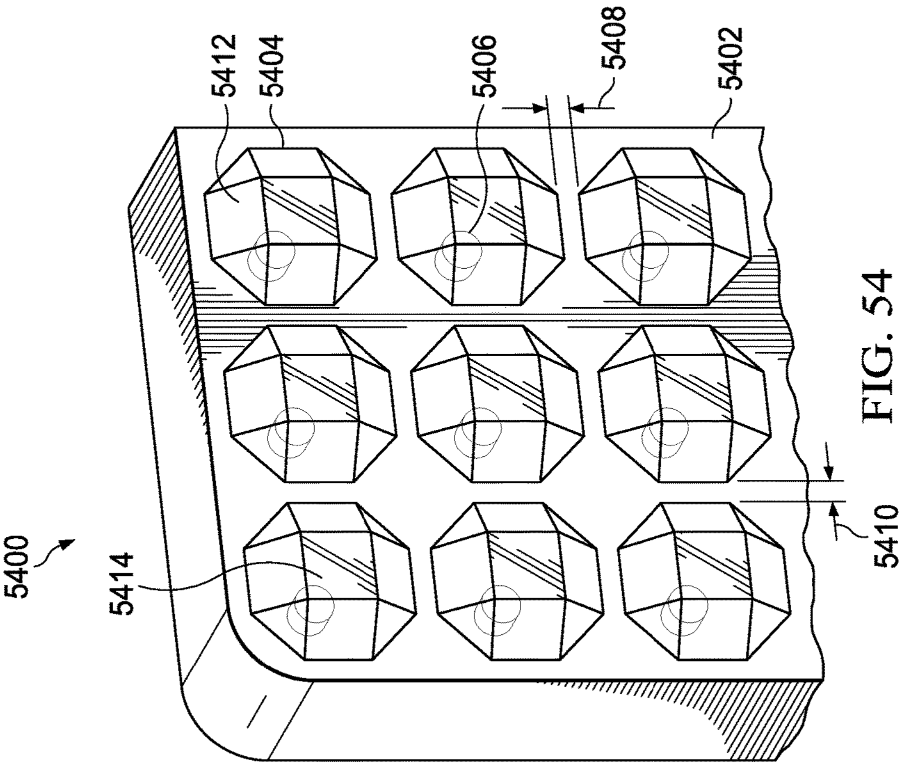
FIG. 54 is another illustration of an external lighting device configuration, according to one embodiment.

In FIG. 54, another illustration of an external lighting device configuration is shown, according to one embodiment. An tenth external wall of lights image 5400 includes an tenth surface area 5402, an tenth lighting device 5404 (and/or a plurality of lighting devices), and an tenth light source 5406. In this example, an tenth vertical distance 5408 and an tenth horizontal distance 5410 may be utilized to separate one lighting device from another lighting device. Further, the tenth surface area 5402 may be a lit surface, a non-lit surface, a light absorbing surface, a reflective surface, and/or any combination thereof. In addition, the tenth lighting device 5404 may have a tenth diffuser 5412 where the tenth diffuser 5412 has a third convex shape. The third convex shape is an octagon shape (e.g., a first sized convex octagon shape) in this example. In addition, the tenth light source 5006 has an octagon shape. In addition, the surface is a clear surface with white paint. In one example of a prism with an octagon design with a clear gloss measurements may be an overall width of 2.5", a cup/prism width of 0.76", and a cup/prism depth of 0.51". For this design, there are no diffuser width and diffuser height. Further, these measurements may be utilized with any configuration shown in this disclosure. Further, the overall width may be within 1" to 5", a cup/prism width may be within 0.25" to 1.5", and a cup/prism depth may be 0.10" to 0.75". In addition, a tenth vertical distance 5408 may be in a range from 0.01" to 1.0". Further, a tenth horizontal distance 4510 may be in a range from 0.01" to 1.0".

Figure 55:
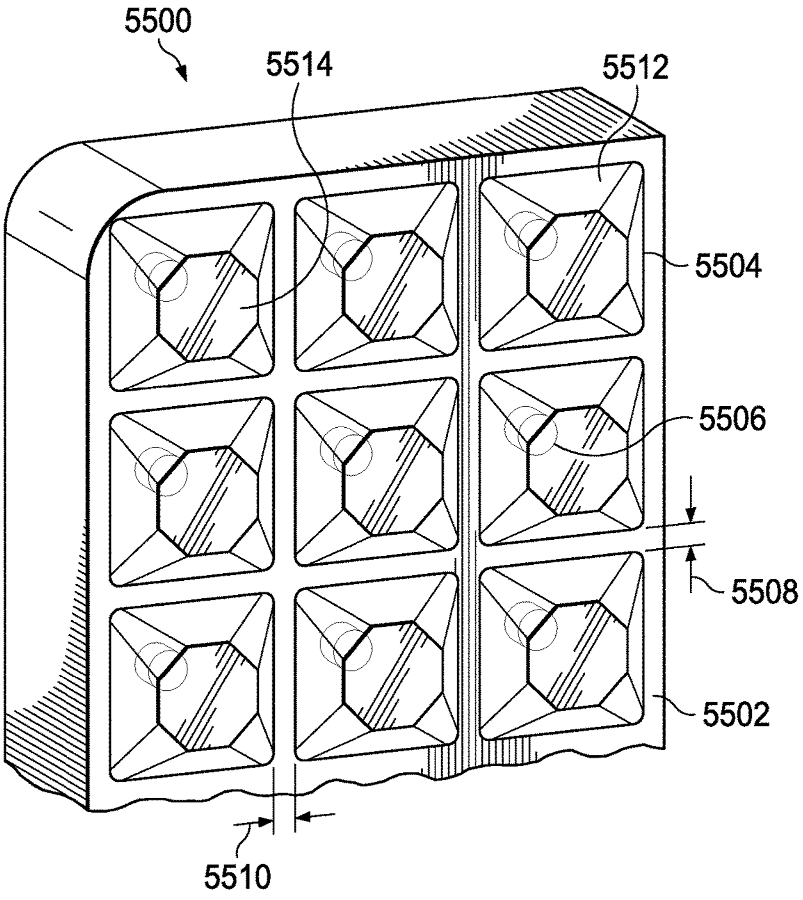
FIG. 55 is another illustration of an external lighting device configuration, according to one embodiment.

In FIG. 55, another illustration of an external lighting device configuration is shown, according to one embodiment. An eleventh external wall of lights image 5500 includes an eleventh surface area 5502, an eleventh lighting device 5504 (and/or a plurality of lighting devices), and an eleventh light source 5506. In this example, an eleventh vertical distance 5508 and an eleventh horizontal distance 5510 may be utilized to separate one lighting device from another lighting device. Further, the eleventh surface area 5502 may be a lit surface, a non-lit surface, a light absorbing surface, a reflective surface, and/or any combination thereof. In addition, the eleventh lighting device 5004 may have an eleventh diffuser 5512 where the eleventh diffuser 5512 has a fourth convex shape. The fourth convex shape is a second pyramid shape (e.g., a second sized convex pyramid shape) in this example. In addition, the eleventh light source 5506 has an octagon shape. In addition, the surface is a matte white. In one example of a prism with a pyramid design with a matte white surface and black paint measurements may be an overall width of 2.5", a cup/prism width of 0.76", and a cup/prism depth of 0.51". For this design, there are no diffuser width and diffuser height. Further, these measurements may be utilized with any configuration shown in this disclosure. Further, the overall width may be within 1" to 5", a cup/prism width may be within 0.25" to 1.5", and a cup/prism depth may be 0.10" to 0.75". In addition, an eleventh vertical distance 5508 may be in a range from 0.01" to 1.0". Further, an eleventh horizontal distance 5510 may be in a range from 0.01" to 1.0".

Figure 56:
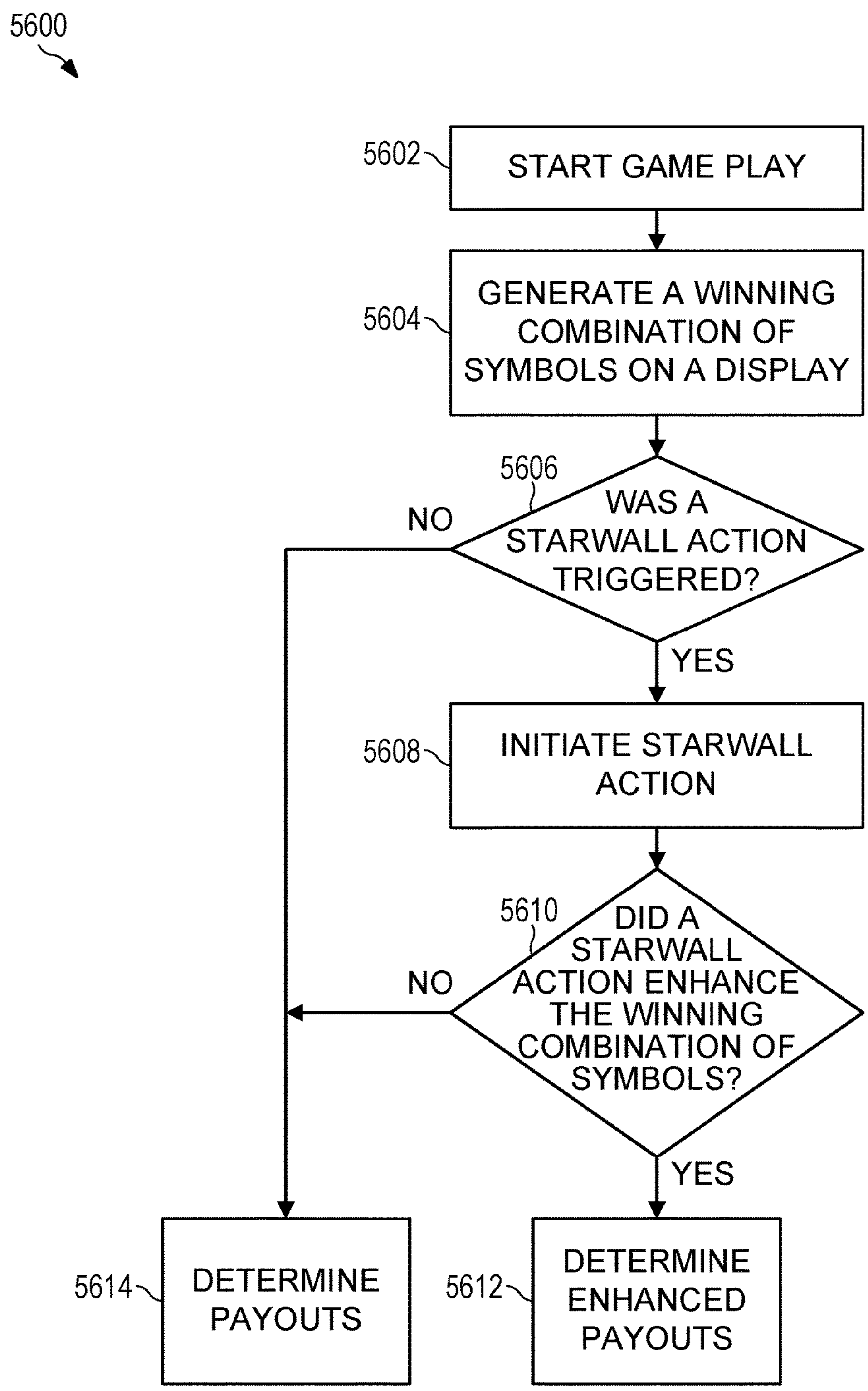
FIG. 56 is a flowchart of game play, according to one embodiment.

In FIG. 56, a flowchart of game play is shown, according to one embodiment. A method 5600 may include starting game play (step 5602). The method 5600 may include generating a winning combination of symbols to display on one or more screens (step 5604). The method 5600 may include one or more processors determining whether a starwall action was triggered (step S606). If a starwall action was not triggered, then the method may include determining one or more payouts (step 5614). If a starwall action was triggered, then the method may include initiating one or more starwall actions (step 5608). The method 5600 may include one or more processors determining whether a starwall action enhanced the winning combination of symbols (step 5610). If the starwall action did not enhance the winning combination of symbols, then the method moves to step 5614. If the starwall action did enhance the winning combination of symbols, then the method may include determining one or more enhance payouts. In one example, a player may start game play, which generates a winning combination of symbols where the winning combination of symbols are displayed on one or more display screens. In this example, a starwall action is triggered (e.g., random number generation, based on the symbol combination, and/or a predetermined pattern, and/or a combination thereof). For example, a first winning combination of a first specific symbol (e.g., A, A, A,) may be a first starwall triggering event, while a second winning combination of a second specific symbol (e.g., B, B, B) may not be a starwall triggering event. In this example, a starwall image may move around one or more starwall areas (see FIGS. 24-25) to determine whether an enhanced gaming prize and/or an independent of game play prize is to be awarded. If the starwall image gaming function results in a winning event, then an enhanced payout determination is made. If the starwall image gaming function does not result in a winning event, then the normal payout (based on base game play results) determination is made.

Figure 57:
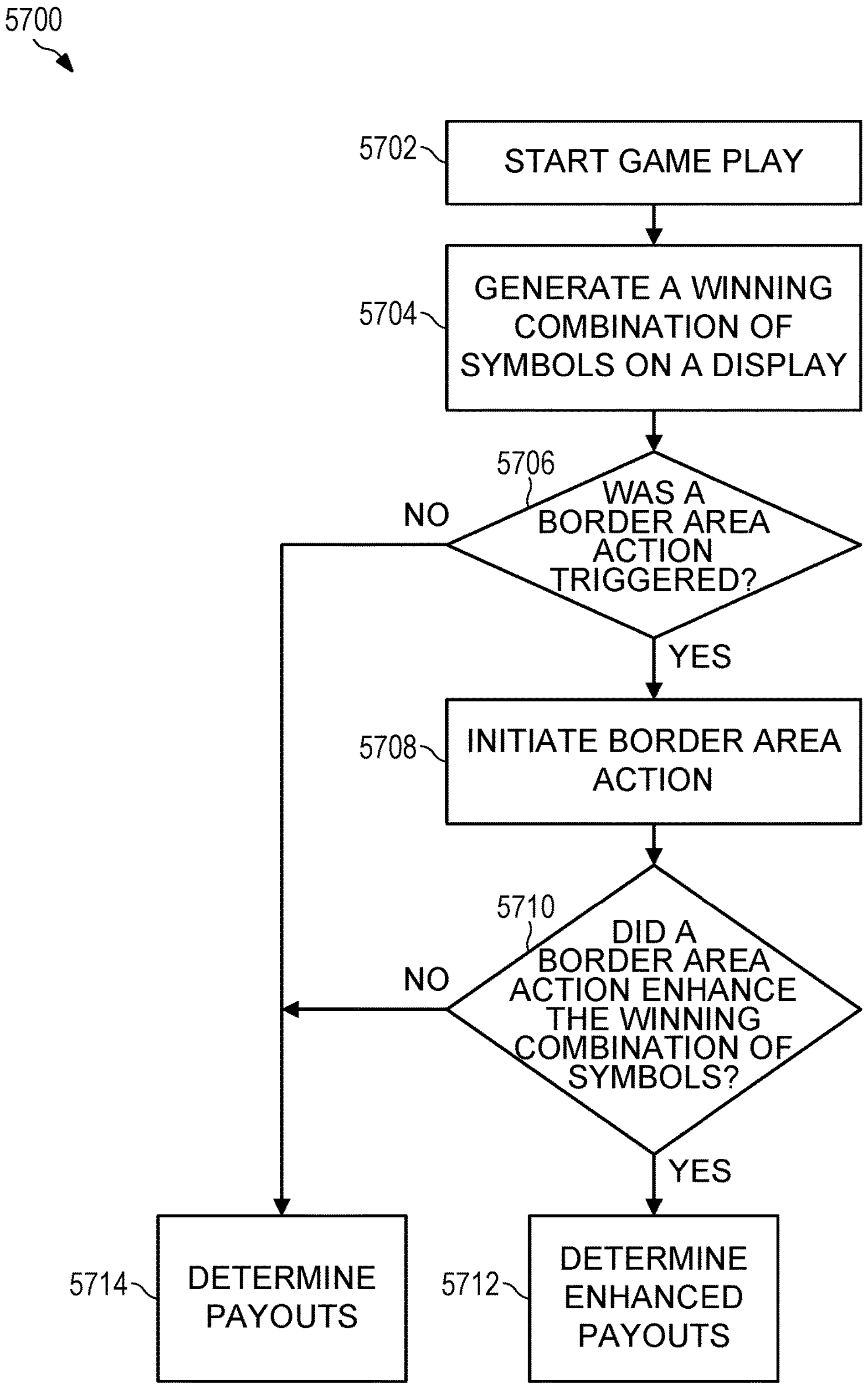
FIG. 57 is a flowchart of game play, according to one embodiment.

In FIG. 57, a flowchart of game play is shown, according to one embodiment. A method 5700 may include starting game play (step 5702). The method 5700 may include generating a winning combination of symbols to display one or more screens (step 5704). The method may include one or more processors determining whether a border area action (e.g., ring area) was triggered (step 5704). If no border area action was triggered, then the method may determine one or more payouts (step 5714). If a border area action was triggered, then the method may include initiating a border area action (step S708). The method may include one or more processors determining whether a border area action enhanced the winning combination of symbols (step 5710). If the border area action did not enhance the winning combination of symbols, then the method may move to step 5714. If the border area action did enhance the winning combination of symbols, then the method may determine one or more enhanced payouts (step 5712). In one example, a player may start game play, which generates a winning combination of symbols where the winning combination of symbols are displayed on one or more display screens. In this example, a border area action is triggered (e.g., random number generation, based on the symbol combination, and/or a predetermined pattern, and/or a combination thereof). For example, a first winning combination of a first specific symbol (e.g., A, A, A,) may be a first border area triggering event, while a second winning combination of a second specific symbol (e.g., B, B, B) may not be a border area triggering event. In this example, a border area image may move around one or more ring/border areas (see FIG. 26) to determine whether an enhanced gaming prize and/or an independent of game play prize is to be awarded. If the border area image gaming function results in a winning event, then an enhanced payout determination is made. If the border area image gaming function does not result in a winning event, then the normal payout (based on base game play results) determination is made.

Figure 58:
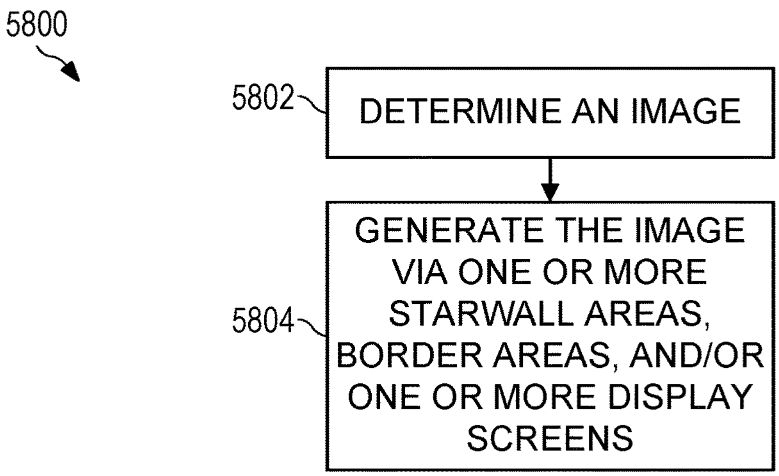
FIG. 58 is a flowchart for a presentation, according to one embodiment.

In FIG. 58, a flowchart for a presentation is shown, according to one embodiment. A method 5800 may include determining an image (step 5802). The method may include generating the image via one or more starwall areas, border areas, and/or one or more display screens (step 5804). In one example, one or more gaming devices may be banked together (see FIG. 27). In this example, a few images (e.g., Stars) may be displayed on one or more starwall areas, border areas, and/or one or more display screens on one or more gaming devices (see FIG. 36).

Figure 59:
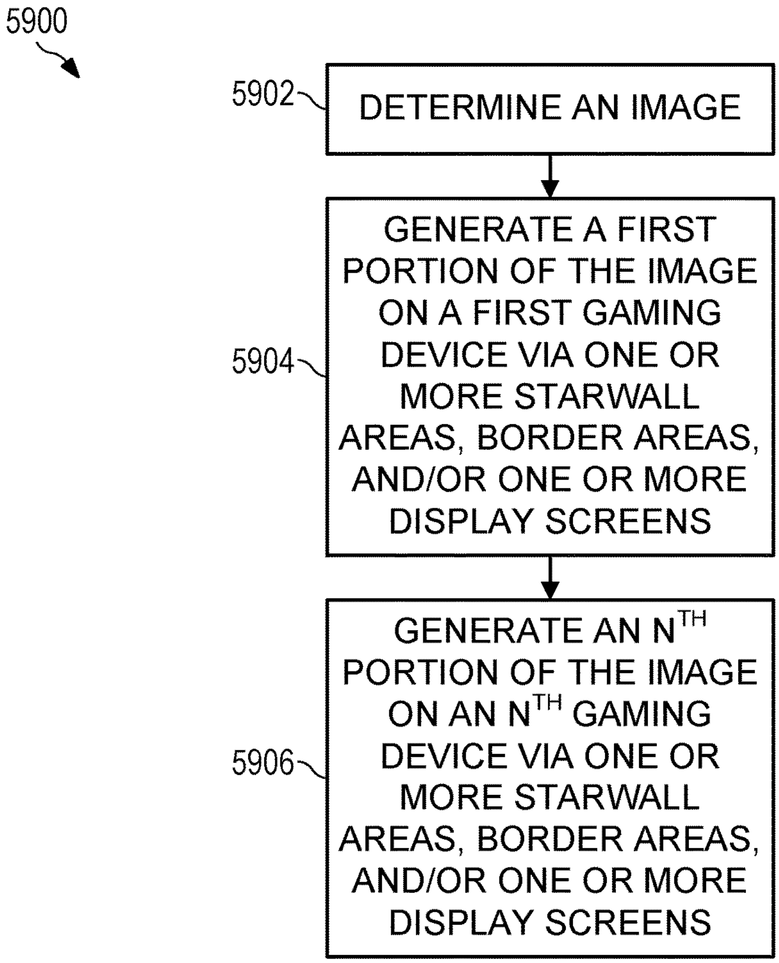
FIG. 59 is a flowchart for a presentation, according to one embodiment.

In FIG. 59, a flowchart for a presentation is shown, according to one embodiment. A method 5900 may include determining an image (step 5902). The method may include generating a first portion of the image on a first gaming device via one or more starwall areas, border areas, and/or one or more display screens (step 5904). The method may include generating an Nth portion of the image on an Nth gaming device via one or more starwall areas, border areas, and/or one or more display screens (step 5906). In one example, one or more gaming devices may be banked together (see FIG. 27). In this example, a composite image (e.g., USA Flag) may be displayed on one or more starwall areas, border areas, and/or one or more display screens on one or more gaming devices (see FIG. 28).

Figure 60:
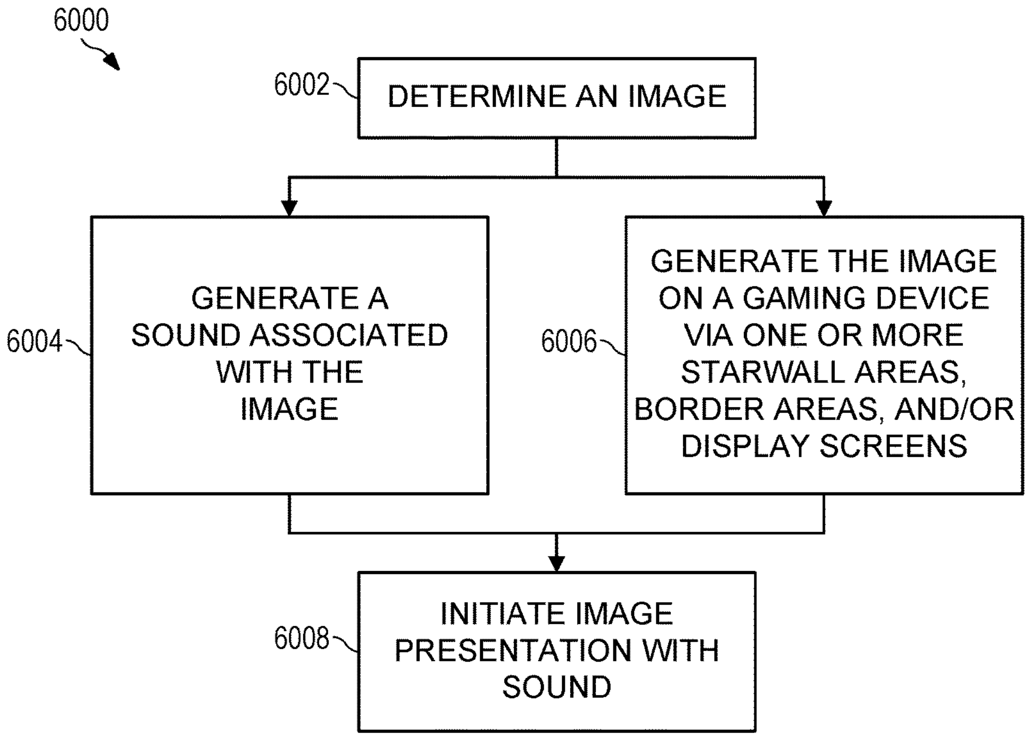
FIG. 60 is a flowchart for a presentation, according to one embodiment.

In FIG. 60, a flowchart for a presentation is shown, according to one embodiment. A method 6000 may include determining an image (step 6002). The method may include generating a sound associated with the image (step 6004). The method may include generating the image on a gaming device via one or more starwall areas, border areas, and/or display screens (step 6006). The method may include initiating an image presentation with sound (step 6008). In one example, a presentation may include various images and sounds. In one example shown in FIG. 25, as the image (e.g., reference number 3506) moves from left to right across the electronic gaming device a sound (e.g., reference number 3504) moves from left to right across the electronic gaming device. The images and sounds may be synced together.

Figure 61:
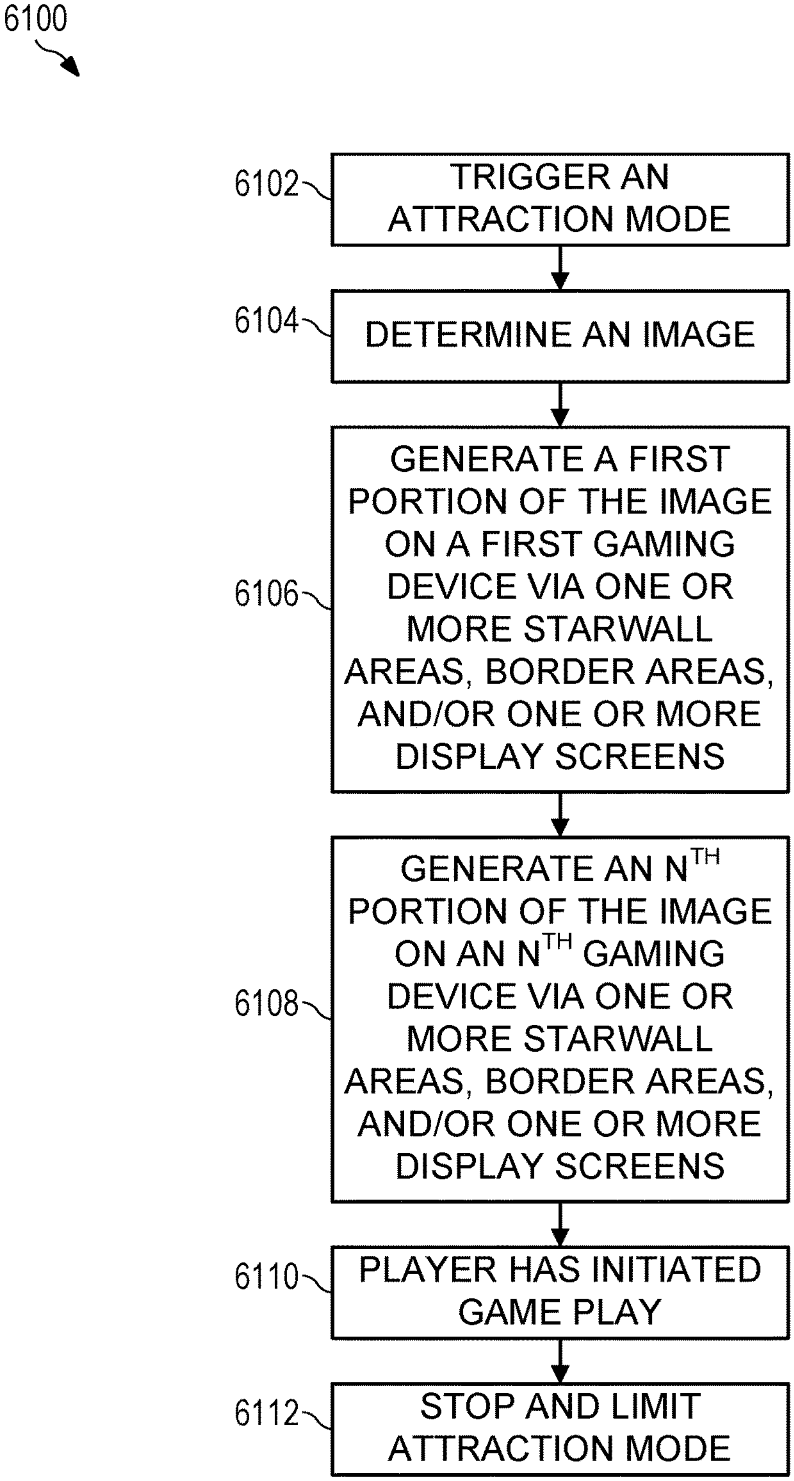
FIG. 61 is a flowchart for an attraction mode, according to one embodiment.

In FIG. 61, a flowchart for an attraction mode is shown, according to one embodiment. A method 6100 may include triggering an attraction mode (step 6102). The method may include determining an image (step 6104). The method may include generating a first portion of the image on a first gaming device via one or more starwall areas, border areas, and/or one or more display screens (step 6106). The method may include generating an Nth portion of the image on an Nth gaming device via one or more starwall areas, border areas, and/or one or more display screens (step 6108). The method may include determining whether a player has initiated game play (step 6110). If the player has initiated game play, then the method may include stopping and/or limiting an attraction mode (step 6112—see FIGS. 36-37). In one example, one or more gaming devices may be in an attraction mode to bring players over to and playing one or more gaming devices. In this example, a composite image (e.g., USA Flag—see FIG. 28) may be displayed on one or more starwall areas, border areas, and/or one or more display screens on one or more gaming devices to attract one or more players.

Figure 62:
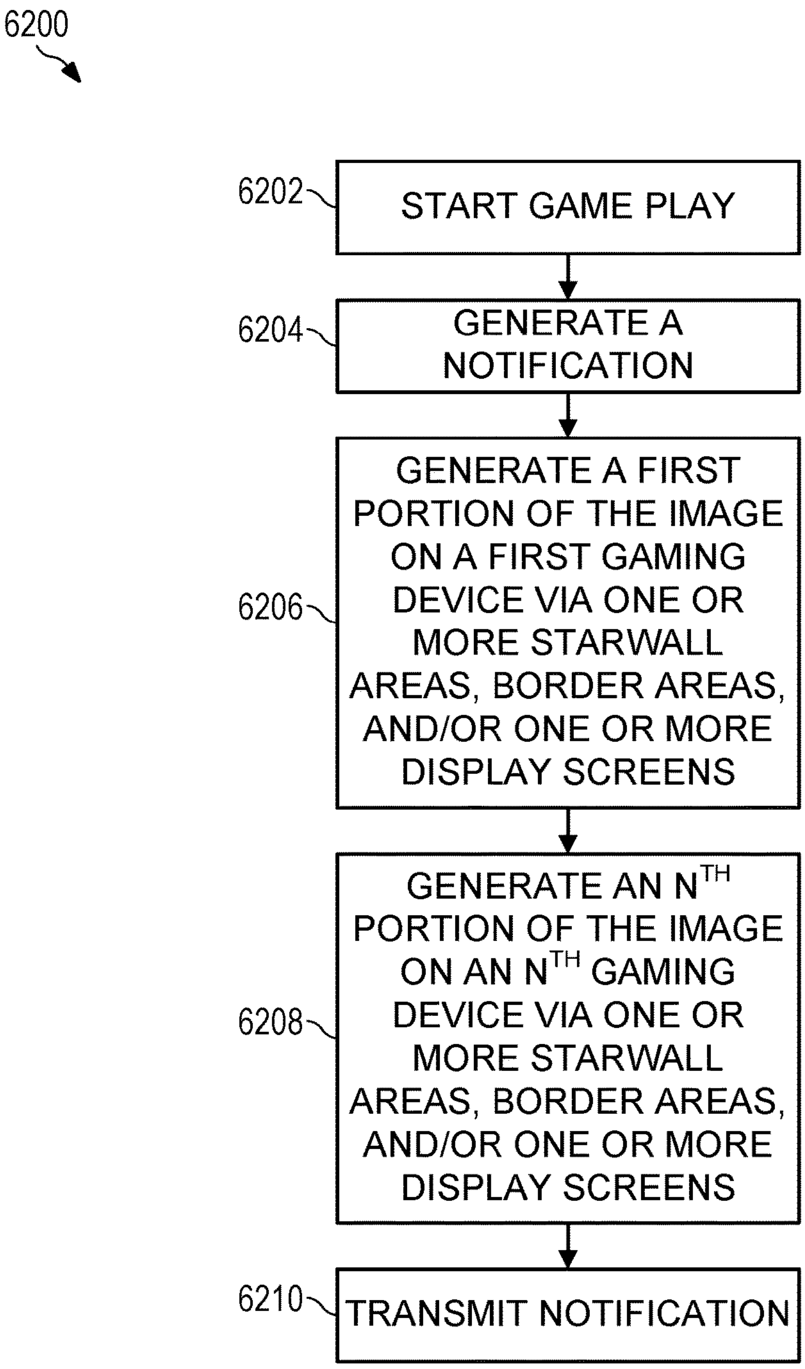
FIG. 62 is a flowchart for a notification procedure, according to one embodiment.

In FIG. 62, a flowchart for a notification procedure is shown, according to one embodiment. A method 6200 may include starting game play (step 6202). The method may include generating a notification (step 6204). The method may include generating a first portion of the image on a first gaming device via one or more starwall areas, border areas, and/or one or more display screens (step 6206). The method may include generating an Nth portion of the image on an Nth gaming device via one or more starwall areas, border areas, and/or one or more display screens (step 6208). The method may include transmitting one or more notifications (step 6210). In another example, a composite image (see reference number 3900) may be utilized to notify one or more players of an event. For example, a winning notification (see FIG. 38) may be transmitted to one or more players. In another example, a new game notification (see FIG. 39) may be transmitted to one or more potential players.

In one embodiment, an electronic gaming device may include a memory, a display, a plurality of display areas located on the display, a plurality of external lights located at an outer area of a front surface of the electronic gaming device, where the plurality of external lights forms a u-shape with a left side, a right side, and a bottom where each of the left side, the right side, and the bottom includes a first light column, a second light column, and a third light column, and a processor which initiates a base game via the plurality of display areas located on the display.

In various other examples, the processor may utilize the plurality of external lights in a game play, the processor may utilize the plurality of externa lights in a game play based on a triggering event, the processor may utilize the plurality of external lights in an attraction mode, the processor may utilize the plurality of external lights in a notification mode, the notification mode may be based on a winning event occurring on a second electronic gaming device, the processor may utilize the plurality of external lights in an advertisement mode, the ring area may be located around the display, the processor may utilize the ring area in a game play, the processor may utilize the ring area in an attraction mode, the processor may utilize the ring area in a notification mode, the processor may utilize the ring area in an advertisement mode, the processor may utilize the plurality of external lights; the display; and a ring area in a game play; where the ring area is located around the display, the processor may utilize the plurality of external lights; the display; and a ring area in an attraction mode; where the ring area is located around the display, the processor may utilize the plurality of external lights; the display; and a ring area in an advertisement mode; where the ring area is located around the display, the processor may utilize the plurality of external lights; a second plurality of external lights on a second electronic gaming device; a second display on the second electronic gaming device; and the display in a game play, the processor may utilize the plurality of external lights; a second plurality of external lights on a second electronic gaming device; a second display on the second electronic gaming device; and the display in an attraction mode, the processor may utilize the plurality of externa lights; a second plurality of external lights on a second electronic gaming device; a second display on the second electronic gaming device; and the display in a notification mode, the notification mode may be based on a winning event occurring on the second electronic gaming device and where the processor may generate a message on the electronic gaming device indicating that the winning event has occurred on the second electronic gaming device, and/or the processor may utilize the plurality of external lights; a second plurality of externa lights on a second electronic gaming device; a second display on the second electronic gaming device; and the display in an advertisement mode.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other persona communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to “one example,” “an example,” “embodiment,” and/or “another example” should be considered to mean that the particular features, structures, or characteristics may be combined in one or more examples. While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed. Further, one or more gaming options may be Internet based gaming options. Therefore, all of the examples and/or embodiments may be utilized via an Internet based gaming system.

The invention claimed is:

1. A gaming machine comprising:

a cabinet having a top, a first side and a second side and a front;

a deck area projecting from said front of said cabinet below said top of said cabinet;

a main electronic video display located above said deck area at said front of said cabinet, said main electronic video display having a top positioned above said top of said cabinet and having a first side and a second side;

a bottom display area located below said deck area, said bottom display area having a first side and a second side and a bottom;

an illuminated ring having a top section which extends along said top of said main electronic video display, a first side section which extends along said first side of said main electronic video display and said first side of said bottom display area, a bottom section which extends along said bottom of said bottom display area, and a second side section which extends along said second side of said bottom display area and said second side of said main electronic video display, the top section, the first side section, the bottom section, and the second side section of the illuminated ring defining a continuously illuminated strip above and below the deck area;

a light wall having a first area which extends along said bottom of said bottom display area outwardly of said illuminated ring, a second area which extends along said first and second sides of said bottom display area outwardly of said illuminated ring, and a third area which extends along said first side of said main electronic display outwardly of said illuminated ring and along said second side of said main electronic display outwardly of said illuminated ring;

at least one player input device;

a memory device;

a controller; and machine-readable code stored in said memory device executable by said controller to, in response to a wager placed by said player from a player credit balance via said at least one player input device, cause said main electronic video display to display wager game information.

2. The gaming machine in accordance with claim 1 wherein at least a first portion of said front of said cabinet extends upwardly along and outwardly of said first side of said main electronic video display and at least a second portion of said front of said cabinet extends upwardly along and outwardly of said second side of said main electronic video display.

3. The gaming machine in accordance with claim 2 wherein at least a portion of said second area of said light wall is located at said first portion of said front of said cabinet and at least a portion of said third area of said light wall is located at said second portion of said front of said cabinet.

4. The gaming machine in accordance with claim 1 wherein said first area, said second area and said third area of said light wall each comprise a plurality of rows of lights.

5. The gaming machine in accordance with claim 4 wherein each of said plurality of rows of lights contains at least 3 lights.

6. The gaming machine in accordance with claim 4 wherein said plurality of rows of lights in said first area have a greater number of lights in each row than said plurality of rows of lights in said second and third areas.

7. The gaming machine in accordance with claim 1 wherein said second and third areas of said light wall stop to said top of said cabinet below said top of said main electronic video display.

8. The gaming machine in accordance with claim 1 further comprising at least one secondary electronic video display positioned above said top of said main electronic video display.

9. The gaming machine in accordance with claim 1 wherein said first, second and third areas of said light wall comprise a plurality of LED lights.

10. The gaming machine in accordance with claim 1 wherein said illuminated ring is illuminated by a plurality of LEDs.

11. The gaming machine in accordance with claim 1 wherein said light wall is positioned at said front of said cabinet and said illuminated ring is raised from said front of said cabinet.

12. The gaming machine in accordance with claim 11 wherein a front of said main electronic video display and a front of said bottom display area are raised from said front of said cabinet and said illuminated ring is located at said front of said main electronic video display and said bottom display area.

13. A gaming machine comprising:

a cabinet having a top and bottom, a first side and a second side, and a front and a rear;

a deck area projecting from the front of the cabinet, the deck area being disposed below the top of the cabinet;

a main electronic video display disposed above the deck area at the front of the cabinet, the main electronic video display having a top disposed above the top of the cabinet and having a first side and a second side;

a bottom display area disposed below the deck area, the bottom display area having a first side, a second side, and a bottom;

an illuminated ring having a top portion and a bottom portion, the top portion comprising:

a first side section which extends along the first side of the main electronic video display from a top of the deck area to the top of the main electronic video display, a second side section which extends along the second side of the main electronic video display from the top of the deck area to the top of the main electronic video display, and a top section which extends along the top of the main electronic video display extending from a top of the first and the second side sections of the top portion of the illuminated ring, the first side section, the second side section, and the top section of the top portion of the illuminated ring defining a continuously illuminated strip, and the bottom portion comprising:

a first side section which extends along the first side of the m bottom display area from a bottom of the deck area to the bottom of the bottom display area, a second side section which extends along the second side of the bottom display area from the bottom of the deck area to the bottom of the bottom display area, and a bottom section which extends along the bottom of the bottom display area extending from a bottom of the first and the second side sections of the bottom portion of the illuminated ring, the first side section, the second side section, and the bottom section of the bottom portion of the illuminated ring defining a continuously illuminated strip;

a light wall disposed on the front side of the cabinet, the light wall comprising:

a first area which extends outwardly on the front side of the cabinet from the bottom portion of the illuminated ring, the first area being disposed below the deck area, a second area which extends outwardly on the front side of the cabinet from the first side section of the top portion of the illuminated ring, and a third area which extends outwardly on the front side of the cabinet from the second side section of the top portion of the illuminated ring;

at least one player input device;

a memory device;

a controller; and machine-readable code stored in the memory device executable by said controller to, in response to a wager placed by said player from a player credit balance via said at least one player input device, cause the main electronic video display to display wager game information.

14. The gaming machine of claim 13, wherein the first and second side sections of the top portion of the illuminated ring align with the first and second side sections of the bottom portion of the illuminated ring.

15. The gaming machine of claim 13, wherein the illuminated ring is raised from the front of the cabinet.

16. The gaming machine of claim 15, wherein a front of the main electronic video display and a front of the bottom display area are raised from the front of the cabinet, and the illuminated ring is disposed at the front of the main electronic video display and the bottom display area.

* * * * *